(12) United States Patent
Zemitis et al.

(10) Patent No.: US 10,704,392 B2
(45) Date of Patent: Jul. 7, 2020

(54) TIP SHROUD FILLETS FOR TURBINE ROTOR BLADES

(71) Applicant: General Electric Company, Schenectady, NY (US)

(72) Inventors: William Scott Zemitis, Simpsonville, SC (US); Melbourne James Myers, Woodruff, SC (US); Richard Ryan Pilson, Greer, SC (US); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 15/933,568

(22) Filed: Mar. 23, 2018

(65) Prior Publication Data

US 2019/0292913 A1    Sep. 26, 2019

(51) Int. Cl.
*F01D 5/14*    (2006.01)
*F01D 5/22*    (2006.01)

(52) U.S. Cl.
CPC ............ *F01D 5/143* (2013.01); *F01D 5/147* (2013.01); *F01D 5/225* (2013.01); *F05D 2240/307* (2013.01); *F05D 2250/74* (2013.01)

(58) Field of Classification Search
CPC ........... F01D 5/143; F01D 5/147; F01D 5/225
See application file for complete search history.

(56) References Cited

U.S. PATENT DOCUMENTS

| | | | | |
|---|---|---|---|---|
| 8,105,043 B2 * | 1/2012 | Tsifourdaris | ............ | F01D 5/14 416/223 R |
| 9,322,282 B2 | 4/2016 | Chouhan et al. | | |
| 9,631,496 B2 * | 4/2017 | Vignali | ................. | F01D 5/141 |
| 9,732,761 B2 * | 8/2017 | Chiu | .................... | F04D 29/324 |
| 10,294,957 B2 * | 5/2019 | Rosen | ................... | F04D 19/002 |
| 10,301,943 B2 * | 5/2019 | Brittingham | ............ | F01D 5/147 |
| 2017/0226870 A1 | 8/2017 | Ristau et al. | | |

* cited by examiner

*Primary Examiner* — Ninh H. Nguyen
*Assistant Examiner* — Behnoush Haghighian
(74) *Attorney, Agent, or Firm* — Charlotte Wilson; Hoffman Warnick, LLC

(57) ABSTRACT

A turbine rotor blade including an airfoil, tip shroud, and fillet formed therebetween. The fillet defines a fillet profile variable about the intersection for connecting the tip shroud and airfoil and facilitating aerodynamic airflow. The fillet includes a pressure side fillet. The pressure side fillet comprises a pressure side fillet profile per points within a first set of points of X, Y and Z coordinate values in a Cartesian coordinate system, as set forth in Table I, where X, Y and Z are distances in inches from an origin and, when the points are connected by smooth, continuing arcs, the points define the pressure side fillet profile of the pressure side fillet. The first set of points includes points between and including point 1 and point 50 of each reference plane between and including a reference plane H and a reference plane W, as set forth in Table I.

21 Claims, 9 Drawing Sheets

TIP SHROUD FILLETS FOR TURBINE ROTOR BLADES

BACKGROUND OF THE INVENTION

The present invention relates generally to fillets used with a turbine rotor blade, and more specifically, to a fillet used between an airfoil and tip shroud of a turbine rotor blade.

At least some known turbine rotor blades include an airfoil, a platform, a shank, a dovetail extending along a radial inner end portion of the shank, and a tip shroud formed at a tip of the airfoil. On at least some known airfoils, integral tip shrouds are included on a radially outer end of the airfoil to define a portion of a passage through which hot combustion gasses must flow. Known tip shrouds and airfoils typically include a fillet having a predetermined size and shape at the intersection of the tip shroud and airfoil.

During operation, the connection formed between such a tip shroud and airfoil of a rotor blade become highly stressed due to rotationally induced centrifugal and mechanical forces. The fillets formed between the tip shroud and the airfoil are shaped to reduce the stress concentrations that occur in this region. However, known fillet shapes still allow the buildup of stress concentrations that reduce the effective life of the component. Further, known fillets may reduce engine efficiency due to drag forces and obstruction produced by the fillets. Consequently, there is a need for improved fillet shapes that further reduce stress concentrations, while also aerodynamically performing so to promote engine efficiency.

BRIEF DESCRIPTION OF THE INVENTION

The present application thus describes a rotor blade for a turbine of a gas turbine that includes an airfoil, a tip shroud, and a fillet formed about an intersection of the airfoil and the tip shroud. The fillet defines a fillet profile variable about the intersection for connecting the tip shroud and the airfoil and facilitating aerodynamic airflow. The fillet includes a pressure side fillet formed between the pressure side of the airfoil and the inner surface of the tip shroud, and a suction side fillet formed between the suction side of the airfoil and the inner surface of the tip shroud. The pressure side fillet includes a pressure side fillet profile substantially in accordance with points within a first set of points of X, Y and Z coordinate values in a Cartesian coordinate system, as set forth in Table I, where X, Y and Z are distances in inches from an origin and, when the points within the first set of points are connected by smooth, continuing arcs, the points within the first set of points define the pressure side fillet profile of the pressure side fillet. The first set of points includes each of the points between and including point 1 and point 50 of each reference plane between and including a reference plane H and a reference plane W, as set forth in Table I.

The present application further describes a rotor blade for a turbine of a gas turbine that includes an airfoil, a tip shroud, and a fillet formed about an intersection of the airfoil and the tip shroud. The fillet defines a fillet profile variable about the intersection for connecting the tip shroud and the airfoil and facilitating aerodynamic airflow. The fillet includes a pressure side fillet formed between the pressure side of the airfoil and the inner surface of the tip shroud, and a suction side fillet formed between the suction side of the airfoil and the inner surface of the tip shroud. The suction side fillet includes a suction side fillet profile substantially in accordance with points within a first set of points of X, Y and Z coordinate values in a Cartesian coordinate system, as set forth in Table II, where X, Y and Z are distances in inches from an origin and, when the points within the first set of points are connected by smooth, continuing arcs, the points within the first set of points define the suction side fillet profile of the suction side fillet. The first set of points includes each of the points between and including point 1 and point 50 of each reference plane between and including a reference plane H and a reference plane W, as set forth in Table I.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

A tip shroud, including a fillet, may be formed integrally with the turbine rotor blade at the radially outer end of an airfoil. The tip shroud generally provides a surface area that covers a tip of the airfoil. During operation, the tip shroud engages, at opposite ends, the tip shrouds of the circumferentially-adjacent rotor blades such that a generally annular ring or shroud is formed that substantially circumscribes a hot gas path. This annular ring contains the expanding combustion to improve engine efficiency. The fillet joins the tip shroud to the airfoil and, thereby, provides support to the tip shroud to prevent it from dislodging from the airfoil during operation.

Generally, in terms of engine performance, it is desirable to have relatively large tip shrouds that overhang both the pressure side and suction side of the outer radial tip of the airfoil. With regard to aerodynamic performance, however, it is advantageous for tip shroud fillets to remain as small and streamlined as possible. Given these competing interests—i.e., that tip shrouds be large enough to divert the greatest possible amount of working fluid over the airfoils, while the fillets remain small and streamlined to promote aerodynamic efficiency—it should be appreciated that the design of tip shrouds and the fillets that support them is a rigorous and highly specialized undertaking. Successful designs effectively balance the high stresses caused on each side of the airfoil by the overhanging tip shroud mass and, in so doing, may materially extend the life of the component, enable larger tip shrouds, and/or reduce fillet size for improved aerodynamic performance. As will be seen, the present application discloses fillet designs that are specifically adapted for achieving these objectives. That is, the presently disclosed fillets—which also may be referred to herein as the "present invention" or "present fillets"—may be employed to reduce and redistribute mass in the fillet region so that the fillet remains streamlined for aerodynamic performance, while still providing a structural configuration that further reduces stress concentrations and supports larger tip shrouds without sacrificing lifespan.

Figure 1:
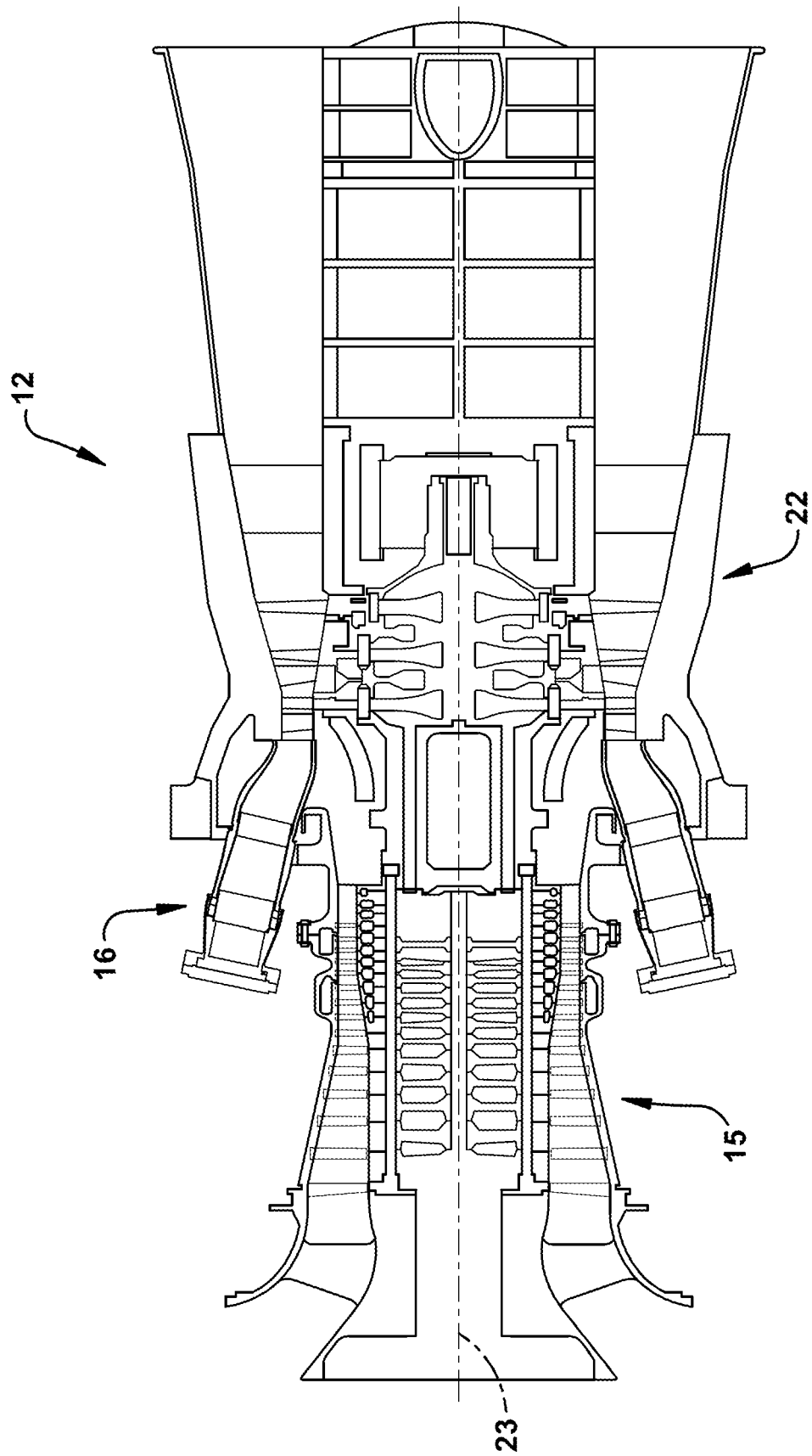
FIG. 1 illustrates a schematic view of an exemplary gas turbine engine.

For background purposes, FIG. 1 is a schematic illustration of an exemplary gas turbine engine 12 that includes a compressor 15, a combustor 16, and a turbine 22 extending therethrough from an intake side to an exhaust side, all coupled in a serial flow arrangement. Engine 12 includes a centerline axis 23 and a hot gas path is defined from intake side to exhaust side. In operation, air flows into the intake side and is routed to compressor 15. Compressed air is channeled from compressor 15 to combustor 16, wherein it is mixed with a fuel and ignited to generate combustion gases. The combustion gases are channeled via the hot gas path from combustor 16 towards turbine 22, where turbine 22 converts the heat energy into mechanical energy to power compressor 15 and/or another load, such as a generator (not shown).

Figure 2:
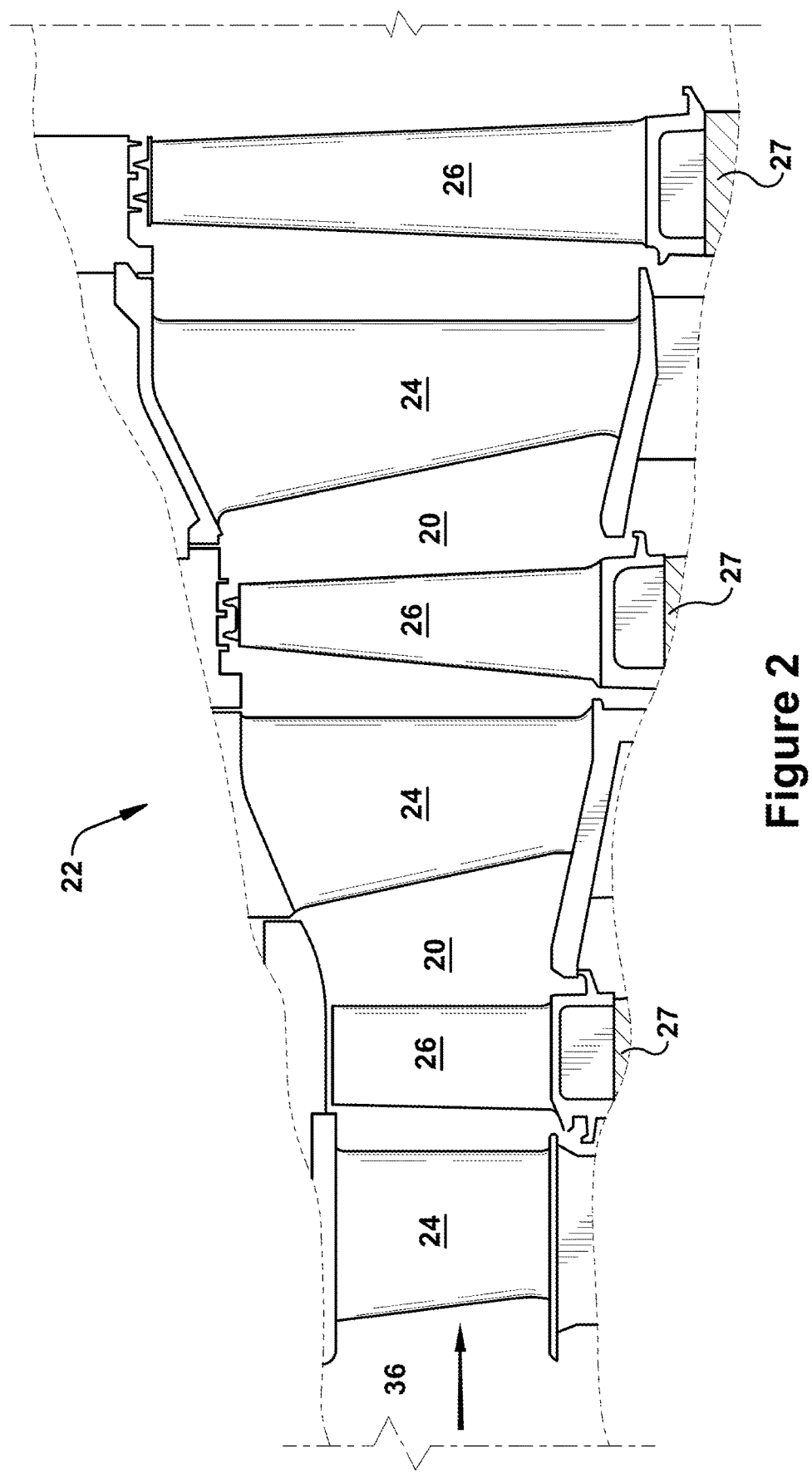
FIG. 2 illustrates a schematic representation of an exemplary hot gas path a may be defined through a gas turbine engine.

FIG. 2 is a schematic representation of an exemplary hot gas path 20 defined in multiple stages of turbine 22 used in gas turbine engine 12. Three stages are illustrated, each of which includes a row of vanes or nozzles 24 and a row of buckets or rotor blades 26. Each of the rows of nozzles 24 include a plurality of nozzles 24 circumferentially-spaced one from the other about axis 23 (shown in FIG. 1). Each of the rows of rotor blades 26 include a plurality of rotor blades 26 circumferentially-spaced about a rotor disk 27 for rotation about axis 23. It should be appreciated that the nozzles 24 and rotor blades 26 are each positioned in hot gas path 20 of turbine 22. The direction of gas flow through hot gas path 20 is indicated by an arrow 36.

Figure 3:
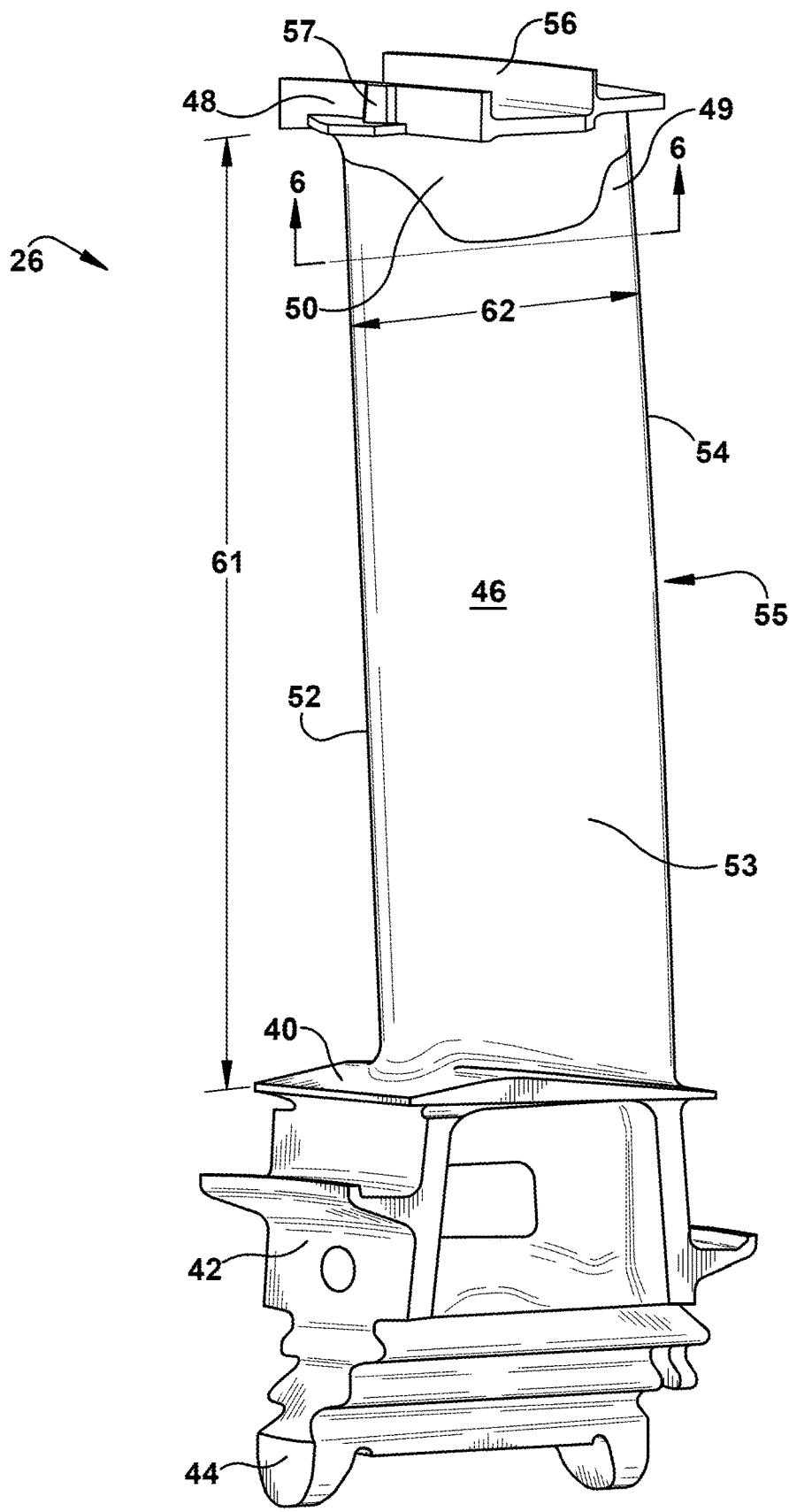
FIG. 3 illustrates a perspective view of an exemplary tip shrouded turbine rotor blade in accordance with embodiments of the present invention.

FIG. 3 illustrates a perspective view of a rotor blade 26 in accordance with an exemplary embodiment of the present invention. As shown, rotor blade 26 may include a platform 40, a shank 42, a dovetail 44, a tip shroud 48, and a fillet 50. Dovetail 44 is used to couple rotor blade 26 to a rotor disk 27 (as shown in FIG. 2). Rotor blade 26 also may include an airfoil 46 that extends radially between platform 40 and tip shroud 48. Airfoil 46 has a leading edge 52, a trailing edge 54, a pressure side 53, and an opposite suction side 55. Pressure side 53 extends from leading edge 52 to trailing edge 54 and forms a concave exterior surface of airfoil 46. Suction side 55 extends from leading edge 52 to trailing edge 54 and forms a convex exterior surface of airfoil 46. Fillet 50 is defined and extends between airfoil 46 and tip shroud 48. More specifically, fillet 50 extends within the intersection formed between an outer radial tip 49 of airfoil 46 and tip shroud 48 and, thereby, structurally supports tip shroud 48. Tip shroud 48 may include seal rails 56 that extend circumferentially and a cutter tooth 57 that facilitates sealing with a stationary casing. During operation, hot combustion gases flow over both pressure side 53 and suction side 55 of airfoil 46 to induce rotation of rotor blade 26. Specifically, the flow of the hot gases over pressure side 53 and suction side 55 of airfoil 46 induces rotor blades 26 to rotate on each respective rotor disk 27 such that the energy of the expanding hot gases is converted into mechanical energy.

Figure 4:
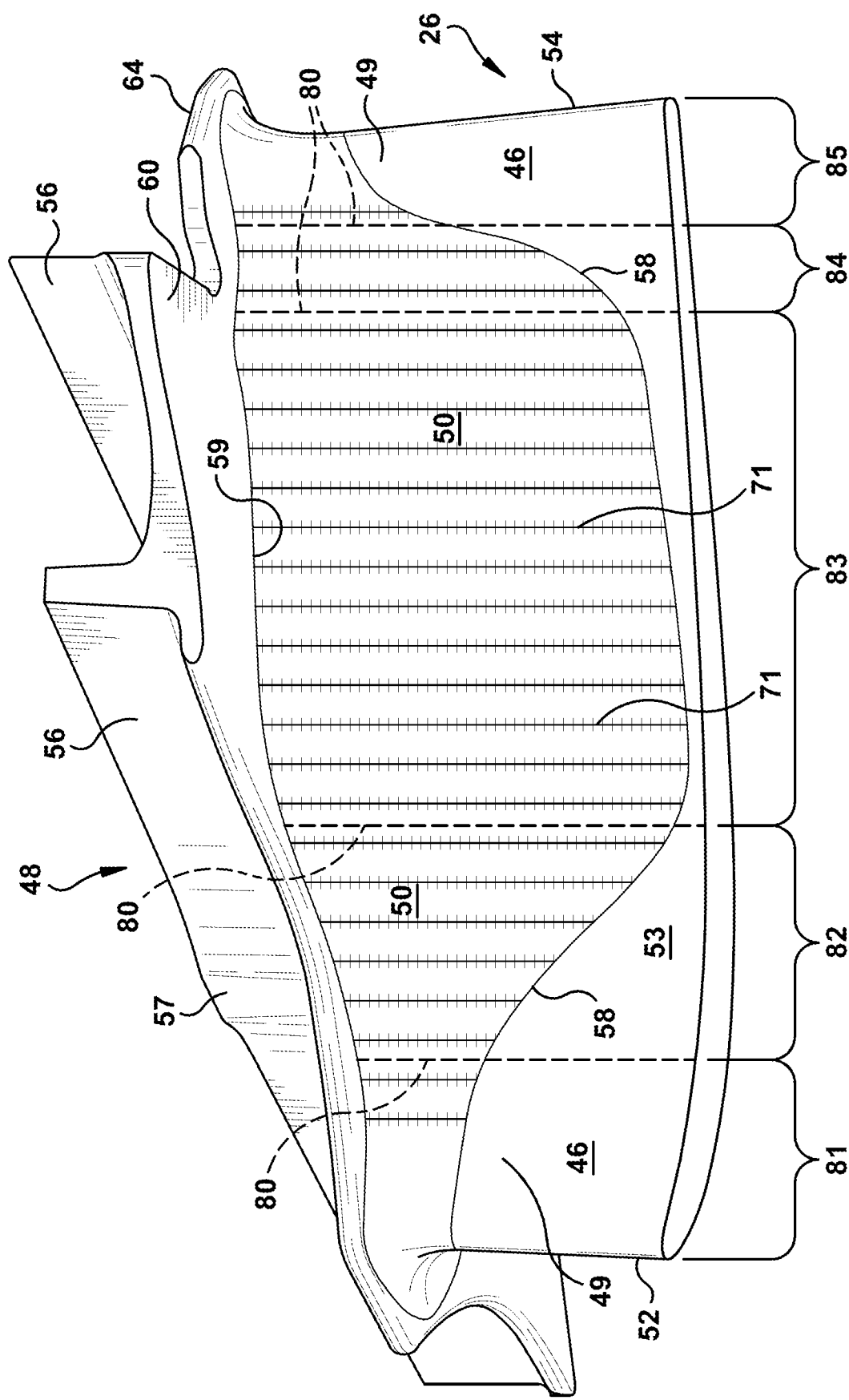
FIG. 4 illustrates a perspective view of an exemplary pressure side fillet in accordance with embodiments of the present invention.
Figure 5:
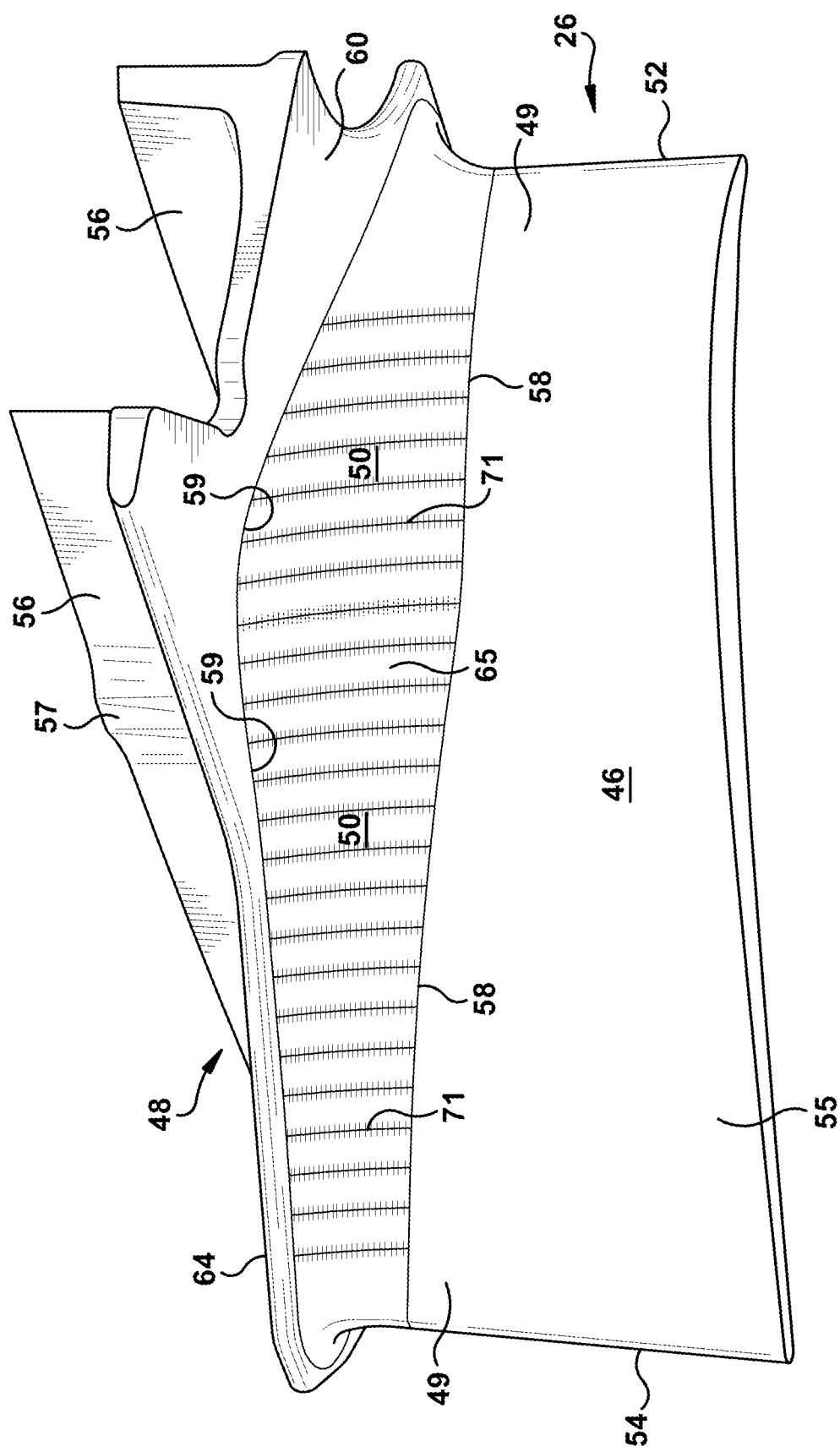
FIG. 5 illustrates a perspective view of an exemplary suction side fillet in accordance with embodiments of the present invention.

As indicated in FIG. 3, airfoil 46 may be further defined: via an airfoil height 61, which represents the overall height of airfoil 46 (i.e., the distance between platform 40 and tip shroud 48); and an airfoil width 62, which represents the overall width of airfoil 46 (i.e., the distance between leading edge 52 and trailing edge 54). As explained below, one method of defining present fillet 50 is to define widthwise sections or ranges within airfoil width 62 and, for each of those, define a height of fillet 50 (or a range of heights within which the height of fillet 50 is maintained). As used herein, the height of fillet 50 represents the radially distance that fillet 50 extends from the outer most tip of airfoil 46 toward platform 40. For descriptive purposes herein, the outer most tip of airfoil 46 is considered to be coplanar with a radially inner surface 60 of tip shroud 48. (As shown in FIGS. 4 and 5, inner surface 60 of the tip shroud 48 is opposite of outer surface 64.) Further, for descriptive purposes, the height of fillet 50 may be expressed herein relative to the overall height of airfoil 46, for example, as a percentage of airfoil height 61.

Figure 6:
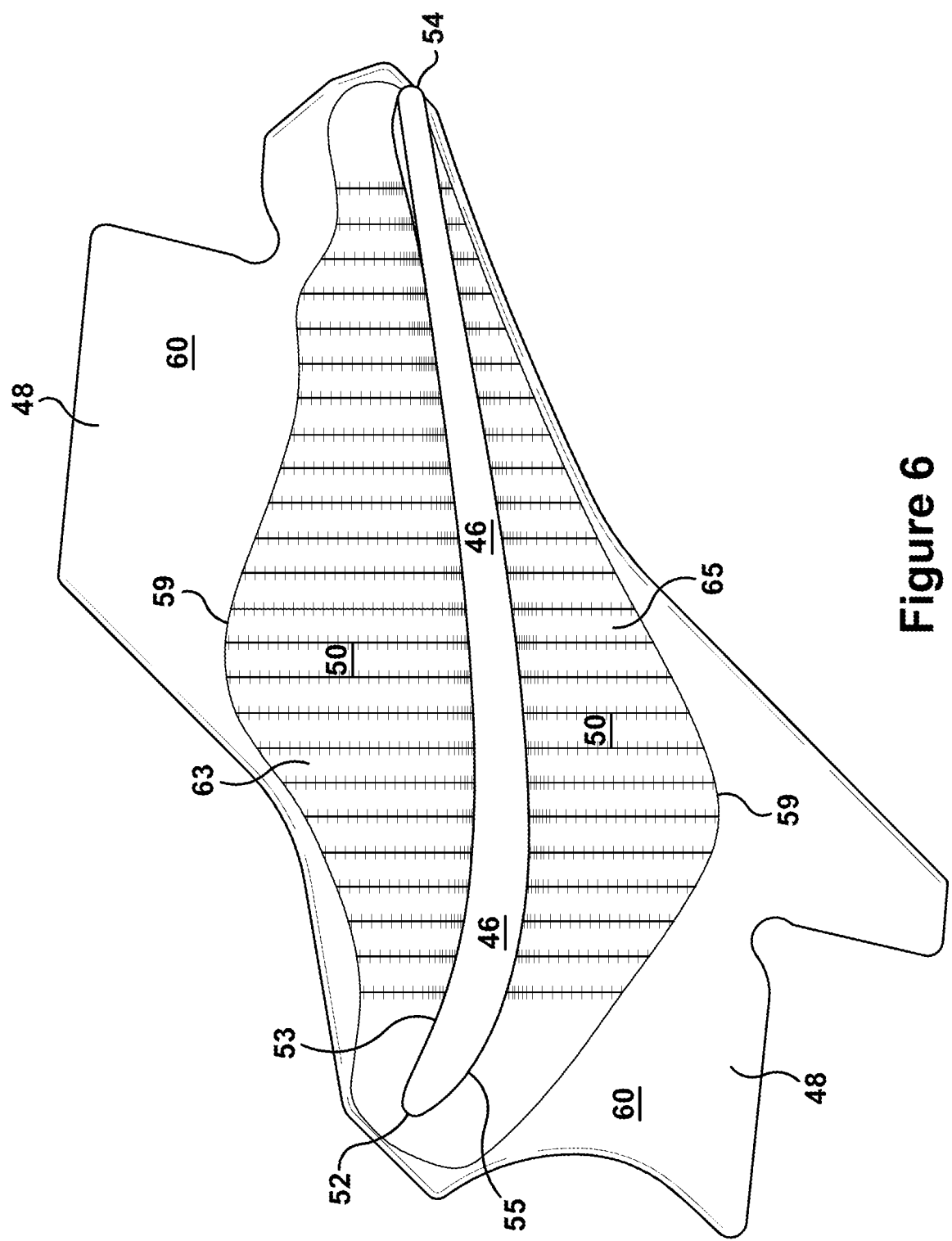
FIG. 6 is a radially outward cross-sectional view of an airfoil profile section taken along line 6-6 of FIG. 3 that illustrates pressure side and suction side fillets in accordance with embodiments of the present invention.

Turning now to FIGS. 4 through 6, more detailed illustrations of present fillet 50 are provided. (Note that FIGS. 4 through 9 are not drawn to scale and are provided solely to demonstrate a methodology for locating particular points, with the actual locations of those points being provided with specificity in Tables I and II. Accordingly, if there are discrepancies between apparent point locations as depicted in the figures and actual locations described within Tables I and II, it should be understood that, in all cases, the locations of the points as provide in Tables I and II is controlling and determinative, particularly with respect to references to points made within the appended claims.) FIG. 4 shows a perspective view of fillet 50 on pressure side 53 of airfoil 46. Fillet 50 on pressure side 53 may be more specifically referred to herein as a "pressure side fillet 63". FIG. 5 illustrates a perspective view of fillet 50 on suction side 55 of airfoil 46. Fillet 50 on suction side 55 may be more specifically referred to herein as a "suction side fillet 65". An outer edge of fillet 50 is formed at an intersection between fillet 50 and airfoil 46 on both pressure side 53 and suction side 55, which is depicted by an intersection line 58. An outer edge of fillet 50 is also formed at an intersection between fillet 50 and tip shroud 48, which is depicted by an intersection line 59. Intersection line 59 is shown most clearly in FIG. 6, which provides a cross-sectional view of a portion of airfoil 46 and fillet 50 taken along line 6-6 of FIG. 3. Additional several reference lines 71—as well as particularly located points on those reference lines 71 that will be used to define profiles of the present fillet 50—are also shown in FIGS. 4-6. As will be discussed further with regard to FIGS. 7 through 9, the reference lines 71 each represents the intersection of a reference plane (for example, reference plane A through Z) with the surface of pressure and suction side fillets 63,65.

According to the present invention, as will be seen, fillet 50 is configured to extend over much of inner surface 60 of tip shroud 48, as shown by intersection line 59. Fillet 50 is configured also to enclose and cover tip 49 of airfoil 46, as shown by intersection line 58. Further, between intersection line 58 and intersection line 59, fillet 50 of the present invention has a thickness that is varied so to form specific surface contours, configurations, or profiles that enhance aerodynamic and structural performance. As should be understood, the precise configuration of present fillet 50 is based on an optimization in which several competing design criterium—and the complex relationships existing between those criterium—are taken into account and balanced to produce a result that optimizes performance. Fillet 50 of the present invention has shown in repeated tests to be superior to other known fillet configurations, particularly when combined with a tip shroud having a particular profile. For example, the configuration of present fillet 50 is streamlined for aerodynamic performance, while also structurally supporting tip shroud 48 so to optimally spread and balance operational stresses in a manner that materially extends the usable lifespan of the rotor blade.

Figure 7:
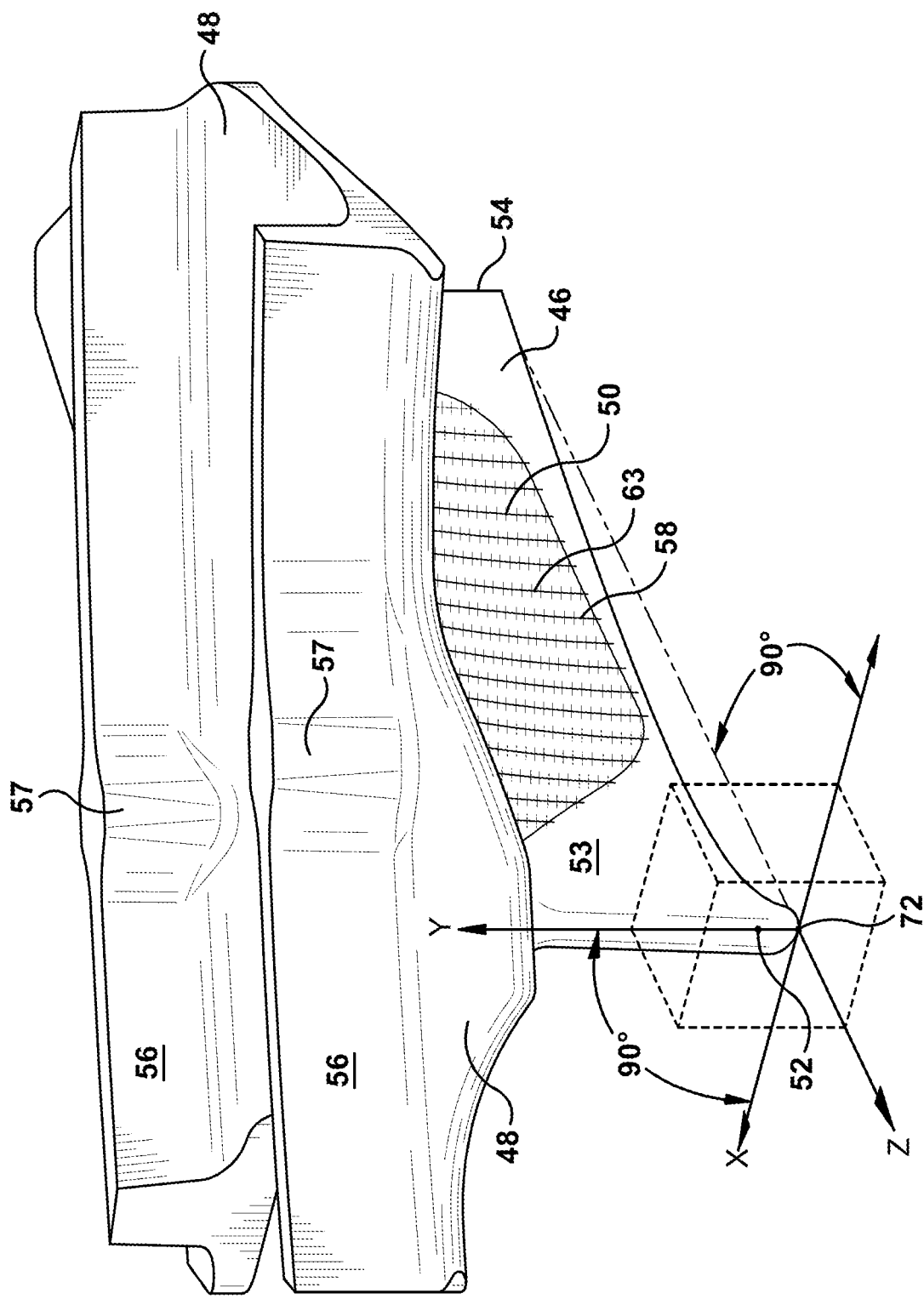
FIG. 7 is a perspective view of a tip shrouded airfoil demonstrating an X, Y, and Z coordinate system that will be used herein to describe fillet profiles by defining a number of discrete points occurring thereon.
Figure 8:
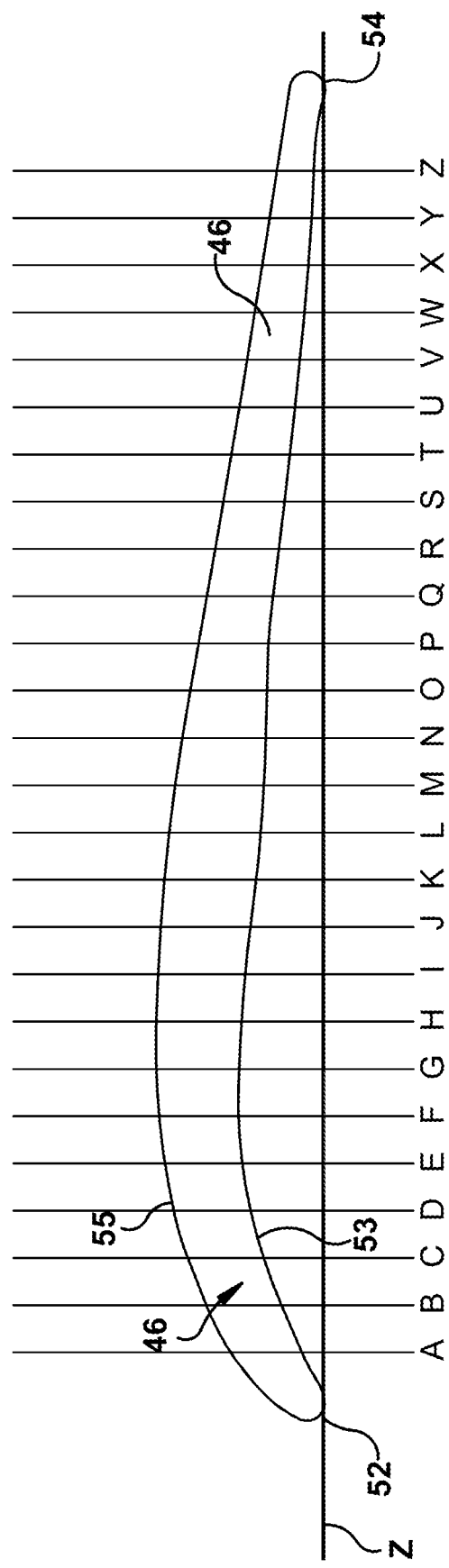
FIG. 8 is a schematic cross-sectional view of an airfoil demonstrating reference planes related to the X, Y, and Z coordinate system of FIG. 7.
Figure 9:
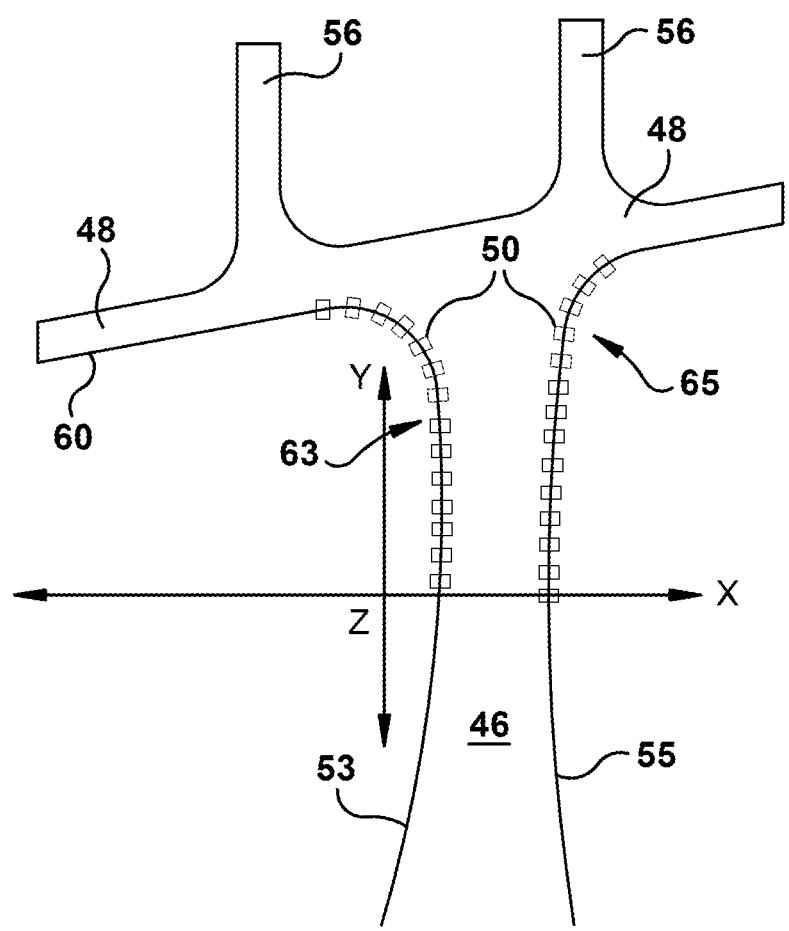
FIG. 9 is a cross-sectional view of a fillet along an exemplary one of the reference planes shown in FIG. 8.

Referring now to FIGS. 7 through 9, an X, Y and Z coordinate system is illustrated, which, as provided below, will be used to define the specific configurations of present fillet 50. That is, fillet 50 of the present invention will be described by defining one or more of its surfaces or profiles, where those profiles will be described by defining a number of discrete points that occur on them via the X, Y and Z coordinate system depicted in FIGS. 7 through 9. As will be appreciated, in FIG. 7, the general orientation of the X, Y and Z coordinate system is shown with respect to rotor blade 26. As indicated, the Z-axis is oriented along a chord of airfoil 46 of rotor blade 26. Thus, the Z-axis extends horizontally between an intersection with leading edge 52 and trailing edge 54 of airfoil 46. In regard to the Y-axis, it extends vertically in the lengthwise direction of airfoil 46. Finally, the X-axis extends perpendicular to both the X-axis and Y-axis, as shown. The X, Y, and Z axes intersect at an origin 72.

Exemplary points occurring on the surfaces or profiles of present fillet 50—including points on both the pressure side fillet 63 and suction side fillet 65—are defined by X, Y, and Z coordinates as set forth in Tables I and II below. It should be understood that exemplary embodiments of fillet 50 may include: the substantial entirety of the fillet profile of the illustrated fillet 50, as may be described by all of the point included in Tables I and II; or particular surface areas or profiles defined within the illustrated fillet 50 on either or both the pressure and suction side of the fillet 50, as may be defined by a set of points that represents a subset of the points included within Tables I and II. The points listed in Tables I and II are arranged according to several cross-sectional reference planes, reference planes A through Z, which, as shown most clearly in FIG. 8, intersect fillet 50 on both the pressure side and suction side. Table I includes points occurring on the pressure side of fillet 50, and Table II includes points occurring on the suction side of fillet 50, with each table arranging points in relation to the reference planes. The reference planes A through Z are defined at predetermined intervals along the Z-axis between leading edge 52 and trailing edge 54 of the airfoil 46. The reference planes A through Z are each parallel and oriented normal to the Z-axis. Further, Tables I and II include one-hundred (100) points at each of the reference planes, with fifty (50) of those points occurring on the pressure side fillet 63 and fifty (50) occurring on the suction side fillet 65.

Thus, as shown most clearly in FIG. 9, at each location on the Z-axis of one of the reference planes A through Z, the profile of the fillet of the present invention is defined on both the pressure side and suction side in Tables I and II, respectively, by points defined by X-axis and Y-axis dimensions. Thus, as should be understood, each point represents discreet locations at which one of the reference planes intersects the surfaces of either the pressure side fillet 63 or suction side fillet 65. As will be appreciated, given this arrangement, the Z-values given in Tables I and II represent the location of the reference plane on the Z-axis. The X-values given in Tables I and II represent the distance within the applicable reference plane that a given point resides from the X-axis. And, the Y-values given in Tables I and II represent the distance within the applicable reference plane that a given point resides from the Y-axis.

The various points defined by the values of Tables I and II, in whole or in part, may be connected, such as by smooth curves, to define exemplary surface configurations or contours of fillets in accordance with embodiments of the present invention. Such surface configurations or contours of the present fillet may be referred to herein as "fillet profiles". Further, it should also be understood that the values for determining the fillet profiles of fillet 50 given in Tables I and II are for a nominal fillet. Thus, +/− typical manufacturing tolerances, including any coating thicknesses, are additive to the fillet surface as determined from the Tables I and II. Accordingly, pursuant to exemplary embodiments, a distance of +/−0.05 inches in a direction normal to any surface location described in Tables I and II defines a fillet profile envelope in accordance with present fillet 50, i.e., a range of variation between an ideal configuration of present fillet 50, as given by the Tables I and II above, and a range of variation in fillet 50 configuration at nominal cold or room temperature. Moreover, while Tables I and II defines a surface profile for fillet 50 using a particular number of points, it should be understood that any number of X, Y, and Z locations may be used to define this profile. Thus, the fillet profiles defined by the values of Tables I and II embrace fillet profiles intermediate to the given X, Y, and Z locations, as well as those defined using fewer X, Y, and Z locations than those included in Tables I and II. Further, it will be appreciated that present fillet 50 defined in Tables I and II may be proportionally scaled up or down for similar use with tip shrouded airfoils of varying sizes, and that such alternative embodiments are within the scope of the present invention.

TABLE I

Pressure Side Fillet Profile

| Ref. Plane | Point No. | X | Y | Z |
|---|---|---|---|---|
| A | 1 | −0.0374 | 0.8444 | −0.1551 |
| A | 2 | −0.0373 | 0.8518 | −0.1551 |
| A | 3 | −0.0368 | 0.8592 | −0.1551 |
| A | 4 | −0.0358 | 0.8666 | −0.1551 |
| A | 5 | −0.0346 | 0.8738 | −0.1551 |
| A | 6 | −0.0330 | 0.8810 | −0.1551 |
| A | 7 | −0.0312 | 0.8881 | −0.1551 |
| A | 8 | −0.0293 | 0.8952 | −0.1551 |
| A | 9 | −0.0274 | 0.9023 | −0.1551 |
| A | 10 | −0.0253 | 0.9094 | −0.1551 |
| A | 11 | −0.0231 | 0.9164 | −0.1551 |
| A | 12 | −0.0206 | 0.9233 | −0.1551 |
| A | 13 | −0.0178 | 0.9302 | −0.1551 |
| A | 14 | −0.0146 | 0.9368 | −0.1551 |
| A | 15 | −0.0111 | 0.9432 | −0.1551 |
| A | 16 | −0.0072 | 0.9494 | −0.1551 |
| A | 17 | −0.0029 | 0.9553 | −0.1551 |
| A | 18 | 0.0017 | 0.9609 | −0.1551 |
| A | 19 | 0.0067 | 0.9664 | −0.1551 |
| A | 20 | 0.0120 | 0.9716 | −0.1551 |
| A | 21 | 0.0174 | 0.9765 | −0.1551 |

TABLE I-continued

Pressure Side Fillet Profile

| Ref. Plane | Point No. | X | Y | Z |
|---|---|---|---|---|
| A | 22 | 0.0230 | 0.9812 | −0.1551 |
| A | 23 | 0.0287 | 0.9858 | −0.1551 |
| A | 24 | 0.0346 | 0.9901 | −0.1551 |
| A | 25 | 0.0406 | 0.9943 | −0.1551 |
| A | 26 | 0.0468 | 0.9983 | −0.1551 |
| A | 27 | 0.0531 | 1.0021 | −0.1551 |
| A | 28 | 0.0594 | 1.0058 | −0.1551 |
| A | 29 | 0.0659 | 1.0094 | −0.1551 |
| A | 30 | 0.0725 | 1.0127 | −0.1551 |
| A | 31 | 0.0791 | 1.0159 | −0.1551 |
| A | 32 | 0.0858 | 1.0189 | −0.1551 |
| A | 33 | 0.0926 | 1.0217 | −0.1551 |
| A | 34 | 0.0995 | 1.0244 | −0.1551 |
| A | 35 | 0.1064 | 1.0270 | −0.1551 |
| A | 36 | 0.1133 | 1.0294 | −0.1551 |
| A | 37 | 0.1203 | 1.0317 | −0.1551 |
| A | 38 | 0.1274 | 1.0338 | −0.1551 |
| A | 39 | 0.1345 | 1.0358 | −0.1551 |
| A | 40 | 0.1416 | 1.0376 | −0.1551 |
| A | 41 | 0.1488 | 1.0393 | −0.1551 |
| A | 42 | 0.1560 | 1.0408 | −0.1551 |
| A | 43 | 0.1633 | 1.0421 | −0.1551 |
| A | 44 | 0.1705 | 1.0433 | −0.1551 |
| A | 45 | 0.1778 | 1.0444 | −0.1551 |
| A | 46 | 0.1851 | 1.0453 | −0.1551 |
| A | 47 | 0.1925 | 1.0460 | −0.1551 |
| A | 48 | 0.1998 | 1.0466 | −0.1551 |
| A | 49 | 0.2071 | 1.0471 | −0.1551 |
| A | 50 | 0.2145 | 1.0473 | −0.1551 |
| B | 1 | −0.1015 | 0.8593 | −0.2932 |
| B | 2 | −0.1014 | 0.8673 | −0.2932 |
| B | 3 | −0.1008 | 0.8753 | −0.2932 |
| B | 4 | −0.0997 | 0.8832 | −0.2932 |
| B | 5 | −0.0982 | 0.8910 | −0.2932 |
| B | 6 | −0.0961 | 0.8988 | −0.2932 |
| B | 7 | −0.0936 | 0.9064 | −0.2932 |
| B | 8 | −0.0906 | 0.9138 | −0.2932 |
| B | 9 | −0.0872 | 0.9210 | −0.2932 |
| B | 10 | −0.0834 | 0.9281 | −0.2932 |
| B | 11 | −0.0792 | 0.9349 | −0.2932 |
| B | 12 | −0.0747 | 0.9416 | −0.2932 |
| B | 13 | −0.0700 | 0.9480 | −0.2932 |
| B | 14 | −0.0649 | 0.9543 | −0.2932 |
| B | 15 | −0.0596 | 0.9603 | −0.2932 |
| B | 16 | −0.0541 | 0.9662 | −0.2932 |
| B | 17 | −0.0484 | 0.9718 | −0.2932 |
| B | 18 | −0.0426 | 0.9772 | −0.2932 |
| B | 19 | −0.0365 | 0.9825 | −0.2932 |
| B | 20 | −0.0303 | 0.9875 | −0.2932 |
| B | 21 | −0.0239 | 0.9924 | −0.2932 |
| B | 22 | −0.0173 | 0.9970 | −0.2932 |
| B | 23 | −0.0106 | 1.0014 | −0.2932 |
| B | 24 | −0.0038 | 1.0056 | −0.2932 |
| B | 25 | 0.0031 | 1.0096 | −0.2932 |
| B | 26 | 0.0102 | 1.0134 | −0.2932 |
| B | 27 | 0.0174 | 1.0169 | −0.2932 |
| B | 28 | 0.0246 | 1.0203 | −0.2932 |
| B | 29 | 0.0320 | 1.0235 | −0.2932 |
| B | 30 | 0.0395 | 1.0264 | −0.2932 |
| B | 31 | 0.0470 | 1.0292 | −0.2932 |
| B | 32 | 0.0546 | 1.0317 | −0.2932 |
| B | 33 | 0.0622 | 1.0341 | −0.2932 |
| B | 34 | 0.0700 | 1.0363 | −0.2932 |
| B | 35 | 0.0777 | 1.0383 | −0.2932 |
| B | 36 | 0.0855 | 1.0401 | −0.2932 |
| B | 37 | 0.0934 | 1.0417 | −0.2932 |
| B | 38 | 0.1012 | 1.0432 | −0.2932 |
| B | 39 | 0.1092 | 1.0445 | −0.2932 |
| B | 40 | 0.1171 | 1.0457 | −0.2932 |
| B | 41 | 0.1250 | 1.0467 | −0.2932 |
| B | 42 | 0.1330 | 1.0475 | −0.2932 |
| B | 43 | 0.1410 | 1.0482 | −0.2932 |
| B | 44 | 0.1490 | 1.0488 | −0.2932 |
| B | 45 | 0.1570 | 1.0492 | −0.2932 |
| B | 46 | 0.1650 | 1.0496 | −0.2932 |
| B | 47 | 0.1730 | 1.0498 | −0.2932 |
| B | 48 | 0.1810 | 1.0500 | −0.2932 |
| B | 49 | 0.1970 | 1.0500 | −0.2932 |
| B | 50 | 0.1890 | 1.0501 | −0.2932 |
| C | 1 | −0.1563 | 0.8670 | −0.4312 |
| C | 2 | −0.1562 | 0.8758 | −0.4312 |
| C | 3 | −0.1556 | 0.8847 | −0.4312 |
| C | 4 | −0.1544 | 0.8934 | −0.4312 |
| C | 5 | −0.1526 | 0.9020 | −0.4312 |
| C | 6 | −0.1502 | 0.9105 | −0.4312 |
| C | 7 | −0.1471 | 0.9187 | −0.4312 |
| C | 8 | −0.1434 | 0.9267 | −0.4312 |
| C | 9 | −0.1389 | 0.9343 | −0.4312 |
| C | 10 | −0.1339 | 0.9415 | −0.4312 |
| C | 11 | −0.1283 | 0.9483 | −0.4312 |
| C | 12 | −0.1223 | 0.9547 | −0.4312 |
| C | 13 | −0.1160 | 0.9609 | −0.4312 |
| C | 14 | −0.1094 | 0.9668 | −0.4312 |
| C | 15 | −0.1027 | 0.9726 | −0.4312 |
| C | 16 | −0.0959 | 0.9782 | −0.4312 |
| C | 17 | −0.0891 | 0.9837 | −0.4312 |
| C | 18 | −0.0821 | 0.9890 | −0.4312 |
| C | 19 | −0.0750 | 0.9943 | −0.4312 |
| C | 20 | −0.0678 | 0.9994 | −0.4312 |
| C | 21 | −0.0606 | 1.0044 | −0.4312 |
| C | 22 | −0.0532 | 1.0091 | −0.4312 |
| C | 23 | −0.0457 | 1.0137 | −0.4312 |
| C | 24 | −0.0382 | 1.0180 | −0.4312 |
| C | 25 | −0.0305 | 1.0222 | −0.4312 |
| C | 26 | −0.0227 | 1.0261 | −0.4312 |
| C | 27 | −0.0147 | 1.0297 | −0.4312 |
| C | 28 | −0.0067 | 1.0332 | −0.4312 |
| C | 29 | 0.0015 | 1.0364 | −0.4312 |
| C | 30 | 0.0098 | 1.0394 | −0.4312 |
| C | 31 | 0.0181 | 1.0422 | −0.4312 |
| C | 32 | 0.0266 | 1.0447 | −0.4312 |
| C | 33 | 0.0351 | 1.0470 | −0.4312 |
| C | 34 | 0.0437 | 1.0491 | −0.4312 |
| C | 35 | 0.0523 | 1.0510 | −0.4312 |
| C | 36 | 0.0610 | 1.0526 | −0.4312 |
| C | 37 | 0.0697 | 1.0539 | −0.4312 |
| C | 38 | 0.0785 | 1.0551 | −0.4312 |
| C | 39 | 0.0873 | 1.0560 | −0.4312 |
| C | 40 | 0.1844 | 1.0564 | −0.4312 |
| C | 41 | 0.0961 | 1.0567 | −0.4312 |
| C | 42 | 0.1755 | 1.0568 | −0.4312 |
| C | 43 | 0.1667 | 1.0571 | −0.4312 |
| C | 44 | 0.1049 | 1.0572 | −0.4312 |
| C | 45 | 0.1579 | 1.0574 | −0.4312 |
| C | 46 | 0.1491 | 1.0576 | −0.4312 |
| C | 47 | 0.1137 | 1.0576 | −0.4312 |
| C | 48 | 0.1226 | 1.0578 | −0.4312 |
| C | 49 | 0.1314 | 1.0578 | −0.4312 |
| C | 50 | 0.1402 | 1.0578 | −0.4312 |
| D | 1 | −0.1974 | 0.8569 | −0.5693 |
| D | 2 | −0.1972 | 0.8668 | −0.5693 |
| D | 3 | −0.1963 | 0.8766 | −0.5693 |
| D | 4 | −0.1947 | 0.8864 | −0.5693 |
| D | 5 | −0.1923 | 0.8960 | −0.5693 |
| D | 6 | −0.1892 | 0.9054 | −0.5693 |
| D | 7 | −0.1855 | 0.9146 | −0.5693 |
| D | 8 | −0.1811 | 0.9234 | −0.5693 |
| D | 9 | −0.1761 | 0.9319 | −0.5693 |
| D | 10 | −0.1705 | 0.9401 | −0.5693 |
| D | 11 | −0.1643 | 0.9479 | −0.5693 |
| D | 12 | −0.1577 | 0.9553 | −0.5693 |
| D | 13 | −0.1508 | 0.9623 | −0.5693 |
| D | 14 | −0.1434 | 0.9690 | −0.5693 |
| D | 15 | −0.1359 | 0.9754 | −0.5693 |
| D | 16 | −0.1281 | 0.9815 | −0.5693 |
| D | 17 | −0.1201 | 0.9873 | −0.5693 |
| D | 18 | −0.1119 | 0.9930 | −0.5693 |
| D | 19 | −0.1036 | 0.9984 | −0.5693 |
| D | 20 | −0.0952 | 1.0036 | −0.5693 |
| D | 21 | −0.0866 | 1.0086 | −0.5693 |

TABLE I-continued

Pressure Side Fillet Profile

| Ref. Plane | Point No. | X | Y | Z |
|---|---|---|---|---|
| D | 22 | −0.0780 | 1.0134 | −0.5693 |
| D | 23 | −0.0692 | 1.0181 | −0.5693 |
| D | 24 | −0.0604 | 1.0225 | −0.5693 |
| D | 25 | −0.0514 | 1.0267 | −0.5693 |
| D | 26 | −0.0423 | 1.0307 | −0.5693 |
| D | 27 | −0.0332 | 1.0345 | −0.5693 |
| D | 28 | −0.0240 | 1.0381 | −0.5693 |
| D | 29 | −0.0147 | 1.0415 | −0.5693 |
| D | 30 | −0.0053 | 1.0447 | −0.5693 |
| D | 31 | 0.0042 | 1.0477 | −0.5693 |
| D | 32 | 0.0137 | 1.0504 | −0.5693 |
| D | 33 | 0.0232 | 1.0530 | −0.5693 |
| D | 34 | 0.0328 | 1.0555 | −0.5693 |
| D | 35 | 0.0425 | 1.0577 | −0.5693 |
| D | 36 | 0.0522 | 1.0597 | −0.5693 |
| D | 37 | 0.0619 | 1.0615 | −0.5693 |
| D | 38 | 0.0717 | 1.0632 | −0.5693 |
| D | 39 | 0.0815 | 1.0646 | −0.5693 |
| D | 40 | 0.0913 | 1.0658 | −0.5693 |
| D | 41 | 0.1902 | 1.0667 | −0.5693 |
| D | 42 | 0.1012 | 1.0669 | −0.5693 |
| D | 43 | 0.1803 | 1.0674 | −0.5693 |
| D | 44 | 0.1110 | 1.0677 | −0.5693 |
| D | 45 | 0.1704 | 1.0680 | −0.5693 |
| D | 46 | 0.1209 | 1.0682 | −0.5693 |
| D | 47 | 0.1605 | 1.0684 | −0.5693 |
| D | 48 | 0.1308 | 1.0686 | −0.5693 |
| D | 49 | 0.1506 | 1.0687 | −0.5693 |
| D | 50 | 0.1407 | 1.0687 | −0.5693 |
| E | 1 | −0.2261 | 0.8149 | −0.7073 |
| E | 2 | −0.2258 | 0.8265 | −0.7073 |
| E | 3 | −0.2247 | 0.8382 | −0.7073 |
| E | 4 | −0.2227 | 0.8497 | −0.7073 |
| E | 5 | −0.2200 | 0.8611 | −0.7073 |
| E | 6 | −0.2165 | 0.8723 | −0.7073 |
| E | 7 | −0.2124 | 0.8833 | −0.7073 |
| E | 8 | −0.2077 | 0.8940 | −0.7073 |
| E | 9 | −0.2024 | 0.9045 | −0.7073 |
| E | 10 | −0.1966 | 0.9146 | −0.7073 |
| E | 11 | −0.1902 | 0.9245 | −0.7073 |
| E | 12 | −0.1834 | 0.9339 | −0.7073 |
| E | 13 | −0.1760 | 0.9431 | −0.7073 |
| E | 14 | −0.1683 | 0.9518 | −0.7073 |
| E | 15 | −0.1601 | 0.9602 | −0.7073 |
| E | 16 | −0.1516 | 0.9682 | −0.7073 |
| E | 17 | −0.1427 | 0.9759 | −0.7073 |
| E | 18 | −0.1335 | 0.9832 | −0.7073 |
| E | 19 | −0.1241 | 0.9901 | −0.7073 |
| E | 20 | −0.1144 | 0.9967 | −0.7073 |
| E | 21 | −0.1045 | 1.0030 | −0.7073 |
| E | 22 | −0.0944 | 1.0089 | −0.7073 |
| E | 23 | −0.0841 | 1.0144 | −0.7073 |
| E | 24 | −0.0736 | 1.0197 | −0.7073 |
| E | 25 | −0.0630 | 1.0246 | −0.7073 |
| E | 26 | −0.0523 | 1.0292 | −0.7073 |
| E | 27 | −0.0414 | 1.0335 | −0.7073 |
| E | 28 | −0.0304 | 1.0376 | −0.7073 |
| E | 29 | −0.0193 | 1.0414 | −0.7073 |
| E | 30 | −0.0082 | 1.0450 | −0.7073 |
| E | 31 | 0.0031 | 1.0484 | −0.7073 |
| E | 32 | 0.0143 | 1.0516 | −0.7073 |
| E | 33 | 0.0256 | 1.0546 | −0.7073 |
| E | 34 | 0.0370 | 1.0575 | −0.7073 |
| E | 35 | 0.0483 | 1.0603 | −0.7073 |
| E | 36 | 0.0597 | 1.0630 | −0.7073 |
| E | 37 | 0.0712 | 1.0655 | −0.7073 |
| E | 38 | 0.0826 | 1.0680 | −0.7073 |
| E | 39 | 0.0941 | 1.0703 | −0.7073 |
| E | 40 | 0.1056 | 1.0724 | −0.7073 |
| E | 41 | 0.1172 | 1.0744 | −0.7073 |
| E | 42 | 0.1288 | 1.0761 | −0.7073 |
| E | 43 | 0.1404 | 1.0777 | −0.7073 |
| E | 44 | 0.2221 | 1.0788 | −0.7073 |
| E | 45 | 0.1520 | 1.0789 | −0.7073 |
| E | 46 | 0.1637 | 1.0798 | −0.7073 |
| E | 47 | 0.2105 | 1.0798 | −0.7073 |
| E | 48 | 0.1988 | 1.0804 | −0.7073 |
| E | 49 | 0.1754 | 1.0804 | −0.7073 |
| E | 50 | 0.1871 | 1.0806 | −0.7073 |
| F | 1 | −0.2444 | 0.7237 | −0.8454 |
| F | 2 | −0.2443 | 0.7382 | −0.8454 |
| F | 3 | −0.2435 | 0.7526 | −0.8454 |
| F | 4 | −0.2420 | 0.7670 | −0.8454 |
| F | 5 | −0.2399 | 0.7813 | −0.8454 |
| F | 6 | −0.2371 | 0.7954 | −0.8454 |
| F | 7 | −0.2337 | 0.8095 | −0.8454 |
| F | 8 | −0.2298 | 0.8234 | −0.8454 |
| F | 9 | −0.2252 | 0.8371 | −0.8454 |
| F | 10 | −0.2202 | 0.8506 | −0.8454 |
| F | 11 | −0.2146 | 0.8640 | −0.8454 |
| F | 12 | −0.2084 | 0.8770 | −0.8454 |
| F | 13 | −0.2018 | 0.8899 | −0.8454 |
| F | 14 | −0.1946 | 0.9024 | −0.8454 |
| F | 15 | −0.1870 | 0.9147 | −0.8454 |
| F | 16 | −0.1788 | 0.9266 | −0.8454 |
| F | 17 | −0.1700 | 0.9381 | −0.8454 |
| F | 18 | −0.1607 | 0.9491 | −0.8454 |
| F | 19 | −0.1508 | 0.9596 | −0.8454 |
| F | 20 | −0.1403 | 0.9696 | −0.8454 |
| F | 21 | −0.1294 | 0.9789 | −0.8454 |
| F | 22 | −0.1179 | 0.9877 | −0.8454 |
| F | 23 | −0.1060 | 0.9960 | −0.8454 |
| F | 24 | −0.0938 | 1.0036 | −0.8454 |
| F | 25 | −0.0812 | 1.0108 | −0.8454 |
| F | 26 | −0.0684 | 1.0174 | −0.8454 |
| F | 27 | −0.0554 | 1.0237 | −0.8454 |
| F | 28 | −0.0422 | 1.0295 | −0.8454 |
| F | 29 | −0.0288 | 1.0349 | −0.8454 |
| F | 30 | −0.0153 | 1.0400 | −0.8454 |
| F | 31 | −0.0016 | 1.0448 | −0.8454 |
| F | 32 | 0.0121 | 1.0493 | −0.8454 |
| F | 33 | 0.0259 | 1.0535 | −0.8454 |
| F | 34 | 0.0398 | 1.0575 | −0.8454 |
| F | 35 | 0.0537 | 1.0613 | −0.8454 |
| F | 36 | 0.0677 | 1.0649 | −0.8454 |
| F | 37 | 0.0818 | 1.0684 | −0.8454 |
| F | 38 | 0.0958 | 1.0717 | −0.8454 |
| F | 39 | 0.1099 | 1.0750 | −0.8454 |
| F | 40 | 0.1240 | 1.0781 | −0.8454 |
| F | 41 | 0.1381 | 1.0812 | −0.8454 |
| F | 42 | 0.1523 | 1.0841 | −0.8454 |
| F | 43 | 0.1665 | 1.0868 | −0.8454 |
| F | 44 | 0.1807 | 1.0893 | −0.8454 |
| F | 45 | 0.1950 | 1.0914 | −0.8454 |
| F | 46 | 0.2670 | 1.0925 | −0.8454 |
| F | 47 | 0.2094 | 1.0930 | −0.8454 |
| F | 48 | 0.2526 | 1.0939 | −0.8454 |
| F | 49 | 0.2238 | 1.0941 | −0.8454 |
| F | 50 | 0.2382 | 1.0944 | −0.8454 |
| G | 1 | −0.2547 | 0.5936 | −0.9834 |
| G | 2 | −0.2549 | 0.6118 | −0.9834 |
| G | 3 | −0.2546 | 0.6301 | −0.9834 |
| G | 4 | −0.2539 | 0.6483 | −0.9834 |
| G | 5 | −0.2527 | 0.6664 | −0.9834 |
| G | 6 | −0.2511 | 0.6846 | −0.9834 |
| G | 7 | −0.2490 | 0.7027 | −0.9834 |
| G | 8 | −0.2465 | 0.7207 | −0.9834 |
| G | 9 | −0.2436 | 0.7387 | −0.9834 |
| G | 10 | −0.2403 | 0.7566 | −0.9834 |
| G | 11 | −0.2366 | 0.7744 | −0.9834 |
| G | 12 | −0.2324 | 0.7922 | −0.9834 |
| G | 13 | −0.2278 | 0.8098 | −0.9834 |
| G | 14 | −0.2225 | 0.8273 | −0.9834 |
| G | 15 | −0.2166 | 0.8445 | −0.9834 |
| G | 16 | −0.2098 | 0.8614 | −0.9834 |
| G | 17 | −0.2020 | 0.8778 | −0.9834 |
| G | 18 | −0.1932 | 0.8938 | −0.9834 |
| G | 19 | −0.1833 | 0.9091 | −0.9834 |
| G | 20 | −0.1724 | 0.9237 | −0.9834 |
| G | 21 | −0.1607 | 0.9376 | −0.9834 |

TABLE I-continued

Pressure Side Fillet Profile

| Ref. Plane | Point No. | X | Y | Z |
|---|---|---|---|---|
| G | 22 | −0.1482 | 0.9509 | −0.9834 |
| G | 23 | −0.1350 | 0.9635 | −0.9834 |
| G | 24 | −0.1213 | 0.9754 | −0.9834 |
| G | 25 | −0.1069 | 0.9866 | −0.9834 |
| G | 26 | −0.0920 | 0.9970 | −0.9834 |
| G | 27 | −0.0766 | 1.0067 | −0.9834 |
| G | 28 | −0.0607 | 1.0157 | −0.9834 |
| G | 29 | −0.0445 | 1.0239 | −0.9834 |
| G | 30 | −0.0279 | 1.0315 | −0.9834 |
| G | 31 | −0.0111 | 1.0386 | −0.9834 |
| G | 32 | 0.0059 | 1.0451 | −0.9834 |
| G | 33 | 0.0231 | 1.0512 | −0.9834 |
| G | 34 | 0.0403 | 1.0569 | −0.9834 |
| G | 35 | 0.0577 | 1.0623 | −0.9834 |
| G | 36 | 0.0752 | 1.0675 | −0.9834 |
| G | 37 | 0.0927 | 1.0725 | −0.9834 |
| G | 38 | 0.1103 | 1.0773 | −0.9834 |
| G | 39 | 0.1279 | 1.0820 | −0.9834 |
| G | 40 | 0.1455 | 1.0866 | −0.9834 |
| G | 41 | 0.1632 | 1.0911 | −0.9834 |
| G | 42 | 0.1809 | 1.0953 | −0.9834 |
| G | 43 | 0.1987 | 1.0991 | −0.9834 |
| G | 44 | 0.2166 | 1.1025 | −0.9834 |
| G | 45 | 0.2346 | 1.1054 | −0.9834 |
| G | 46 | 0.3254 | 1.1059 | −0.9834 |
| G | 47 | 0.2527 | 1.1074 | −0.9834 |
| G | 48 | 0.3073 | 1.1080 | −0.9834 |
| G | 49 | 0.2709 | 1.1087 | −0.9834 |
| G | 50 | 0.2891 | 1.1089 | −0.9834 |
| H | 1 | −0.2587 | 0.4362 | −1.1215 |
| H | 2 | −0.2590 | 0.4589 | −1.1215 |
| H | 3 | −0.2591 | 0.4816 | −1.1215 |
| H | 4 | −0.2590 | 0.5043 | −1.1215 |
| H | 5 | −0.2586 | 0.5270 | −1.1215 |
| H | 6 | −0.2579 | 0.5497 | −1.1215 |
| H | 7 | −0.2569 | 0.5723 | −1.1215 |
| H | 8 | −0.2556 | 0.5950 | −1.1215 |
| H | 9 | −0.2540 | 0.6176 | −1.1215 |
| H | 10 | −0.2521 | 0.6403 | −1.1215 |
| H | 11 | −0.2499 | 0.6628 | −1.1215 |
| H | 12 | −0.2474 | 0.6854 | −1.1215 |
| H | 13 | −0.2443 | 0.7079 | −1.1215 |
| H | 14 | −0.2408 | 0.7303 | −1.1215 |
| H | 15 | −0.2367 | 0.7526 | −1.1215 |
| H | 16 | −0.2319 | 0.7748 | −1.1215 |
| H | 17 | −0.2265 | 0.7968 | −1.1215 |
| H | 18 | −0.2202 | 0.8187 | −1.1215 |
| H | 19 | −0.2130 | 0.8402 | −1.1215 |
| H | 20 | −0.2044 | 0.8612 | −1.1215 |
| H | 21 | −0.1944 | 0.8815 | −1.1215 |
| H | 22 | −0.1825 | 0.9009 | −1.1215 |
| H | 23 | −0.1689 | 0.9190 | −1.1215 |
| H | 24 | −0.1537 | 0.9359 | −1.1215 |
| H | 25 | −0.1374 | 0.9516 | −1.1215 |
| H | 26 | −0.1199 | 0.9661 | −1.1215 |
| H | 27 | −0.1017 | 0.9796 | −1.1215 |
| H | 28 | −0.0827 | 0.9920 | −1.1215 |
| H | 29 | −0.0631 | 1.0034 | −1.1215 |
| H | 30 | −0.0430 | 1.0139 | −1.1215 |
| H | 31 | −0.0224 | 1.0236 | −1.1215 |
| H | 32 | −0.0016 | 1.0325 | −1.1215 |
| H | 33 | 0.0196 | 1.0407 | −1.1215 |
| H | 34 | 0.0410 | 1.0482 | −1.1215 |
| H | 35 | 0.0626 | 1.0552 | −1.1215 |
| H | 36 | 0.0844 | 1.0616 | −1.1215 |
| H | 37 | 0.1062 | 1.0678 | −1.1215 |
| H | 38 | 0.1281 | 1.0738 | −1.1215 |
| H | 39 | 0.1500 | 1.0798 | −1.1215 |
| H | 40 | 0.1719 | 1.0858 | −1.1215 |
| H | 41 | 0.1938 | 1.0918 | −1.1215 |
| H | 42 | 0.2157 | 1.0978 | −1.1215 |
| H | 43 | 0.2376 | 1.1036 | −1.1215 |
| H | 44 | 0.2597 | 1.1089 | −1.1215 |
| H | 45 | 0.2819 | 1.1136 | −1.1215 |
| H | 46 | 0.3042 | 1.1174 | −1.1215 |
| H | 47 | 0.3947 | 1.1178 | −1.1215 |
| H | 48 | 0.3268 | 1.1199 | −1.1215 |
| H | 49 | 0.3721 | 1.1204 | −1.1215 |
| H | 50 | 0.3495 | 1.1210 | −1.1215 |
| I | 1 | −0.2581 | 0.2763 | −1.2595 |
| I | 2 | −0.2585 | 0.3039 | −1.2595 |
| I | 3 | −0.2588 | 0.3314 | −1.2595 |
| I | 4 | −0.2589 | 0.3590 | −1.2595 |
| I | 5 | −0.2587 | 0.3865 | −1.2595 |
| I | 6 | −0.2584 | 0.4141 | −1.2595 |
| I | 7 | −0.2577 | 0.4416 | −1.2595 |
| I | 8 | −0.2568 | 0.4692 | −1.2595 |
| I | 9 | −0.2556 | 0.4967 | −1.2595 |
| I | 10 | −0.2541 | 0.5242 | −1.2595 |
| I | 11 | −0.2522 | 0.5517 | −1.2595 |
| I | 12 | −0.2501 | 0.5792 | −1.2595 |
| I | 13 | −0.2476 | 0.6067 | −1.2595 |
| I | 14 | −0.2449 | 0.6341 | −1.2595 |
| I | 15 | −0.2418 | 0.6615 | −1.2595 |
| I | 16 | −0.2386 | 0.6888 | −1.2595 |
| I | 17 | −0.2351 | 0.7162 | −1.2595 |
| I | 18 | −0.2314 | 0.7435 | −1.2595 |
| I | 19 | −0.2272 | 0.7707 | −1.2595 |
| I | 20 | −0.2220 | 0.7978 | −1.2595 |
| I | 21 | −0.2153 | 0.8245 | −1.2595 |
| I | 22 | −0.2062 | 0.8505 | −1.2595 |
| I | 23 | −0.1943 | 0.8753 | −1.2595 |
| I | 24 | −0.1793 | 0.8984 | −1.2595 |
| I | 25 | −0.1617 | 0.9196 | −1.2595 |
| I | 26 | −0.1420 | 0.9388 | −1.2595 |
| I | 27 | −0.1206 | 0.9562 | −1.2595 |
| I | 28 | −0.0980 | 0.9720 | −1.2595 |
| I | 29 | −0.0745 | 0.9863 | −1.2595 |
| I | 30 | −0.0502 | 0.9994 | −1.2595 |
| I | 31 | −0.0254 | 1.0113 | −1.2595 |
| I | 32 | −0.0001 | 1.0223 | −1.2595 |
| I | 33 | 0.0255 | 1.0325 | −1.2595 |
| I | 34 | 0.0513 | 1.0421 | −1.2595 |
| I | 35 | 0.0774 | 1.0510 | −1.2595 |
| I | 36 | 0.1036 | 1.0595 | −1.2595 |
| I | 37 | 0.1300 | 1.0675 | −1.2595 |
| I | 38 | 0.1564 | 1.0753 | −1.2595 |
| I | 39 | 0.1829 | 1.0829 | −1.2595 |
| I | 40 | 0.2094 | 1.0904 | −1.2595 |
| I | 41 | 0.2360 | 1.0978 | −1.2595 |
| I | 42 | 0.2626 | 1.1050 | −1.2595 |
| I | 43 | 0.2893 | 1.1118 | −1.2595 |
| I | 44 | 0.3162 | 1.1179 | −1.2595 |
| I | 45 | 0.3432 | 1.1232 | −1.2595 |
| I | 46 | 0.4803 | 1.1261 | −1.2595 |
| I | 47 | 0.3705 | 1.1273 | −1.2595 |
| I | 48 | 0.4530 | 1.1296 | −1.2595 |
| I | 49 | 0.3979 | 1.1299 | −1.2595 |
| I | 50 | 0.4254 | 1.1308 | −1.2595 |
| J | 1 | −0.2545 | 0.1506 | −1.3976 |
| J | 2 | −0.2550 | 0.1825 | −1.3976 |
| J | 3 | −0.2552 | 0.2144 | −1.3976 |
| J | 4 | −0.2552 | 0.2463 | −1.3976 |
| J | 5 | −0.2549 | 0.2781 | −1.3976 |
| J | 6 | −0.2544 | 0.3100 | −1.3976 |
| J | 7 | −0.2535 | 0.3419 | −1.3976 |
| J | 8 | −0.2524 | 0.3737 | −1.3976 |
| J | 9 | −0.2510 | 0.4056 | −1.3976 |
| J | 10 | −0.2493 | 0.4374 | −1.3976 |
| J | 11 | −0.2473 | 0.4692 | −1.3976 |
| J | 12 | −0.2450 | 0.5010 | −1.3976 |
| J | 13 | −0.2424 | 0.5328 | −1.3976 |
| J | 14 | −0.2395 | 0.5645 | −1.3976 |
| J | 15 | −0.2364 | 0.5962 | −1.3976 |
| J | 16 | −0.2332 | 0.6279 | −1.3976 |
| J | 17 | −0.2298 | 0.6596 | −1.3976 |
| J | 18 | −0.2262 | 0.6913 | −1.3976 |
| J | 19 | −0.2225 | 0.7230 | −1.3976 |
| J | 20 | −0.2184 | 0.7546 | −1.3976 |
| J | 21 | −0.2134 | 0.7861 | −1.3976 |

TABLE I-continued

Pressure Side Fillet Profile

| Ref. Plane | Point No. | X | Y | Z |
|---|---|---|---|---|
| J | 22 | −0.2064 | 0.8172 | −1.3976 |
| J | 23 | −0.1966 | 0.8475 | −1.3976 |
| J | 24 | −0.1828 | 0.8762 | −1.3976 |
| J | 25 | −0.1647 | 0.9023 | −1.3976 |
| J | 26 | −0.1428 | 0.9255 | −1.3976 |
| J | 27 | −0.1183 | 0.9459 | −1.3976 |
| J | 28 | −0.0920 | 0.9638 | −1.3976 |
| J | 29 | −0.0643 | 0.9796 | −1.3976 |
| J | 30 | −0.0357 | 0.9938 | −1.3976 |
| J | 31 | −0.0066 | 1.0066 | −1.3976 |
| J | 32 | 0.0230 | 1.0184 | −1.3976 |
| J | 33 | 0.0529 | 1.0295 | −1.3976 |
| J | 34 | 0.0830 | 1.0401 | −1.3976 |
| J | 35 | 0.1132 | 1.0502 | −1.3976 |
| J | 36 | 0.1436 | 1.0599 | −1.3976 |
| J | 37 | 0.1741 | 1.0691 | −1.3976 |
| J | 38 | 0.2047 | 1.0780 | −1.3976 |
| J | 39 | 0.2354 | 1.0866 | −1.3976 |
| J | 40 | 0.2661 | 1.0950 | −1.3976 |
| J | 41 | 0.2970 | 1.1032 | −1.3976 |
| J | 42 | 0.3279 | 1.1110 | −1.3976 |
| J | 43 | 0.3589 | 1.1183 | −1.3976 |
| J | 44 | 0.3901 | 1.1247 | −1.3976 |
| J | 45 | 0.4215 | 1.1300 | −1.3976 |
| J | 46 | 0.5802 | 1.1302 | −1.3976 |
| J | 47 | 0.4532 | 1.1340 | −1.3976 |
| J | 48 | 0.5486 | 1.1347 | −1.3976 |
| J | 49 | 0.4850 | 1.1363 | −1.3976 |
| J | 50 | 0.5168 | 1.1366 | −1.3976 |
| K | 1 | −0.2487 | 0.0786 | −1.5357 |
| K | 2 | −0.2490 | 0.1134 | −1.5357 |
| K | 3 | −0.2490 | 0.1482 | −1.5357 |
| K | 4 | −0.2486 | 0.1829 | −1.5357 |
| K | 5 | −0.2479 | 0.2177 | −1.5357 |
| K | 6 | −0.2469 | 0.2524 | −1.5357 |
| K | 7 | −0.2455 | 0.2872 | −1.5357 |
| K | 8 | −0.2438 | 0.3219 | −1.5357 |
| K | 9 | −0.2418 | 0.3566 | −1.5357 |
| K | 10 | −0.2395 | 0.3913 | −1.5357 |
| K | 11 | −0.2370 | 0.4260 | −1.5357 |
| K | 12 | −0.2342 | 0.4606 | −1.5357 |
| K | 13 | −0.2312 | 0.4953 | −1.5357 |
| K | 14 | −0.2280 | 0.5299 | −1.5357 |
| K | 15 | −0.2247 | 0.5645 | −1.5357 |
| K | 16 | −0.2214 | 0.5991 | −1.5357 |
| K | 17 | −0.2180 | 0.6337 | −1.5357 |
| K | 18 | −0.2145 | 0.6683 | −1.5357 |
| K | 19 | −0.2109 | 0.7029 | −1.5357 |
| K | 20 | −0.2070 | 0.7374 | −1.5357 |
| K | 21 | −0.2023 | 0.7718 | −1.5357 |
| K | 22 | −0.1957 | 0.8060 | −1.5357 |
| K | 23 | −0.1862 | 0.8394 | −1.5357 |
| K | 24 | −0.1727 | 0.8714 | −1.5357 |
| K | 25 | −0.1543 | 0.9008 | −1.5357 |
| K | 26 | −0.1313 | 0.9268 | −1.5357 |
| K | 27 | −0.1048 | 0.9493 | −1.5357 |
| K | 28 | −0.0759 | 0.9686 | −1.5357 |
| K | 29 | −0.0455 | 0.9855 | −1.5357 |
| K | 30 | −0.0140 | 1.0003 | −1.5357 |
| K | 31 | 0.0181 | 1.0135 | −1.5357 |
| K | 32 | 0.0507 | 1.0255 | −1.5357 |
| K | 33 | 0.0836 | 1.0368 | −1.5357 |
| K | 34 | 0.1167 | 1.0476 | −1.5357 |
| K | 35 | 0.1499 | 1.0580 | −1.5357 |
| K | 36 | 0.1832 | 1.0680 | −1.5357 |
| K | 37 | 0.2166 | 1.0776 | −1.5357 |
| K | 38 | 0.2501 | 1.0868 | −1.5357 |
| K | 39 | 0.2837 | 1.0956 | −1.5357 |
| K | 40 | 0.3174 | 1.1042 | −1.5357 |
| K | 41 | 0.3512 | 1.1124 | −1.5357 |
| K | 42 | 0.3851 | 1.1202 | −1.5357 |
| K | 43 | 0.4191 | 1.1275 | −1.5357 |
| K | 44 | 0.4533 | 1.1338 | −1.5357 |
| K | 45 | 0.6606 | 1.1356 | −1.5357 |
| K | 46 | 0.4876 | 1.1389 | −1.5357 |
| K | 47 | 0.6263 | 1.1412 | −1.5357 |
| K | 48 | 0.5222 | 1.1425 | −1.5357 |
| K | 49 | 0.5917 | 1.1440 | −1.5357 |
| K | 50 | 0.5569 | 1.1443 | −1.5357 |
| L | 1 | −0.2405 | 0.0525 | −1.6737 |
| L | 2 | −0.2407 | 0.0888 | −1.6737 |
| L | 3 | −0.2404 | 0.1251 | −1.6737 |
| L | 4 | −0.2397 | 0.1613 | −1.6737 |
| L | 5 | −0.2385 | 0.1975 | −1.6737 |
| L | 6 | −0.2370 | 0.2338 | −1.6737 |
| L | 7 | −0.2351 | 0.2700 | −1.6737 |
| L | 8 | −0.2328 | 0.3062 | −1.6737 |
| L | 9 | −0.2303 | 0.3423 | −1.6737 |
| L | 10 | −0.2274 | 0.3785 | −1.6737 |
| L | 11 | −0.2244 | 0.4146 | −1.6737 |
| L | 12 | −0.2210 | 0.4507 | −1.6737 |
| L | 13 | −0.2175 | 0.4868 | −1.6737 |
| L | 14 | −0.2138 | 0.5229 | −1.6737 |
| L | 15 | −0.2100 | 0.5589 | −1.6737 |
| L | 16 | −0.2061 | 0.5950 | −1.6737 |
| L | 17 | −0.2021 | 0.6310 | −1.6737 |
| L | 18 | −0.1981 | 0.6671 | −1.6737 |
| L | 19 | −0.1941 | 0.7031 | −1.6737 |
| L | 20 | −0.1901 | 0.7391 | −1.6737 |
| L | 21 | −0.1857 | 0.7751 | −1.6737 |
| L | 22 | −0.1803 | 0.8110 | −1.6737 |
| L | 23 | −0.1728 | 0.8465 | −1.6737 |
| L | 24 | −0.1620 | 0.8811 | −1.6737 |
| L | 25 | −0.1467 | 0.9139 | −1.6737 |
| L | 26 | −0.1260 | 0.9435 | −1.6737 |
| L | 27 | −0.1005 | 0.9693 | −1.6737 |
| L | 28 | −0.0718 | 0.9913 | −1.6737 |
| L | 29 | −0.0408 | 1.0103 | −1.6737 |
| L | 30 | −0.0085 | 1.0267 | −1.6737 |
| L | 31 | 0.0248 | 1.0410 | −1.6737 |
| L | 32 | 0.0588 | 1.0536 | −1.6737 |
| L | 33 | 0.0932 | 1.0650 | −1.6737 |
| L | 34 | 0.1279 | 1.0757 | −1.6737 |
| L | 35 | 0.1627 | 1.0857 | −1.6737 |
| L | 36 | 0.1977 | 1.0953 | −1.6737 |
| L | 37 | 0.2328 | 1.1043 | −1.6737 |
| L | 38 | 0.2680 | 1.1129 | −1.6737 |
| L | 39 | 0.3034 | 1.1210 | −1.6737 |
| L | 40 | 0.3388 | 1.1286 | −1.6737 |
| L | 41 | 0.3744 | 1.1358 | −1.6737 |
| L | 42 | 0.4100 | 1.1423 | −1.6737 |
| L | 43 | 0.4458 | 1.1482 | −1.6737 |
| L | 44 | 0.6982 | 1.1486 | −1.6737 |
| L | 45 | 0.4817 | 1.1532 | −1.6737 |
| L | 46 | 0.6625 | 1.1550 | −1.6737 |
| L | 47 | 0.5178 | 1.1571 | −1.6737 |
| L | 48 | 0.6264 | 1.1587 | −1.6737 |
| L | 49 | 0.5539 | 1.1596 | −1.6737 |
| L | 50 | 0.5902 | 1.1602 | −1.6737 |
| M | 1 | −0.2301 | 0.0571 | −1.8118 |
| M | 2 | −0.2302 | 0.0938 | −1.8118 |
| M | 3 | −0.2298 | 0.1304 | −1.8118 |
| M | 4 | −0.2289 | 0.1670 | −1.8118 |
| M | 5 | −0.2276 | 0.2037 | −1.8118 |
| M | 6 | −0.2259 | 0.2402 | −1.8118 |
| M | 7 | −0.2237 | 0.2768 | −1.8118 |
| M | 8 | −0.2212 | 0.3134 | −1.8118 |
| M | 9 | −0.2184 | 0.3499 | −1.8118 |
| M | 10 | −0.2152 | 0.3864 | −1.8118 |
| M | 11 | −0.2118 | 0.4229 | −1.8118 |
| M | 12 | −0.2081 | 0.4593 | −1.8118 |
| M | 13 | −0.2043 | 0.4958 | −1.8118 |
| M | 14 | −0.2002 | 0.5322 | −1.8118 |
| M | 15 | −0.1961 | 0.5686 | −1.8118 |
| M | 16 | −0.1918 | 0.6050 | −1.8118 |
| M | 17 | −0.1875 | 0.6413 | −1.8118 |
| M | 18 | −0.1832 | 0.6777 | −1.8118 |
| M | 19 | −0.1788 | 0.7141 | −1.8118 |
| M | 20 | −0.1745 | 0.7505 | −1.8118 |
| M | 21 | −0.1700 | 0.7868 | −1.8118 |

TABLE I-continued

Pressure Side Fillet Profile

| Ref. Plane | Point No. | X | Y | Z |
|---|---|---|---|---|
| M | 22 | −0.1651 | 0.8232 | −1.8118 |
| M | 23 | −0.1590 | 0.8593 | −1.8118 |
| M | 24 | −0.1509 | 0.8950 | −1.8118 |
| M | 25 | −0.1396 | 0.9298 | −1.8118 |
| M | 26 | −0.1239 | 0.9629 | −1.8118 |
| M | 27 | −0.1036 | 0.9933 | −1.8118 |
| M | 28 | −0.0788 | 1.0203 | −1.8118 |
| M | 29 | −0.0506 | 1.0435 | −1.8118 |
| M | 30 | −0.0197 | 1.0633 | −1.8118 |
| M | 31 | 0.0128 | 1.0801 | −1.8118 |
| M | 32 | 0.0466 | 1.0944 | −1.8118 |
| M | 33 | 0.0811 | 1.1067 | −1.8118 |
| M | 34 | 0.1161 | 1.1175 | −1.8118 |
| M | 35 | 0.1514 | 1.1271 | −1.8118 |
| M | 36 | 0.1870 | 1.1357 | −1.8118 |
| M | 37 | 0.2228 | 1.1436 | −1.8118 |
| M | 38 | 0.2588 | 1.1507 | −1.8118 |
| M | 39 | 0.2948 | 1.1571 | −1.8118 |
| M | 40 | 0.3310 | 1.1629 | −1.8118 |
| M | 41 | 0.3673 | 1.1682 | −1.8118 |
| M | 42 | 0.6951 | 1.1705 | −1.8118 |
| M | 43 | 0.4036 | 1.1730 | −1.8118 |
| M | 44 | 0.6591 | 1.1774 | −1.8118 |
| M | 45 | 0.4400 | 1.1774 | −1.8118 |
| M | 46 | 0.4764 | 1.1810 | −1.8118 |
| M | 47 | 0.6228 | 1.1819 | −1.8118 |
| M | 48 | 0.5130 | 1.1836 | −1.8118 |
| M | 49 | 0.5862 | 1.1842 | −1.8118 |
| M | 50 | 0.5496 | 1.1847 | −1.8118 |
| N | 1 | −0.2177 | 0.0705 | −1.9498 |
| N | 2 | −0.2176 | 0.1069 | −1.9498 |
| N | 3 | −0.2170 | 0.1433 | −1.9498 |
| N | 4 | −0.2159 | 0.1797 | −1.9498 |
| N | 5 | −0.2143 | 0.2160 | −1.9498 |
| N | 6 | −0.2123 | 0.2524 | −1.9498 |
| N | 7 | −0.2099 | 0.2887 | −1.9498 |
| N | 8 | −0.2072 | 0.3250 | −1.9498 |
| N | 9 | −0.2042 | 0.3613 | −1.9498 |
| N | 10 | −0.2010 | 0.3975 | −1.9498 |
| N | 11 | −0.1977 | 0.4338 | −1.9498 |
| N | 12 | −0.1943 | 0.4700 | −1.9498 |
| N | 13 | −0.1909 | 0.5062 | −1.9498 |
| N | 14 | −0.1874 | 0.5425 | −1.9498 |
| N | 15 | −0.1838 | 0.5787 | −1.9498 |
| N | 16 | −0.1801 | 0.6149 | −1.9498 |
| N | 17 | −0.1763 | 0.6511 | −1.9498 |
| N | 18 | −0.1724 | 0.6873 | −1.9498 |
| N | 19 | −0.1682 | 0.7234 | −1.9498 |
| N | 20 | −0.1639 | 0.7596 | −1.9498 |
| N | 21 | −0.1593 | 0.7957 | −1.9498 |
| N | 22 | −0.1545 | 0.8317 | −1.9498 |
| N | 23 | −0.1490 | 0.8677 | −1.9498 |
| N | 24 | −0.1425 | 0.9035 | −1.9498 |
| N | 25 | −0.1342 | 0.9390 | −1.9498 |
| N | 26 | −0.1237 | 0.9738 | −1.9498 |
| N | 27 | −0.1099 | 1.0075 | −1.9498 |
| N | 28 | −0.0919 | 1.0390 | −1.9498 |
| N | 29 | −0.0689 | 1.0672 | −1.9498 |
| N | 30 | −0.0416 | 1.0912 | −1.9498 |
| N | 31 | −0.0115 | 1.1116 | −1.9498 |
| N | 32 | 0.0206 | 1.1287 | −1.9498 |
| N | 33 | 0.0540 | 1.1433 | −1.9498 |
| N | 34 | 0.0882 | 1.1558 | −1.9498 |
| N | 35 | 0.1229 | 1.1667 | −1.9498 |
| N | 36 | 0.1580 | 1.1762 | −1.9498 |
| N | 37 | 0.1935 | 1.1845 | −1.9498 |
| N | 38 | 0.2291 | 1.1916 | −1.9498 |
| N | 39 | 0.2650 | 1.1977 | −1.9498 |
| N | 40 | 0.6629 | 1.2001 | −1.9498 |
| N | 41 | 0.3010 | 1.2030 | −1.9498 |
| N | 42 | 0.6272 | 1.2073 | −1.9498 |
| N | 43 | 0.3371 | 1.2076 | −1.9498 |
| N | 44 | 0.3733 | 1.2116 | −1.9498 |
| N | 45 | 0.5912 | 1.2126 | −1.9498 |
| N | 46 | 0.4096 | 1.2149 | −1.9498 |
| N | 47 | 0.5550 | 1.2161 | −1.9498 |
| N | 48 | 0.4459 | 1.2172 | −1.9498 |
| N | 49 | 0.5187 | 1.2179 | −1.9498 |
| N | 50 | 0.4823 | 1.2182 | −1.9498 |
| O | 1 | −0.2033 | 0.0794 | −2.0879 |
| O | 2 | −0.2031 | 0.1153 | −2.0879 |
| O | 3 | −0.2024 | 0.1511 | −2.0879 |
| O | 4 | −0.2012 | 0.1870 | −2.0879 |
| O | 5 | −0.1995 | 0.2228 | −2.0879 |
| O | 6 | −0.1976 | 0.2586 | −2.0879 |
| O | 7 | −0.1953 | 0.2944 | −2.0879 |
| O | 8 | −0.1927 | 0.3302 | −2.0879 |
| O | 9 | −0.1900 | 0.3659 | −2.0879 |
| O | 10 | −0.1871 | 0.4017 | −2.0879 |
| O | 11 | −0.1840 | 0.4374 | −2.0879 |
| O | 12 | −0.1809 | 0.4731 | −2.0879 |
| O | 13 | −0.1777 | 0.5089 | −2.0879 |
| O | 14 | −0.1743 | 0.5446 | −2.0879 |
| O | 15 | −0.1709 | 0.5803 | −2.0879 |
| O | 16 | −0.1673 | 0.6160 | −2.0879 |
| O | 17 | −0.1636 | 0.6516 | −2.0879 |
| O | 18 | −0.1598 | 0.6873 | −2.0879 |
| O | 19 | −0.1559 | 0.7229 | −2.0879 |
| O | 20 | −0.1520 | 0.7586 | −2.0879 |
| O | 21 | −0.1481 | 0.7943 | −2.0879 |
| O | 22 | −0.1444 | 0.8299 | −2.0879 |
| O | 23 | −0.1407 | 0.8656 | −2.0879 |
| O | 24 | −0.1367 | 0.9012 | −2.0879 |
| O | 25 | −0.1317 | 0.9368 | −2.0879 |
| O | 26 | −0.1251 | 0.9720 | −2.0879 |
| O | 27 | −0.1158 | 1.0067 | −2.0879 |
| O | 28 | −0.1029 | 1.0401 | −2.0879 |
| O | 29 | −0.0854 | 1.0714 | −2.0879 |
| O | 30 | −0.0632 | 1.0995 | −2.0879 |
| O | 31 | −0.0373 | 1.1242 | −2.0879 |
| O | 32 | −0.0087 | 1.1459 | −2.0879 |
| O | 33 | 0.0216 | 1.1650 | −2.0879 |
| O | 34 | 0.0532 | 1.1820 | −2.0879 |
| O | 35 | 0.0858 | 1.1969 | −2.0879 |
| O | 36 | 0.1192 | 1.2099 | −2.0879 |
| O | 37 | 0.1534 | 1.2209 | −2.0879 |
| O | 38 | 0.1881 | 1.2300 | −2.0879 |
| O | 39 | 0.6150 | 1.2348 | −2.0879 |
| O | 40 | 0.2232 | 1.2374 | −2.0879 |
| O | 41 | 0.5798 | 1.2419 | −2.0879 |
| O | 42 | 0.2585 | 1.2434 | −2.0879 |
| O | 43 | 0.5444 | 1.2476 | −2.0879 |
| O | 44 | 0.2941 | 1.2482 | −2.0879 |
| O | 45 | 0.5088 | 1.2517 | −2.0879 |
| O | 46 | 0.3297 | 1.2518 | −2.0879 |
| O | 47 | 0.3655 | 1.2544 | −2.0879 |
| O | 48 | 0.4731 | 1.2545 | −2.0879 |
| O | 49 | 0.4014 | 1.2558 | −2.0879 |
| O | 50 | 0.4372 | 1.2558 | −2.0879 |
| P | 1 | −0.1876 | 0.0887 | −2.2259 |
| P | 2 | −0.1874 | 0.1238 | −2.2259 |
| P | 3 | −0.1868 | 0.1589 | −2.2259 |
| P | 4 | −0.1858 | 0.1940 | −2.2259 |
| P | 5 | −0.1844 | 0.2291 | −2.2259 |
| P | 6 | −0.1826 | 0.2641 | −2.2259 |
| P | 7 | −0.1805 | 0.2992 | −2.2259 |
| P | 8 | −0.1781 | 0.3342 | −2.2259 |
| P | 9 | −0.1754 | 0.3692 | −2.2259 |
| P | 10 | −0.1724 | 0.4041 | −2.2259 |
| P | 11 | −0.1692 | 0.4391 | −2.2259 |
| P | 12 | −0.1658 | 0.4740 | −2.2259 |
| P | 13 | −0.1623 | 0.5089 | −2.2259 |
| P | 14 | −0.1586 | 0.5438 | −2.2259 |
| P | 15 | −0.1549 | 0.5787 | −2.2259 |
| P | 16 | −0.1511 | 0.6136 | −2.2259 |
| P | 17 | −0.1473 | 0.6485 | −2.2259 |
| P | 18 | −0.1436 | 0.6834 | −2.2259 |
| P | 19 | −0.1401 | 0.7183 | −2.2259 |
| P | 20 | −0.1368 | 0.7533 | −2.2259 |
| P | 21 | −0.1338 | 0.7882 | −2.2259 |

TABLE I-continued

Pressure Side Fillet Profile

| Ref. Plane | Point No. | X | Y | Z |
|---|---|---|---|---|
| P | 22 | −0.1311 | 0.8232 | −2.2259 |
| P | 23 | −0.1287 | 0.8583 | −2.2259 |
| P | 24 | −0.1264 | 0.8933 | −2.2259 |
| P | 25 | −0.1237 | 0.9283 | −2.2259 |
| P | 26 | −0.1200 | 0.9632 | −2.2259 |
| P | 27 | −0.1143 | 0.9978 | −2.2259 |
| P | 28 | −0.1058 | 1.0319 | −2.2259 |
| P | 29 | −0.0940 | 1.0649 | −2.2259 |
| P | 30 | −0.0781 | 1.0961 | −2.2259 |
| P | 31 | −0.0581 | 1.1249 | −2.2259 |
| P | 32 | −0.0350 | 1.1513 | −2.2259 |
| P | 33 | −0.0094 | 1.1753 | −2.2259 |
| P | 34 | 0.0182 | 1.1970 | −2.2259 |
| P | 35 | 0.0476 | 1.2162 | −2.2259 |
| P | 36 | 0.0785 | 1.2329 | −2.2259 |
| P | 37 | 0.1106 | 1.2469 | −2.2259 |
| P | 38 | 0.1437 | 1.2585 | −2.2259 |
| P | 39 | 0.1775 | 1.2679 | −2.2259 |
| P | 40 | 0.5606 | 1.2716 | −2.2259 |
| P | 41 | 0.2118 | 1.2753 | −2.2259 |
| P | 42 | 0.5261 | 1.2783 | −2.2259 |
| P | 43 | 0.2465 | 1.2811 | −2.2259 |
| P | 44 | 0.4914 | 1.2835 | −2.2259 |
| P | 45 | 0.2813 | 1.2855 | −2.2259 |
| P | 46 | 0.4565 | 1.2872 | −2.2259 |
| P | 47 | 0.3162 | 1.2885 | −2.2259 |
| P | 48 | 0.4215 | 1.2896 | −2.2259 |
| P | 49 | 0.3513 | 1.2902 | −2.2259 |
| P | 50 | 0.3864 | 1.2906 | −2.2259 |
| Q | 1 | −0.1708 | 0.0968 | −2.3640 |
| Q | 2 | −0.1705 | 0.1310 | −2.3640 |
| Q | 3 | −0.1698 | 0.1652 | −2.3640 |
| Q | 4 | −0.1686 | 0.1994 | −2.3640 |
| Q | 5 | −0.1670 | 0.2336 | −2.3640 |
| Q | 6 | −0.1650 | 0.2677 | −2.3640 |
| Q | 7 | −0.1626 | 0.3018 | −2.3640 |
| Q | 8 | −0.1600 | 0.3359 | −2.3640 |
| Q | 9 | −0.1571 | 0.3700 | −2.3640 |
| Q | 10 | −0.1539 | 0.4040 | −2.3640 |
| Q | 11 | −0.1506 | 0.4381 | −2.3640 |
| Q | 12 | −0.1471 | 0.4721 | −2.3640 |
| Q | 13 | −0.1435 | 0.5061 | −2.3640 |
| Q | 14 | −0.1399 | 0.5401 | −2.3640 |
| Q | 15 | −0.1363 | 0.5741 | −2.3640 |
| Q | 16 | −0.1327 | 0.6081 | −2.3640 |
| Q | 17 | −0.1292 | 0.6421 | −2.3640 |
| Q | 18 | −0.1258 | 0.6762 | −2.3640 |
| Q | 19 | −0.1226 | 0.7102 | −2.3640 |
| Q | 20 | −0.1196 | 0.7443 | −2.3640 |
| Q | 21 | −0.1168 | 0.7784 | −2.3640 |
| Q | 22 | −0.1143 | 0.8125 | −2.3640 |
| Q | 23 | −0.1120 | 0.8466 | −2.3640 |
| Q | 24 | −0.1099 | 0.8807 | −2.3640 |
| Q | 25 | −0.1078 | 0.9149 | −2.3640 |
| Q | 26 | −0.1052 | 0.9490 | −2.3640 |
| Q | 27 | −0.1017 | 0.9830 | −2.3640 |
| Q | 28 | −0.0966 | 1.0168 | −2.3640 |
| Q | 29 | −0.0893 | 1.0502 | −2.3640 |
| Q | 30 | −0.0793 | 1.0829 | −2.3640 |
| Q | 31 | −0.0661 | 1.1144 | −2.3640 |
| Q | 32 | −0.0496 | 1.1443 | −2.3640 |
| Q | 33 | −0.0296 | 1.1721 | −2.3640 |
| Q | 34 | −0.0066 | 1.1973 | −2.3640 |
| Q | 35 | 0.0190 | 1.2200 | −2.3640 |
| Q | 36 | 0.0466 | 1.2401 | −2.3640 |
| Q | 37 | 0.0759 | 1.2578 | −2.3640 |
| Q | 38 | 0.1064 | 1.2732 | −2.3640 |
| Q | 39 | 0.1381 | 1.2861 | −2.3640 |
| Q | 40 | 0.1705 | 1.2969 | −2.3640 |
| Q | 41 | 0.2036 | 1.3054 | −2.3640 |
| Q | 42 | 0.5093 | 1.3070 | −2.3640 |
| Q | 43 | 0.2372 | 1.3121 | −2.3640 |
| Q | 44 | 0.4756 | 1.3129 | −2.3640 |
| Q | 45 | 0.2710 | 1.3169 | −2.3640 |
| Q | 46 | 0.4417 | 1.3173 | −2.3640 |
| Q | 47 | 0.3051 | 1.3201 | −2.3640 |
| Q | 48 | 0.4076 | 1.3204 | −2.3640 |
| Q | 49 | 0.3734 | 1.3218 | −2.3640 |
| Q | 50 | 0.3392 | 1.3218 | −2.3640 |
| R | 1 | −0.1531 | 0.1074 | −2.5020 |
| R | 2 | −0.1527 | 0.1407 | −2.5020 |
| R | 3 | −0.1518 | 0.1740 | −2.5020 |
| R | 4 | −0.1504 | 0.2073 | −2.5020 |
| R | 5 | −0.1486 | 0.2406 | −2.5020 |
| R | 6 | −0.1465 | 0.2738 | −2.5020 |
| R | 7 | −0.1440 | 0.3070 | −2.5020 |
| R | 8 | −0.1413 | 0.3402 | −2.5020 |
| R | 9 | −0.1383 | 0.3734 | −2.5020 |
| R | 10 | −0.1351 | 0.4066 | −2.5020 |
| R | 11 | −0.1317 | 0.4398 | −2.5020 |
| R | 12 | −0.1282 | 0.4729 | −2.5020 |
| R | 13 | −0.1247 | 0.5060 | −2.5020 |
| R | 14 | −0.1211 | 0.5392 | −2.5020 |
| R | 15 | −0.1174 | 0.5723 | −2.5020 |
| R | 16 | −0.1139 | 0.6054 | −2.5020 |
| R | 17 | −0.1104 | 0.6386 | −2.5020 |
| R | 18 | −0.1070 | 0.6717 | −2.5020 |
| R | 19 | −0.1038 | 0.7049 | −2.5020 |
| R | 20 | −0.1007 | 0.7380 | −2.5020 |
| R | 21 | −0.0977 | 0.7712 | −2.5020 |
| R | 22 | −0.0949 | 0.8044 | −2.5020 |
| R | 23 | −0.0923 | 0.8377 | −2.5020 |
| R | 24 | −0.0897 | 0.8709 | −2.5020 |
| R | 25 | −0.0873 | 0.9041 | −2.5020 |
| R | 26 | −0.0849 | 0.9374 | −2.5020 |
| R | 27 | −0.0825 | 0.9706 | −2.5020 |
| R | 28 | −0.0795 | 1.0038 | −2.5020 |
| R | 29 | −0.0755 | 1.0369 | −2.5020 |
| R | 30 | −0.0699 | 1.0697 | −2.5020 |
| R | 31 | −0.0621 | 1.1021 | −2.5020 |
| R | 32 | −0.0513 | 1.1336 | −2.5020 |
| R | 33 | −0.0369 | 1.1636 | −2.5020 |
| R | 34 | −0.0189 | 1.1916 | −2.5020 |
| R | 35 | 0.0022 | 1.2174 | −2.5020 |
| R | 36 | 0.0259 | 1.2408 | −2.5020 |
| R | 37 | 0.0516 | 1.2620 | −2.5020 |
| R | 38 | 0.0790 | 1.2809 | −2.5020 |
| R | 39 | 0.1079 | 1.2975 | −2.5020 |
| R | 40 | 0.1381 | 1.3117 | −2.5020 |
| R | 41 | 0.1692 | 1.3235 | −2.5020 |
| R | 42 | 0.2012 | 1.3330 | −2.5020 |
| R | 43 | 0.4656 | 1.3379 | −2.5020 |
| R | 44 | 0.2337 | 1.3403 | −2.5020 |
| R | 45 | 0.4327 | 1.3432 | −2.5020 |
| R | 46 | 0.2666 | 1.3455 | −2.5020 |
| R | 47 | 0.3996 | 1.3470 | −2.5020 |
| R | 48 | 0.2998 | 1.3486 | −2.5020 |
| R | 49 | 0.3664 | 1.3492 | −2.5020 |
| R | 50 | 0.3331 | 1.3498 | −2.5020 |
| S | 1 | −0.1346 | 0.1199 | −2.6401 |
| S | 2 | −0.1341 | 0.1525 | −2.6401 |
| S | 3 | −0.1332 | 0.1850 | −2.6401 |
| S | 4 | −0.1318 | 0.2176 | −2.6401 |
| S | 5 | −0.1300 | 0.2501 | −2.6401 |
| S | 6 | −0.1280 | 0.2826 | −2.6401 |
| S | 7 | −0.1256 | 0.3150 | −2.6401 |
| S | 8 | −0.1229 | 0.3475 | −2.6401 |
| S | 9 | −0.1200 | 0.3799 | −2.6401 |
| S | 10 | −0.1169 | 0.4123 | −2.6401 |
| S | 11 | −0.1137 | 0.4447 | −2.6401 |
| S | 12 | −0.1103 | 0.4771 | −2.6401 |
| S | 13 | −0.1068 | 0.5094 | −2.6401 |
| S | 14 | −0.1033 | 0.5418 | −2.6401 |
| S | 15 | −0.0997 | 0.5742 | −2.6401 |
| S | 16 | −0.0961 | 0.6065 | −2.6401 |
| S | 17 | −0.0925 | 0.6389 | −2.6401 |
| S | 18 | −0.0890 | 0.6712 | −2.6401 |
| S | 19 | −0.0856 | 0.7036 | −2.6401 |
| S | 20 | −0.0823 | 0.7360 | −2.6401 |
| S | 21 | −0.0791 | 0.7684 | −2.6401 |

TABLE I-continued

Pressure Side Fillet Profile

| Ref. Plane | Point No. | X | Y | Z |
|---|---|---|---|---|
| S | 22 | −0.0761 | 0.8008 | −2.6401 |
| S | 23 | −0.0732 | 0.8332 | −2.6401 |
| S | 24 | −0.0706 | 0.8657 | −2.6401 |
| S | 25 | −0.0682 | 0.8982 | −2.6401 |
| S | 26 | −0.0661 | 0.9306 | −2.6401 |
| S | 27 | −0.0642 | 0.9632 | −2.6401 |
| S | 28 | −0.0623 | 0.9957 | −2.6401 |
| S | 29 | −0.0601 | 1.0281 | −2.6401 |
| S | 30 | −0.0569 | 1.0605 | −2.6401 |
| S | 31 | −0.0521 | 1.0927 | −2.6401 |
| S | 32 | −0.0452 | 1.1246 | −2.6401 |
| S | 33 | −0.0357 | 1.1557 | −2.6401 |
| S | 34 | −0.0229 | 1.1856 | −2.6401 |
| S | 35 | −0.0067 | 1.2138 | −2.6401 |
| S | 36 | 0.0127 | 1.2399 | −2.6401 |
| S | 37 | 0.0348 | 1.2638 | −2.6401 |
| S | 38 | 0.0591 | 1.2855 | −2.6401 |
| S | 39 | 0.0853 | 1.3048 | −2.6401 |
| S | 40 | 0.1130 | 1.3219 | −2.6401 |
| S | 41 | 0.1421 | 1.3364 | −2.6401 |
| S | 42 | 0.1723 | 1.3485 | −2.6401 |
| S | 43 | 0.2034 | 1.3581 | −2.6401 |
| S | 44 | 0.2352 | 1.3653 | −2.6401 |
| S | 45 | 0.4294 | 1.3664 | −2.6401 |
| S | 46 | 0.2673 | 1.3704 | −2.6401 |
| S | 47 | 0.3972 | 1.3711 | −2.6401 |
| S | 48 | 0.2997 | 1.3735 | −2.6401 |
| S | 49 | 0.3648 | 1.3739 | −2.6401 |
| S | 50 | 0.3323 | 1.3746 | −2.6401 |
| T | 1 | −0.1156 | 0.1306 | −2.7781 |
| T | 2 | −0.1151 | 0.1628 | −2.7781 |
| T | 3 | −0.1141 | 0.1950 | −2.7781 |
| T | 4 | −0.1127 | 0.2272 | −2.7781 |
| T | 5 | −0.1109 | 0.2594 | −2.7781 |
| T | 6 | −0.1089 | 0.2915 | −2.7781 |
| T | 7 | −0.1066 | 0.3237 | −2.7781 |
| T | 8 | −0.1039 | 0.3558 | −2.7781 |
| T | 9 | −0.1011 | 0.3879 | −2.7781 |
| T | 10 | −0.0980 | 0.4199 | −2.7781 |
| T | 11 | −0.0948 | 0.4520 | −2.7781 |
| T | 12 | −0.0914 | 0.4840 | −2.7781 |
| T | 13 | −0.0880 | 0.5161 | −2.7781 |
| T | 14 | −0.0844 | 0.5481 | −2.7781 |
| T | 15 | −0.0808 | 0.5801 | −2.7781 |
| T | 16 | −0.0772 | 0.6121 | −2.7781 |
| T | 17 | −0.0737 | 0.6441 | −2.7781 |
| T | 18 | −0.0702 | 0.6762 | −2.7781 |
| T | 19 | −0.0668 | 0.7082 | −2.7781 |
| T | 20 | −0.0635 | 0.7402 | −2.7781 |
| T | 21 | −0.0603 | 0.7723 | −2.7781 |
| T | 22 | −0.0574 | 0.8044 | −2.7781 |
| T | 23 | −0.0547 | 0.8365 | −2.7781 |
| T | 24 | −0.0522 | 0.8686 | −2.7781 |
| T | 25 | −0.0501 | 0.9007 | −2.7781 |
| T | 26 | −0.0482 | 0.9329 | −2.7781 |
| T | 27 | −0.0467 | 0.9651 | −2.7781 |
| T | 28 | −0.0453 | 0.9973 | −2.7781 |
| T | 29 | −0.0438 | 1.0295 | −2.7781 |
| T | 30 | −0.0416 | 1.0616 | −2.7781 |
| T | 31 | −0.0384 | 1.0937 | −2.7781 |
| T | 32 | −0.0335 | 1.1255 | −2.7781 |
| T | 33 | −0.0263 | 1.1569 | −2.7781 |
| T | 34 | −0.0164 | 1.1875 | −2.7781 |
| T | 35 | −0.0033 | 1.2169 | −2.7781 |
| T | 36 | 0.0131 | 1.2447 | −2.7781 |
| T | 37 | 0.0324 | 1.2704 | −2.7781 |
| T | 38 | 0.0541 | 1.2942 | −2.7781 |
| T | 39 | 0.0780 | 1.3158 | −2.7781 |
| T | 40 | 0.1039 | 1.3350 | −2.7781 |
| T | 41 | 0.1315 | 1.3515 | −2.7781 |
| T | 42 | 0.1607 | 1.3652 | −2.7781 |
| T | 43 | 0.1909 | 1.3763 | −2.7781 |
| T | 44 | 0.2219 | 1.3850 | −2.7781 |
| T | 45 | 0.4137 | 1.3912 | −2.7781 |
| T | 46 | 0.2534 | 1.3915 | −2.7781 |
| T | 47 | 0.3818 | 1.3958 | −2.7781 |
| T | 48 | 0.2854 | 1.3960 | −2.7781 |
| T | 49 | 0.3497 | 1.3982 | −2.7781 |
| T | 50 | 0.3175 | 1.3982 | −2.7781 |
| U | 1 | −0.0962 | 0.1398 | −2.9162 |
| U | 2 | −0.0956 | 0.1722 | −2.9162 |
| U | 3 | −0.0945 | 0.2046 | −2.9162 |
| U | 4 | −0.0930 | 0.2370 | −2.9162 |
| U | 5 | −0.0911 | 0.2694 | −2.9162 |
| U | 6 | −0.0891 | 0.3018 | −2.9162 |
| U | 7 | −0.0867 | 0.3341 | −2.9162 |
| U | 8 | −0.0841 | 0.3665 | −2.9162 |
| U | 9 | −0.0813 | 0.3988 | −2.9162 |
| U | 10 | −0.0783 | 0.4311 | −2.9162 |
| U | 11 | −0.0751 | 0.4633 | −2.9162 |
| U | 12 | −0.0718 | 0.4956 | −2.9162 |
| U | 13 | −0.0685 | 0.5279 | −2.9162 |
| U | 14 | −0.0651 | 0.5601 | −2.9162 |
| U | 15 | −0.0617 | 0.5924 | −2.9162 |
| U | 16 | −0.0583 | 0.6246 | −2.9162 |
| U | 17 | −0.0550 | 0.6569 | −2.9162 |
| U | 18 | −0.0518 | 0.6892 | −2.9162 |
| U | 19 | −0.0486 | 0.7214 | −2.9162 |
| U | 20 | −0.0456 | 0.7537 | −2.9162 |
| U | 21 | −0.0426 | 0.7860 | −2.9162 |
| U | 22 | −0.0399 | 0.8183 | −2.9162 |
| U | 23 | −0.0373 | 0.8507 | −2.9162 |
| U | 24 | −0.0349 | 0.8830 | −2.9162 |
| U | 25 | −0.0328 | 0.9154 | −2.9162 |
| U | 26 | −0.0309 | 0.9478 | −2.9162 |
| U | 27 | −0.0293 | 0.9801 | −2.9162 |
| U | 28 | −0.0279 | 1.0126 | −2.9162 |
| U | 29 | −0.0265 | 1.0450 | −2.9162 |
| U | 30 | −0.0245 | 1.0773 | −2.9162 |
| U | 31 | −0.0215 | 1.1096 | −2.9162 |
| U | 32 | −0.0170 | 1.1417 | −2.9162 |
| U | 33 | −0.0106 | 1.1735 | −2.9162 |
| U | 34 | −0.0019 | 1.2048 | −2.9162 |
| U | 35 | 0.0094 | 1.2351 | −2.9162 |
| U | 36 | 0.0234 | 1.2644 | −2.9162 |
| U | 37 | 0.0401 | 1.2922 | −2.9162 |
| U | 38 | 0.0597 | 1.3181 | −2.9162 |
| U | 39 | 0.0822 | 1.3413 | −2.9162 |
| U | 40 | 0.1076 | 1.3614 | −2.9162 |
| U | 41 | 0.1354 | 1.3782 | −2.9162 |
| U | 42 | 0.1647 | 1.3920 | −2.9162 |
| U | 43 | 0.1952 | 1.4029 | −2.9162 |
| U | 44 | 0.2266 | 1.4113 | −2.9162 |
| U | 45 | 0.4198 | 1.4120 | −2.9162 |
| U | 46 | 0.3878 | 1.4170 | −2.9162 |
| U | 47 | 0.2585 | 1.4171 | −2.9162 |
| U | 48 | 0.3555 | 1.4203 | −2.9162 |
| U | 49 | 0.2907 | 1.4205 | −2.9162 |
| U | 50 | 0.3231 | 1.4215 | −2.9162 |
| V | 1 | −0.0758 | 0.1685 | −3.0542 |
| V | 2 | −0.0751 | 0.2007 | −3.0542 |
| V | 3 | −0.0740 | 0.2328 | −3.0542 |
| V | 4 | −0.0726 | 0.2650 | −3.0542 |
| V | 5 | −0.0709 | 0.2971 | −3.0542 |
| V | 6 | −0.0690 | 0.3292 | −3.0542 |
| V | 7 | −0.0669 | 0.3613 | −3.0542 |
| V | 8 | −0.0646 | 0.3934 | −3.0542 |
| V | 9 | −0.0621 | 0.4255 | −3.0542 |
| V | 10 | −0.0595 | 0.4576 | −3.0542 |
| V | 11 | −0.0567 | 0.4896 | −3.0542 |
| V | 12 | −0.0539 | 0.5217 | −3.0542 |
| V | 13 | −0.0511 | 0.5537 | −3.0542 |
| V | 14 | −0.0481 | 0.5858 | −3.0542 |
| V | 15 | −0.0452 | 0.6178 | −3.0542 |
| V | 16 | −0.0423 | 0.6498 | −3.0542 |
| V | 17 | −0.0394 | 0.6819 | −3.0542 |
| V | 18 | −0.0365 | 0.7139 | −3.0542 |
| V | 19 | −0.0337 | 0.7460 | −3.0542 |
| V | 20 | −0.0310 | 0.7781 | −3.0542 |
| V | 21 | −0.0283 | 0.8101 | −3.0542 |

TABLE I-continued

Pressure Side Fillet Profile

| Ref. Plane | Point No. | X | Y | Z |
|---|---|---|---|---|
| V | 22 | −0.0258 | 0.8422 | −3.0542 |
| V | 23 | −0.0234 | 0.8743 | −3.0542 |
| V | 24 | −0.0211 | 0.9064 | −3.0542 |
| V | 25 | −0.0190 | 0.9385 | −3.0542 |
| V | 26 | −0.0170 | 0.9706 | −3.0542 |
| V | 27 | −0.0152 | 1.0027 | −3.0542 |
| V | 28 | −0.0135 | 1.0349 | −3.0542 |
| V | 29 | −0.0116 | 1.0670 | −3.0542 |
| V | 30 | −0.0092 | 1.0991 | −3.0542 |
| V | 31 | −0.0060 | 1.1311 | −3.0542 |
| V | 32 | −0.0016 | 1.1630 | −3.0542 |
| V | 33 | 0.0043 | 1.1946 | −3.0542 |
| V | 34 | 0.0120 | 1.2258 | −3.0542 |
| V | 35 | 0.0217 | 1.2565 | −3.0542 |
| V | 36 | 0.0338 | 1.2863 | −3.0542 |
| V | 37 | 0.0484 | 1.3150 | −3.0542 |
| V | 38 | 0.0661 | 1.3418 | −3.0542 |
| V | 39 | 0.0871 | 1.3662 | −3.0542 |
| V | 40 | 0.1112 | 1.3873 | −3.0542 |
| V | 41 | 0.1380 | 1.4052 | −3.0542 |
| V | 42 | 0.1667 | 1.4197 | −3.0542 |
| V | 43 | 0.1968 | 1.4310 | −3.0542 |
| V | 44 | 0.4197 | 1.4338 | −3.0542 |
| V | 45 | 0.2280 | 1.4391 | −3.0542 |
| V | 46 | 0.3880 | 1.4391 | −3.0542 |
| V | 47 | 0.3561 | 1.4433 | −3.0542 |
| V | 48 | 0.2597 | 1.4440 | −3.0542 |
| V | 49 | 0.3240 | 1.4457 | −3.0542 |
| V | 50 | 0.2918 | 1.4461 | −3.0542 |
| W | 1 | −0.0538 | 0.2431 | −3.1923 |
| W | 2 | −0.0531 | 0.2728 | −3.1923 |
| W | 3 | −0.0521 | 0.3024 | −3.1923 |
| W | 4 | −0.0510 | 0.3321 | −3.1923 |
| W | 5 | −0.0497 | 0.3618 | −3.1923 |
| W | 6 | −0.0483 | 0.3914 | −3.1923 |
| W | 7 | −0.0467 | 0.4210 | −3.1923 |
| W | 8 | −0.0451 | 0.4507 | −3.1923 |
| W | 9 | −0.0433 | 0.4803 | −3.1923 |
| W | 10 | −0.0415 | 0.5099 | −3.1923 |
| W | 11 | −0.0396 | 0.5395 | −3.1923 |
| W | 12 | −0.0376 | 0.5692 | −3.1923 |
| W | 13 | −0.0356 | 0.5988 | −3.1923 |
| W | 14 | −0.0335 | 0.6284 | −3.1923 |
| W | 15 | −0.0314 | 0.6580 | −3.1923 |
| W | 16 | −0.0293 | 0.6876 | −3.1923 |
| W | 17 | −0.0272 | 0.7172 | −3.1923 |
| W | 18 | −0.0251 | 0.7468 | −3.1923 |
| W | 19 | −0.0230 | 0.7764 | −3.1923 |
| W | 20 | −0.0209 | 0.8060 | −3.1923 |
| W | 21 | −0.0189 | 0.8356 | −3.1923 |
| W | 22 | −0.0169 | 0.8653 | −3.1923 |
| W | 23 | −0.0149 | 0.8949 | −3.1923 |
| W | 24 | −0.0130 | 0.9245 | −3.1923 |
| W | 25 | −0.0111 | 0.9541 | −3.1923 |
| W | 26 | −0.0093 | 0.9837 | −3.1923 |
| W | 27 | −0.0075 | 1.0134 | −3.1923 |
| W | 28 | −0.0057 | 1.0430 | −3.1923 |
| W | 29 | −0.0039 | 1.0726 | −3.1923 |
| W | 30 | −0.0018 | 1.1022 | −3.1923 |
| W | 31 | 0.0008 | 1.1318 | −3.1923 |
| W | 32 | 0.0041 | 1.1613 | −3.1923 |
| W | 33 | 0.0084 | 1.1907 | −3.1923 |
| W | 34 | 0.0137 | 1.2199 | −3.1923 |
| W | 35 | 0.0203 | 1.2488 | −3.1923 |
| W | 36 | 0.0284 | 1.2774 | −3.1923 |
| W | 37 | 0.0382 | 1.3054 | −3.1923 |
| W | 38 | 0.0501 | 1.3326 | −3.1923 |
| W | 39 | 0.0646 | 1.3584 | −3.1923 |
| W | 40 | 0.0821 | 1.3824 | −3.1923 |
| W | 41 | 0.1027 | 1.4037 | −3.1923 |
| W | 42 | 0.1257 | 1.4224 | −3.1923 |
| W | 43 | 0.1508 | 1.4383 | −3.1923 |
| W | 44 | 0.1774 | 1.4513 | −3.1923 |
| W | 45 | 0.2054 | 1.4612 | −3.1923 |
| W | 46 | 0.3524 | 1.4678 | −3.1923 |
| W | 47 | 0.2343 | 1.4679 | −3.1923 |
| W | 48 | 0.2637 | 1.4718 | −3.1923 |
| W | 49 | 0.3230 | 1.4718 | −3.1923 |
| W | 50 | 0.2934 | 1.4731 | −3.1923 |
| X | 1 | −0.0280 | 0.4312 | −3.3304 |
| X | 2 | −0.0273 | 0.4559 | −3.3304 |
| X | 3 | −0.0266 | 0.4807 | −3.3304 |
| X | 4 | −0.0259 | 0.5054 | −3.3304 |
| X | 5 | −0.0250 | 0.5302 | −3.3304 |
| X | 6 | −0.0241 | 0.5549 | −3.3304 |
| X | 7 | −0.0232 | 0.5796 | −3.3304 |
| X | 8 | −0.0223 | 0.6044 | −3.3304 |
| X | 9 | −0.0213 | 0.6291 | −3.3304 |
| X | 10 | −0.0203 | 0.6539 | −3.3304 |
| X | 11 | −0.0193 | 0.6786 | −3.3304 |
| X | 12 | −0.0182 | 0.7033 | −3.3304 |
| X | 13 | −0.0171 | 0.7281 | −3.3304 |
| X | 14 | −0.0160 | 0.7528 | −3.3304 |
| X | 15 | −0.0149 | 0.7775 | −3.3304 |
| X | 16 | −0.0138 | 0.8023 | −3.3304 |
| X | 17 | −0.0126 | 0.8270 | −3.3304 |
| X | 18 | −0.0113 | 0.8517 | −3.3304 |
| X | 19 | −0.0101 | 0.8764 | −3.3304 |
| X | 20 | −0.0088 | 0.9012 | −3.3304 |
| X | 21 | −0.0074 | 0.9259 | −3.3304 |
| X | 22 | −0.0061 | 0.9506 | −3.3304 |
| X | 23 | −0.0046 | 0.9753 | −3.3304 |
| X | 24 | −0.0030 | 1.0000 | −3.3304 |
| X | 25 | −0.0014 | 1.0247 | −3.3304 |
| X | 26 | 0.0004 | 1.0494 | −3.3304 |
| X | 27 | 0.0024 | 1.0741 | −3.3304 |
| X | 28 | 0.0045 | 1.0988 | −3.3304 |
| X | 29 | 0.0069 | 1.1234 | −3.3304 |
| X | 30 | 0.0097 | 1.1480 | −3.3304 |
| X | 31 | 0.0128 | 1.1726 | −3.3304 |
| X | 32 | 0.0163 | 1.1971 | −3.3304 |
| X | 33 | 0.0203 | 1.2215 | −3.3304 |
| X | 34 | 0.0249 | 1.2458 | −3.3304 |
| X | 35 | 0.0302 | 1.2700 | −3.3304 |
| X | 36 | 0.0364 | 1.2940 | −3.3304 |
| X | 37 | 0.0436 | 1.3177 | −3.3304 |
| X | 38 | 0.0521 | 1.3409 | −3.3304 |
| X | 39 | 0.0621 | 1.3636 | −3.3304 |
| X | 40 | 0.0739 | 1.3853 | −3.3304 |
| X | 41 | 0.0876 | 1.4059 | −3.3304 |
| X | 42 | 0.1033 | 1.4251 | −3.3304 |
| X | 43 | 0.1208 | 1.4426 | −3.3304 |
| X | 44 | 0.1398 | 1.4584 | −3.3304 |
| X | 45 | 0.1602 | 1.4724 | −3.3304 |
| X | 46 | 0.1818 | 1.4846 | −3.3304 |
| X | 47 | 0.2045 | 1.4946 | −3.3304 |
| X | 48 | 0.2282 | 1.5017 | −3.3304 |
| X | 49 | 0.2773 | 1.5033 | −3.3304 |
| X | 50 | 0.2527 | 1.5050 | −3.3304 |
| Y | 1 | 0.0088 | 0.9354 | −3.4684 |
| Y | 2 | 0.0093 | 0.9501 | −3.4684 |
| Y | 3 | 0.0098 | 0.9647 | −3.4684 |
| Y | 4 | 0.0103 | 0.9794 | −3.4684 |
| Y | 5 | 0.0109 | 0.9940 | −3.4684 |
| Y | 6 | 0.0116 | 1.0087 | −3.4684 |
| Y | 7 | 0.0123 | 1.0233 | −3.4684 |
| Y | 8 | 0.0131 | 1.0379 | −3.4684 |
| Y | 9 | 0.0140 | 1.0525 | −3.4684 |
| Y | 10 | 0.0149 | 1.0671 | −3.4684 |
| Y | 11 | 0.0159 | 1.0817 | −3.4684 |
| Y | 12 | 0.0170 | 1.0963 | −3.4684 |
| Y | 13 | 0.0182 | 1.1109 | −3.4684 |
| Y | 14 | 0.0195 | 1.1255 | −3.4684 |
| Y | 15 | 0.0209 | 1.1401 | −3.4684 |
| Y | 16 | 0.0223 | 1.1546 | −3.4684 |
| Y | 17 | 0.0239 | 1.1692 | −3.4684 |
| Y | 18 | 0.0256 | 1.1837 | −3.4684 |
| Y | 19 | 0.0274 | 1.1983 | −3.4684 |
| Y | 20 | 0.0293 | 1.2128 | −3.4684 |
| Y | 21 | 0.0313 | 1.2273 | −3.4684 |

TABLE I-continued

Pressure Side Fillet Profile

| Ref. Plane | Point No. | X | Y | Z |
|---|---|---|---|---|
| Y | 22 | 0.0334 | 1.2418 | −3.4684 |
| Y | 23 | 0.0356 | 1.2563 | −3.4684 |
| Y | 24 | 0.0380 | 1.2708 | −3.4684 |
| Y | 25 | 0.0406 | 1.2852 | −3.4684 |
| Y | 26 | 0.0435 | 1.2997 | −3.4684 |
| Y | 27 | 0.0466 | 1.3140 | −3.4684 |
| Y | 28 | 0.0500 | 1.3282 | −3.4684 |
| Y | 29 | 0.0539 | 1.3423 | −3.4684 |
| Y | 30 | 0.0582 | 1.3562 | −3.4684 |
| Y | 31 | 0.0630 | 1.3700 | −3.4684 |
| Y | 32 | 0.0684 | 1.3836 | −3.4684 |
| Y | 33 | 0.0743 | 1.3971 | −3.4684 |
| Y | 34 | 0.0809 | 1.4102 | −3.4684 |
| Y | 35 | 0.0882 | 1.4230 | −3.4684 |
| Y | 36 | 0.0962 | 1.4354 | −3.4684 |
| Y | 37 | 0.1048 | 1.4471 | −3.4684 |
| Y | 38 | 0.1143 | 1.4583 | −3.4684 |
| Y | 39 | 0.1247 | 1.4689 | −3.4684 |
| Y | 40 | 0.1357 | 1.4787 | −3.4684 |
| Y | 41 | 0.1473 | 1.4876 | −3.4684 |
| Y | 42 | 0.1595 | 1.4958 | −3.4684 |
| Y | 43 | 0.1723 | 1.5032 | −3.4684 |
| Y | 44 | 0.1855 | 1.5098 | −3.4684 |
| Y | 45 | 0.1990 | 1.5156 | −3.4684 |
| Y | 46 | 0.2129 | 1.5206 | −3.4684 |
| Y | 47 | 0.2271 | 1.5244 | −3.4684 |
| Y | 48 | 0.2711 | 1.5258 | −3.4684 |
| Y | 49 | 0.2417 | 1.5268 | −3.4684 |
| Y | 50 | 0.2564 | 1.5274 | −3.4684 |
| Z | 1 | 0.0400 | 1.1654 | −3.6065 |
| Z | 2 | 0.0404 | 1.1760 | −3.6065 |
| Z | 3 | 0.0409 | 1.1866 | −3.6065 |
| Z | 4 | 0.0416 | 1.1972 | −3.6065 |
| Z | 5 | 0.0424 | 1.2078 | −3.6065 |
| Z | 6 | 0.0433 | 1.2184 | −3.6065 |
| Z | 7 | 0.0443 | 1.2290 | −3.6065 |
| Z | 8 | 0.0454 | 1.2395 | −3.6065 |
| Z | 9 | 0.0467 | 1.2501 | −3.6065 |
| Z | 10 | 0.0481 | 1.2606 | −3.6065 |
| Z | 11 | 0.0496 | 1.2711 | −3.6065 |
| Z | 12 | 0.0512 | 1.2816 | −3.6065 |
| Z | 13 | 0.0530 | 1.2921 | −3.6065 |
| Z | 14 | 0.0548 | 1.3025 | −3.6065 |
| Z | 15 | 0.0568 | 1.3129 | −3.6065 |
| Z | 16 | 0.0589 | 1.3233 | −3.6065 |
| Z | 17 | 0.0612 | 1.3337 | −3.6065 |
| Z | 18 | 0.0636 | 1.3441 | −3.6065 |
| Z | 19 | 0.0661 | 1.3544 | −3.6065 |
| Z | 20 | 0.0687 | 1.3647 | −3.6065 |
| Z | 21 | 0.0716 | 1.3749 | −3.6065 |
| Z | 22 | 0.0746 | 1.3851 | −3.6065 |
| Z | 23 | 0.0778 | 1.3952 | −3.6065 |
| Z | 24 | 0.0813 | 1.4053 | −3.6065 |
| Z | 25 | 0.0851 | 1.4152 | −3.6065 |
| Z | 26 | 0.0892 | 1.4250 | −3.6065 |
| Z | 27 | 0.0937 | 1.4346 | −3.6065 |
| Z | 28 | 0.0986 | 1.4440 | −3.6065 |
| Z | 29 | 0.1038 | 1.4532 | −3.6065 |
| Z | 30 | 0.1096 | 1.4622 | −3.6065 |
| Z | 31 | 0.1157 | 1.4708 | −3.6065 |
| Z | 32 | 0.1223 | 1.4791 | −3.6065 |
| Z | 33 | 0.1293 | 1.4871 | −3.6065 |
| Z | 34 | 0.1368 | 1.4947 | −3.6065 |
| Z | 35 | 0.1446 | 1.5018 | −3.6065 |
| Z | 36 | 0.1529 | 1.5085 | −3.6065 |
| Z | 37 | 0.1615 | 1.5147 | −3.6065 |
| Z | 38 | 0.1704 | 1.5204 | −3.6065 |
| Z | 39 | 0.1797 | 1.5255 | −3.6065 |
| Z | 40 | 0.1893 | 1.5301 | −3.6065 |
| Z | 41 | 0.1991 | 1.5342 | −3.6065 |
| Z | 42 | 0.2092 | 1.5376 | −3.6065 |
| Z | 43 | 0.2194 | 1.5405 | −3.6065 |
| Z | 44 | 0.2298 | 1.5427 | −3.6065 |
| Z | 45 | 0.2931 | 1.5430 | −3.6065 |
| Z | 46 | 0.2403 | 1.5444 | −3.6065 |
| Z | 47 | 0.2826 | 1.5446 | −3.6065 |
| Z | 48 | 0.2508 | 1.5454 | −3.6065 |
| Z | 49 | 0.2720 | 1.5455 | −3.6065 |
| Z | 50 | 0.2614 | 1.5458 | −3.6065 |

TABLE II

Suction Side Fillet Profile

| Ref. Plane | Point No. | X | Y | Z |
|---|---|---|---|---|
| A | 1 | −0.2201 | 0.8001 | −0.1551 |
| A | 2 | −0.2204 | 0.8105 | −0.1551 |
| A | 3 | −0.2214 | 0.8208 | −0.1551 |
| A | 4 | −0.2231 | 0.8310 | −0.1551 |
| A | 5 | −0.2255 | 0.8409 | −0.1551 |
| A | 6 | −0.2283 | 0.8508 | −0.1551 |
| A | 7 | −0.2316 | 0.8605 | −0.1551 |
| A | 8 | −0.2352 | 0.8701 | −0.1551 |
| A | 9 | −0.2391 | 0.8796 | −0.1551 |
| A | 10 | −0.2433 | 0.8890 | −0.1551 |
| A | 11 | −0.2476 | 0.8983 | −0.1551 |
| A | 12 | −0.2522 | 0.9075 | −0.1551 |
| A | 13 | −0.2570 | 0.9165 | −0.1551 |
| A | 14 | −0.2621 | 0.9253 | −0.1551 |
| A | 15 | −0.2677 | 0.9339 | −0.1551 |
| A | 16 | −0.2736 | 0.9422 | −0.1551 |
| A | 17 | −0.2801 | 0.9502 | −0.1551 |
| A | 18 | −0.2870 | 0.9580 | −0.1551 |
| A | 19 | −0.2943 | 0.9654 | −0.1551 |
| A | 20 | −0.3018 | 0.9724 | −0.1551 |
| A | 21 | −0.3096 | 0.9791 | −0.1551 |
| A | 22 | −0.3177 | 0.9855 | −0.1551 |
| A | 23 | −0.3259 | 0.9916 | −0.1551 |
| A | 24 | −0.3343 | 0.9974 | −0.1551 |
| A | 25 | −0.3429 | 1.0030 | −0.1551 |
| A | 26 | −0.3516 | 1.0084 | −0.1551 |
| A | 27 | −0.3605 | 1.0136 | −0.1551 |
| A | 28 | −0.3696 | 1.0186 | −0.1551 |
| A | 29 | −0.3787 | 1.0234 | −0.1551 |
| A | 30 | −0.3880 | 1.0280 | −0.1551 |
| A | 31 | −0.3973 | 1.0324 | −0.1551 |
| A | 32 | −0.4066 | 1.0367 | −0.1551 |
| A | 33 | −0.4160 | 1.0409 | −0.1551 |
| A | 34 | −0.4254 | 1.0449 | −0.1551 |
| A | 35 | −0.4349 | 1.0489 | −0.1551 |
| A | 36 | −0.4444 | 1.0528 | −0.1551 |
| A | 37 | −0.4539 | 1.0566 | −0.1551 |
| A | 38 | −0.4635 | 1.0603 | −0.1551 |
| A | 39 | −0.4731 | 1.0639 | −0.1551 |
| A | 40 | −0.4827 | 1.0675 | −0.1551 |
| A | 41 | −0.4923 | 1.0708 | −0.1551 |
| A | 42 | −0.5021 | 1.0741 | −0.1551 |
| A | 43 | −0.5118 | 1.0772 | −0.1551 |
| A | 44 | −0.5216 | 1.0802 | −0.1551 |
| A | 45 | −0.5315 | 1.0829 | −0.1551 |
| A | 46 | −0.5415 | 1.0855 | −0.1551 |
| A | 47 | −0.5515 | 1.0879 | −0.1551 |
| A | 48 | −0.5616 | 1.0900 | −0.1551 |
| A | 49 | −0.5718 | 1.0919 | −0.1551 |
| A | 50 | −0.5821 | 1.0935 | −0.1551 |
| B | 1 | −0.3062 | 0.8027 | −0.2932 |
| B | 2 | −0.3066 | 0.8139 | −0.2932 |
| B | 3 | −0.3075 | 0.8250 | −0.2932 |
| B | 4 | −0.3091 | 0.8361 | −0.2932 |
| B | 5 | −0.3112 | 0.8471 | −0.2932 |
| B | 6 | −0.3138 | 0.8580 | −0.2932 |
| B | 7 | −0.3168 | 0.8687 | −0.2932 |
| B | 8 | −0.3203 | 0.8794 | −0.2932 |
| B | 9 | −0.3241 | 0.8899 | −0.2932 |
| B | 10 | −0.3282 | 0.9003 | −0.2932 |

TABLE II-continued

Suction Side Fillet Profile

| Ref. Plane | Point No. | X | Y | Z |
|---|---|---|---|---|
| B | 11 | −0.3327 | 0.9106 | −0.2932 |
| B | 12 | −0.3376 | 0.9206 | −0.2932 |
| B | 13 | −0.3428 | 0.9305 | −0.2932 |
| B | 14 | −0.3484 | 0.9402 | −0.2932 |
| B | 15 | −0.3544 | 0.9496 | −0.2932 |
| B | 16 | −0.3608 | 0.9588 | −0.2932 |
| B | 17 | −0.3675 | 0.9678 | −0.2932 |
| B | 18 | −0.3746 | 0.9764 | −0.2932 |
| B | 19 | −0.3820 | 0.9848 | −0.2932 |
| B | 20 | −0.3897 | 0.9929 | −0.2932 |
| B | 21 | −0.3977 | 1.0007 | −0.2932 |
| B | 22 | −0.4060 | 1.0083 | −0.2932 |
| B | 23 | −0.4145 | 1.0156 | −0.2932 |
| B | 24 | −0.4232 | 1.0226 | −0.2932 |
| B | 25 | −0.4322 | 1.0293 | −0.2932 |
| B | 26 | −0.4413 | 1.0357 | −0.2932 |
| B | 27 | −0.4506 | 1.0419 | −0.2932 |
| B | 28 | −0.4601 | 1.0478 | −0.2932 |
| B | 29 | −0.4698 | 1.0535 | −0.2932 |
| B | 30 | −0.4795 | 1.0590 | −0.2932 |
| B | 31 | −0.4894 | 1.0642 | −0.2932 |
| B | 32 | −0.4994 | 1.0693 | −0.2932 |
| B | 33 | −0.5094 | 1.0742 | −0.2932 |
| B | 34 | −0.5196 | 1.0790 | −0.2932 |
| B | 35 | −0.5297 | 1.0836 | −0.2932 |
| B | 36 | −0.5400 | 1.0882 | −0.2932 |
| B | 37 | −0.5502 | 1.0926 | −0.2932 |
| B | 38 | −0.5605 | 1.0970 | −0.2932 |
| B | 39 | −0.5709 | 1.1013 | −0.2932 |
| B | 40 | −0.5813 | 1.1054 | −0.2932 |
| B | 41 | −0.5917 | 1.1094 | −0.2932 |
| B | 42 | −0.6022 | 1.1133 | −0.2932 |
| B | 43 | −0.6128 | 1.1170 | −0.2932 |
| B | 44 | −0.6234 | 1.1205 | −0.2932 |
| B | 45 | −0.6341 | 1.1238 | −0.2932 |
| B | 46 | −0.6449 | 1.1268 | −0.2932 |
| B | 47 | −0.6557 | 1.1296 | −0.2932 |
| B | 48 | −0.6666 | 1.1321 | −0.2932 |
| B | 49 | −0.6776 | 1.1343 | −0.2932 |
| B | 50 | −0.6886 | 1.1361 | −0.2932 |
| C | 1 | −0.3644 | 0.8094 | −0.4312 |
| C | 2 | −0.3645 | 0.8219 | −0.4312 |
| C | 3 | −0.3652 | 0.8344 | −0.4312 |
| C | 4 | −0.3663 | 0.8468 | −0.4312 |
| C | 5 | −0.3680 | 0.8592 | −0.4312 |
| C | 6 | −0.3701 | 0.8715 | −0.4312 |
| C | 7 | −0.3728 | 0.8836 | −0.4312 |
| C | 8 | −0.3761 | 0.8957 | −0.4312 |
| C | 9 | −0.3799 | 0.9076 | −0.4312 |
| C | 10 | −0.3843 | 0.9192 | −0.4312 |
| C | 11 | −0.3892 | 0.9307 | −0.4312 |
| C | 12 | −0.3947 | 0.9419 | −0.4312 |
| C | 13 | −0.4007 | 0.9528 | −0.4312 |
| C | 14 | −0.4073 | 0.9635 | −0.4312 |
| C | 15 | −0.4143 | 0.9738 | −0.4312 |
| C | 16 | −0.4217 | 0.9838 | −0.4312 |
| C | 17 | −0.4296 | 0.9934 | −0.4312 |
| C | 18 | −0.4380 | 1.0027 | −0.4312 |
| C | 19 | −0.4467 | 1.0117 | −0.4312 |
| C | 20 | −0.4557 | 1.0202 | −0.4312 |
| C | 21 | −0.4651 | 1.0284 | −0.4312 |
| C | 22 | −0.4748 | 1.0363 | −0.4312 |
| C | 23 | −0.4848 | 1.0438 | −0.4312 |
| C | 24 | −0.4949 | 1.0511 | −0.4312 |
| C | 25 | −0.5053 | 1.0580 | −0.4312 |
| C | 26 | −0.5158 | 1.0647 | −0.4312 |
| C | 27 | −0.5265 | 1.0712 | −0.4312 |
| C | 28 | −0.5373 | 1.0775 | −0.4312 |
| C | 29 | −0.5482 | 1.0835 | −0.4312 |
| C | 30 | −0.5592 | 1.0895 | −0.4312 |
| C | 31 | −0.5702 | 1.0952 | −0.4312 |
| C | 32 | −0.5813 | 1.1009 | −0.4312 |
| C | 33 | −0.5925 | 1.1064 | −0.4312 |
| C | 34 | −0.6038 | 1.1118 | −0.4312 |
| C | 35 | −0.6151 | 1.1172 | −0.4312 |
| C | 36 | −0.6264 | 1.1224 | −0.4312 |
| C | 37 | −0.6377 | 1.1276 | −0.4312 |
| C | 38 | −0.6492 | 1.1326 | −0.4312 |
| C | 39 | −0.6606 | 1.1376 | −0.4312 |
| C | 40 | −0.6721 | 1.1424 | −0.4312 |
| C | 41 | −0.6837 | 1.1471 | −0.4312 |
| C | 42 | −0.6953 | 1.1517 | −0.4312 |
| C | 43 | −0.7070 | 1.1560 | −0.4312 |
| C | 44 | −0.7188 | 1.1601 | −0.4312 |
| C | 45 | −0.7306 | 1.1639 | −0.4312 |
| C | 46 | −0.7426 | 1.1675 | −0.4312 |
| C | 47 | −0.7547 | 1.1707 | −0.4312 |
| C | 48 | −0.7668 | 1.1736 | −0.4312 |
| C | 49 | −0.7790 | 1.1761 | −0.4312 |
| C | 50 | −0.7913 | 1.1782 | −0.4312 |
| D | 1 | −0.4043 | 0.8154 | −0.5693 |
| D | 2 | −0.4044 | 0.8294 | −0.5693 |
| D | 3 | −0.4049 | 0.8435 | −0.5693 |
| D | 4 | −0.4059 | 0.8575 | −0.5693 |
| D | 5 | −0.4074 | 0.8714 | −0.5693 |
| D | 6 | −0.4096 | 0.8853 | −0.5693 |
| D | 7 | −0.4124 | 0.8990 | −0.5693 |
| D | 8 | −0.4159 | 0.9126 | −0.5693 |
| D | 9 | −0.4202 | 0.9259 | −0.5693 |
| D | 10 | −0.4253 | 0.9390 | −0.5693 |
| D | 11 | −0.4312 | 0.9518 | −0.5693 |
| D | 12 | −0.4377 | 0.9642 | −0.5693 |
| D | 13 | −0.4450 | 0.9762 | −0.5693 |
| D | 14 | −0.4529 | 0.9878 | −0.5693 |
| D | 15 | −0.4614 | 0.9989 | −0.5693 |
| D | 16 | −0.4706 | 1.0095 | −0.5693 |
| D | 17 | −0.4803 | 1.0197 | −0.5693 |
| D | 18 | −0.4904 | 1.0294 | −0.5693 |
| D | 19 | −0.5010 | 1.0385 | −0.5693 |
| D | 20 | −0.5120 | 1.0473 | −0.5693 |
| D | 21 | −0.5233 | 1.0556 | −0.5693 |
| D | 22 | −0.5349 | 1.0636 | −0.5693 |
| D | 23 | −0.5467 | 1.0712 | −0.5693 |
| D | 24 | −0.5586 | 1.0786 | −0.5693 |
| D | 25 | −0.5707 | 1.0857 | −0.5693 |
| D | 26 | −0.5829 | 1.0927 | −0.5693 |
| D | 27 | −0.5951 | 1.0995 | −0.5693 |
| D | 28 | −0.6075 | 1.1062 | −0.5693 |
| D | 29 | −0.6199 | 1.1128 | −0.5693 |
| D | 30 | −0.6323 | 1.1192 | −0.5693 |
| D | 31 | −0.6449 | 1.1256 | −0.5693 |
| D | 32 | −0.6574 | 1.1319 | −0.5693 |
| D | 33 | −0.6700 | 1.1380 | −0.5693 |
| D | 34 | −0.6827 | 1.1441 | −0.5693 |
| D | 35 | −0.6953 | 1.1501 | −0.5693 |
| D | 36 | −0.7081 | 1.1561 | −0.5693 |
| D | 37 | −0.7208 | 1.1619 | −0.5693 |
| D | 38 | −0.7336 | 1.1677 | −0.5693 |
| D | 39 | −0.7465 | 1.1734 | −0.5693 |
| D | 40 | −0.7594 | 1.1789 | −0.5693 |
| D | 41 | −0.7723 | 1.1843 | −0.5693 |
| D | 42 | −0.7853 | 1.1895 | −0.5693 |
| D | 43 | −0.7985 | 1.1945 | −0.5693 |
| D | 44 | −0.8117 | 1.1992 | −0.5693 |
| D | 45 | −0.8250 | 1.2036 | −0.5693 |
| D | 46 | −0.8384 | 1.2077 | −0.5693 |
| D | 47 | −0.8520 | 1.2114 | −0.5693 |
| D | 48 | −0.8656 | 1.2147 | −0.5693 |
| D | 49 | −0.8794 | 1.2175 | −0.5693 |
| D | 50 | −0.8932 | 1.2198 | −0.5693 |
| E | 1 | −0.4302 | 0.8224 | −0.7073 |
| E | 2 | −0.4307 | 0.8379 | −0.7073 |
| E | 3 | −0.4324 | 0.8534 | −0.7073 |
| E | 4 | −0.4350 | 0.8688 | −0.7073 |
| E | 5 | −0.4385 | 0.8840 | −0.7073 |
| E | 6 | −0.4426 | 0.8990 | −0.7073 |
| E | 7 | −0.4472 | 0.9139 | −0.7073 |
| E | 8 | −0.4524 | 0.9286 | −0.7073 |
| E | 9 | −0.4582 | 0.9430 | −0.7073 |
| E | 10 | −0.4646 | 0.9572 | −0.7073 |

TABLE II-continued

Suction Side Fillet Profile

| Ref. Plane | Point No. | X | Y | Z |
|---|---|---|---|---|
| E | 11 | −0.4718 | 0.9710 | −0.7073 |
| E | 12 | −0.4798 | 0.9844 | −0.7073 |
| E | 13 | −0.4887 | 0.9972 | −0.7073 |
| E | 14 | −0.4984 | 1.0094 | −0.7073 |
| E | 15 | −0.5088 | 1.0210 | −0.7073 |
| E | 16 | −0.5198 | 1.0321 | −0.7073 |
| E | 17 | −0.5313 | 1.0426 | −0.7073 |
| E | 18 | −0.5432 | 1.0526 | −0.7073 |
| E | 19 | −0.5555 | 1.0621 | −0.7073 |
| E | 20 | −0.5681 | 1.0713 | −0.7073 |
| E | 21 | −0.5810 | 1.0801 | −0.7073 |
| E | 22 | −0.5940 | 1.0886 | −0.7073 |
| E | 23 | −0.6073 | 1.0968 | −0.7073 |
| E | 24 | −0.6207 | 1.1048 | −0.7073 |
| E | 25 | −0.6342 | 1.1125 | −0.7073 |
| E | 26 | −0.6478 | 1.1201 | −0.7073 |
| E | 27 | −0.6614 | 1.1276 | −0.7073 |
| E | 28 | −0.6752 | 1.1349 | −0.7073 |
| E | 29 | −0.6890 | 1.1421 | −0.7073 |
| E | 30 | −0.7029 | 1.1492 | −0.7073 |
| E | 31 | −0.7168 | 1.1562 | −0.7073 |
| E | 32 | −0.7308 | 1.1631 | −0.7073 |
| E | 33 | −0.7448 | 1.1699 | −0.7073 |
| E | 34 | −0.7588 | 1.1767 | −0.7073 |
| E | 35 | −0.7729 | 1.1834 | −0.7073 |
| E | 36 | −0.7870 | 1.1900 | −0.7073 |
| E | 37 | −0.8011 | 1.1966 | −0.7073 |
| E | 38 | −0.8153 | 1.2031 | −0.7073 |
| E | 39 | −0.8295 | 1.2094 | −0.7073 |
| E | 40 | −0.8438 | 1.2157 | −0.7073 |
| E | 41 | −0.8581 | 1.2217 | −0.7073 |
| E | 42 | −0.8726 | 1.2275 | −0.7073 |
| E | 43 | −0.8872 | 1.2330 | −0.7073 |
| E | 44 | −0.9018 | 1.2383 | −0.7073 |
| E | 45 | −0.9166 | 1.2432 | −0.7073 |
| E | 46 | −0.9315 | 1.2477 | −0.7073 |
| E | 47 | −0.9466 | 1.2518 | −0.7073 |
| E | 48 | −0.9617 | 1.2555 | −0.7073 |
| E | 49 | −0.9770 | 1.2586 | −0.7073 |
| E | 50 | −0.9923 | 1.2612 | −0.7073 |
| F | 1 | −0.4451 | 0.8303 | −0.8454 |
| F | 2 | −0.4457 | 0.8474 | −0.8454 |
| F | 3 | −0.4476 | 0.8645 | −0.8454 |
| F | 4 | −0.4507 | 0.8813 | −0.8454 |
| F | 5 | −0.4548 | 0.8980 | −0.8454 |
| F | 6 | −0.4599 | 0.9143 | −0.8454 |
| F | 7 | −0.4660 | 0.9303 | −0.8454 |
| F | 8 | −0.4731 | 0.9459 | −0.8454 |
| F | 9 | −0.4813 | 0.9610 | −0.8454 |
| F | 10 | −0.4904 | 0.9755 | −0.8454 |
| F | 11 | −0.5004 | 0.9894 | −0.8454 |
| F | 12 | −0.5113 | 1.0026 | −0.8454 |
| F | 13 | −0.5229 | 1.0152 | −0.8454 |
| F | 14 | −0.5351 | 1.0272 | −0.8454 |
| F | 15 | −0.5479 | 1.0386 | −0.8454 |
| F | 16 | −0.5610 | 1.0496 | −0.8454 |
| F | 17 | −0.5745 | 1.0602 | −0.8454 |
| F | 18 | −0.5882 | 1.0705 | −0.8454 |
| F | 19 | −0.6021 | 1.0805 | −0.8454 |
| F | 20 | −0.6162 | 1.0902 | −0.8454 |
| F | 21 | −0.6305 | 1.0997 | −0.8454 |
| F | 22 | −0.6449 | 1.1089 | −0.8454 |
| F | 23 | −0.6595 | 1.1180 | −0.8454 |
| F | 24 | −0.6742 | 1.1268 | −0.8454 |
| F | 25 | −0.6890 | 1.1354 | −0.8454 |
| F | 26 | −0.7039 | 1.1439 | −0.8454 |
| F | 27 | −0.7189 | 1.1522 | −0.8454 |
| F | 28 | −0.7340 | 1.1603 | −0.8454 |
| F | 29 | −0.7491 | 1.1683 | −0.8454 |
| F | 30 | −0.7643 | 1.1762 | −0.8454 |
| F | 31 | −0.7795 | 1.1840 | −0.8454 |
| F | 32 | −0.7948 | 1.1918 | −0.8454 |
| F | 33 | −0.8101 | 1.1995 | −0.8454 |
| F | 34 | −0.8255 | 1.2071 | −0.8454 |
| F | 35 | −0.8408 | 1.2147 | −0.8454 |
| F | 36 | −0.8562 | 1.2222 | −0.8454 |
| F | 37 | −0.8717 | 1.2296 | −0.8454 |
| F | 38 | −0.8872 | 1.2369 | −0.8454 |
| F | 39 | −0.9028 | 1.2440 | −0.8454 |
| F | 40 | −0.9185 | 1.2509 | −0.8454 |
| F | 41 | −0.9342 | 1.2576 | −0.8454 |
| F | 42 | −0.9501 | 1.2640 | −0.8454 |
| F | 43 | −0.9661 | 1.2701 | −0.8454 |
| F | 44 | −0.9823 | 1.2759 | −0.8454 |
| F | 45 | −0.9985 | 1.2813 | −0.8454 |
| F | 46 | −1.0149 | 1.2862 | −0.8454 |
| F | 47 | −1.0315 | 1.2907 | −0.8454 |
| F | 48 | −1.0481 | 1.2947 | −0.8454 |
| F | 49 | −1.0649 | 1.2981 | −0.8454 |
| F | 50 | −1.0818 | 1.3010 | −0.8454 |
| G | 1 | −0.4515 | 0.8396 | −0.9834 |
| G | 2 | −0.4520 | 0.8581 | −0.9834 |
| G | 3 | −0.4538 | 0.8765 | −0.9834 |
| G | 4 | −0.4569 | 0.8947 | −0.9834 |
| G | 5 | −0.4614 | 0.9126 | −0.9834 |
| G | 6 | −0.4673 | 0.9301 | −0.9834 |
| G | 7 | −0.4746 | 0.9470 | −0.9834 |
| G | 8 | −0.4834 | 0.9632 | −0.9834 |
| G | 9 | −0.4936 | 0.9786 | −0.9834 |
| G | 10 | −0.5050 | 0.9931 | −0.9834 |
| G | 11 | −0.5174 | 1.0068 | −0.9834 |
| G | 12 | −0.5307 | 1.0196 | −0.9834 |
| G | 13 | −0.5447 | 1.0317 | −0.9834 |
| G | 14 | −0.5591 | 1.0432 | −0.9834 |
| G | 15 | −0.5739 | 1.0544 | −0.9834 |
| G | 16 | −0.5888 | 1.0652 | −0.9834 |
| G | 17 | −0.6039 | 1.0758 | −0.9834 |
| G | 18 | −0.6191 | 1.0863 | −0.9834 |
| G | 19 | −0.6344 | 1.0967 | −0.9834 |
| G | 20 | −0.6498 | 1.1069 | −0.9834 |
| G | 21 | −0.6652 | 1.1171 | −0.9834 |
| G | 22 | −0.6807 | 1.1271 | −0.9834 |
| G | 23 | −0.6963 | 1.1370 | −0.9834 |
| G | 24 | −0.7120 | 1.1467 | −0.9834 |
| G | 25 | −0.7278 | 1.1563 | −0.9834 |
| G | 26 | −0.7437 | 1.1657 | −0.9834 |
| G | 27 | −0.7597 | 1.1749 | −0.9834 |
| G | 28 | −0.7758 | 1.1840 | −0.9834 |
| G | 29 | −0.7920 | 1.1929 | −0.9834 |
| G | 30 | −0.8082 | 1.2017 | −0.9834 |
| G | 31 | −0.8245 | 1.2104 | −0.9834 |
| G | 32 | −0.8409 | 1.2189 | −0.9834 |
| G | 33 | −0.8573 | 1.2274 | −0.9834 |
| G | 34 | −0.8737 | 1.2358 | −0.9834 |
| G | 35 | −0.8902 | 1.2441 | −0.9834 |
| G | 36 | −0.9068 | 1.2523 | −0.9834 |
| G | 37 | −0.9234 | 1.2603 | −0.9834 |
| G | 38 | −0.9401 | 1.2682 | −0.9834 |
| G | 39 | −0.9569 | 1.2759 | −0.9834 |
| G | 40 | −0.9738 | 1.2834 | −0.9834 |
| G | 41 | −0.9908 | 1.2907 | −0.9834 |
| G | 42 | −1.0079 | 1.2976 | −0.9834 |
| G | 43 | −1.0251 | 1.3042 | −0.9834 |
| G | 44 | −1.0425 | 1.3104 | −0.9834 |
| G | 45 | −1.0601 | 1.3162 | −0.9834 |
| G | 46 | −1.0777 | 1.3215 | −0.9834 |
| G | 47 | −1.0956 | 1.3263 | −0.9834 |
| G | 48 | −1.1135 | 1.3306 | −0.9834 |
| G | 49 | −1.1316 | 1.3343 | −0.9834 |
| G | 50 | −1.1498 | 1.3374 | −0.9834 |
| H | 1 | −0.4510 | 0.8504 | −1.1215 |
| H | 2 | −0.4516 | 0.8694 | −1.1215 |
| H | 3 | −0.4538 | 0.8883 | −1.1215 |
| H | 4 | −0.4575 | 0.9070 | −1.1215 |
| H | 5 | −0.4627 | 0.9253 | −1.1215 |
| H | 6 | −0.4694 | 0.9431 | −1.1215 |
| H | 7 | −0.4775 | 0.9603 | −1.1215 |
| H | 8 | −0.4869 | 0.9769 | −1.1215 |
| H | 9 | −0.4977 | 0.9926 | −1.1215 |
| H | 10 | −0.5096 | 1.0073 | −1.1215 |

TABLE II-continued

Suction Side Fillet Profile

| Ref. Plane | Point No. | X | Y | Z |
|---|---|---|---|---|
| H | 11 | −0.5226 | 1.0212 | −1.1215 |
| H | 12 | −0.5365 | 1.0342 | −1.1215 |
| H | 13 | −0.5511 | 1.0465 | −1.1215 |
| H | 14 | −0.5662 | 1.0581 | −1.1215 |
| H | 15 | −0.5816 | 1.0693 | −1.1215 |
| H | 16 | −0.5972 | 1.0802 | −1.1215 |
| H | 17 | −0.6129 | 1.0909 | −1.1215 |
| H | 18 | −0.6287 | 1.1015 | −1.1215 |
| H | 19 | −0.6446 | 1.1121 | −1.1215 |
| H | 20 | −0.6605 | 1.1225 | −1.1215 |
| H | 21 | −0.6764 | 1.1330 | −1.1215 |
| H | 22 | −0.6924 | 1.1433 | −1.1215 |
| H | 23 | −0.7084 | 1.1536 | −1.1215 |
| H | 24 | −0.7245 | 1.1638 | −1.1215 |
| H | 25 | −0.7407 | 1.1738 | −1.1215 |
| H | 26 | −0.7569 | 1.1838 | −1.1215 |
| H | 27 | −0.7731 | 1.1937 | −1.1215 |
| H | 28 | −0.7895 | 1.2034 | −1.1215 |
| H | 29 | −0.8059 | 1.2131 | −1.1215 |
| H | 30 | −0.8224 | 1.2226 | −1.1215 |
| H | 31 | −0.8389 | 1.2320 | −1.1215 |
| H | 32 | −0.8555 | 1.2413 | −1.1215 |
| H | 33 | −0.8722 | 1.2505 | −1.1215 |
| H | 34 | −0.8889 | 1.2596 | −1.1215 |
| H | 35 | −0.9058 | 1.2685 | −1.1215 |
| H | 36 | −0.9226 | 1.2773 | −1.1215 |
| H | 37 | −0.9396 | 1.2859 | −1.1215 |
| H | 38 | −0.9567 | 1.2943 | −1.1215 |
| H | 39 | −0.9739 | 1.3025 | −1.1215 |
| H | 40 | −0.9912 | 1.3104 | −1.1215 |
| H | 41 | −1.0086 | 1.3181 | −1.1215 |
| H | 42 | −1.0262 | 1.3254 | −1.1215 |
| H | 43 | −1.0439 | 1.3323 | −1.1215 |
| H | 44 | −1.0618 | 1.3388 | −1.1215 |
| H | 45 | −1.0799 | 1.3448 | −1.1215 |
| H | 46 | −1.0981 | 1.3504 | −1.1215 |
| H | 47 | −1.1164 | 1.3554 | −1.1215 |
| H | 48 | −1.1350 | 1.3598 | −1.1215 |
| H | 49 | −1.1536 | 1.3637 | −1.1215 |
| H | 50 | −1.1724 | 1.3669 | −1.1215 |
| I | 1 | −0.4451 | 0.8621 | −1.2595 |
| I | 2 | −0.4457 | 0.8811 | −1.2595 |
| I | 3 | −0.4479 | 0.8999 | −1.2595 |
| I | 4 | −0.4517 | 0.9185 | −1.2595 |
| I | 5 | −0.4570 | 0.9368 | −1.2595 |
| I | 6 | −0.4636 | 0.9546 | −1.2595 |
| I | 7 | −0.4715 | 0.9719 | −1.2595 |
| I | 8 | −0.4807 | 0.9885 | −1.2595 |
| I | 9 | −0.4910 | 1.0045 | −1.2595 |
| I | 10 | −0.5024 | 1.0197 | −1.2595 |
| I | 11 | −0.5148 | 1.0341 | −1.2595 |
| I | 12 | −0.5281 | 1.0477 | −1.2595 |
| I | 13 | −0.5420 | 1.0606 | −1.2595 |
| I | 14 | −0.5565 | 1.0729 | −1.2595 |
| I | 15 | −0.5714 | 1.0847 | −1.2595 |
| I | 16 | −0.5867 | 1.0961 | −1.2595 |
| I | 17 | −0.6021 | 1.1071 | −1.2595 |
| I | 18 | −0.6178 | 1.1179 | −1.2595 |
| I | 19 | −0.6335 | 1.1286 | −1.2595 |
| I | 20 | −0.6494 | 1.1390 | −1.2595 |
| I | 21 | −0.6654 | 1.1493 | −1.2595 |
| I | 22 | −0.6814 | 1.1595 | −1.2595 |
| I | 23 | −0.6975 | 1.1696 | −1.2595 |
| I | 24 | −0.7136 | 1.1797 | −1.2595 |
| I | 25 | −0.7297 | 1.1898 | −1.2595 |
| I | 26 | −0.7459 | 1.1999 | −1.2595 |
| I | 27 | −0.7620 | 1.2099 | −1.2595 |
| I | 28 | −0.7782 | 1.2199 | −1.2595 |
| I | 29 | −0.7943 | 1.2299 | −1.2595 |
| I | 30 | −0.8105 | 1.2399 | −1.2595 |
| I | 31 | −0.8268 | 1.2498 | −1.2595 |
| I | 32 | −0.8430 | 1.2596 | −1.2595 |
| I | 33 | −0.8594 | 1.2693 | −1.2595 |
| I | 34 | −0.8758 | 1.2788 | −1.2595 |
| I | 35 | −0.8923 | 1.2883 | −1.2595 |
| I | 36 | −0.9089 | 1.2976 | −1.2595 |
| I | 37 | −0.9256 | 1.3066 | −1.2595 |
| I | 38 | −0.9424 | 1.3155 | −1.2595 |
| I | 39 | −0.9594 | 1.3241 | −1.2595 |
| I | 40 | −0.9765 | 1.3324 | −1.2595 |
| I | 41 | −0.9937 | 1.3404 | −1.2595 |
| I | 42 | −1.0112 | 1.3479 | −1.2595 |
| I | 43 | −1.0288 | 1.3551 | −1.2595 |
| I | 44 | −1.0465 | 1.3618 | −1.2595 |
| I | 45 | −1.0645 | 1.3681 | −1.2595 |
| I | 46 | −1.0826 | 1.3738 | −1.2595 |
| I | 47 | −1.1009 | 1.3789 | −1.2595 |
| I | 48 | −1.1194 | 1.3834 | −1.2595 |
| I | 49 | −1.1380 | 1.3873 | −1.2595 |
| I | 50 | −1.1567 | 1.3905 | −1.2595 |
| J | 1 | −0.4345 | 0.8786 | −1.3976 |
| J | 2 | −0.4349 | 0.8971 | −1.3976 |
| J | 3 | −0.4369 | 0.9155 | −1.3976 |
| J | 4 | −0.4403 | 0.9337 | −1.3976 |
| J | 5 | −0.4451 | 0.9516 | −1.3976 |
| J | 6 | −0.4512 | 0.9691 | −1.3976 |
| J | 7 | −0.4585 | 0.9861 | −1.3976 |
| J | 8 | −0.4670 | 1.0026 | −1.3976 |
| J | 9 | −0.4766 | 1.0184 | −1.3976 |
| J | 10 | −0.4873 | 1.0336 | −1.3976 |
| J | 11 | −0.4988 | 1.0481 | −1.3976 |
| J | 12 | −0.5110 | 1.0619 | −1.3976 |
| J | 13 | −0.5239 | 1.0752 | −1.3976 |
| J | 14 | −0.5374 | 1.0880 | −1.3976 |
| J | 15 | −0.5513 | 1.1002 | −1.3976 |
| J | 16 | −0.5655 | 1.1121 | −1.3976 |
| J | 17 | −0.5801 | 1.1236 | −1.3976 |
| J | 18 | −0.5948 | 1.1347 | −1.3976 |
| J | 19 | −0.6098 | 1.1457 | −1.3976 |
| J | 20 | −0.6249 | 1.1564 | −1.3976 |
| J | 21 | −0.6401 | 1.1670 | −1.3976 |
| J | 22 | −0.6554 | 1.1774 | −1.3976 |
| J | 23 | −0.6708 | 1.1877 | −1.3976 |
| J | 24 | −0.6863 | 1.1979 | −1.3976 |
| J | 25 | −0.7018 | 1.2080 | −1.3976 |
| J | 26 | −0.7173 | 1.2181 | −1.3976 |
| J | 27 | −0.7329 | 1.2281 | −1.3976 |
| J | 28 | −0.7485 | 1.2381 | −1.3976 |
| J | 29 | −0.7641 | 1.2481 | −1.3976 |
| J | 30 | −0.7797 | 1.2580 | −1.3976 |
| J | 31 | −0.7954 | 1.2678 | −1.3976 |
| J | 32 | −0.8112 | 1.2775 | −1.3976 |
| J | 33 | −0.8270 | 1.2872 | −1.3976 |
| J | 34 | −0.8429 | 1.2967 | −1.3976 |
| J | 35 | −0.8589 | 1.3060 | −1.3976 |
| J | 36 | −0.8750 | 1.3152 | −1.3976 |
| J | 37 | −0.8912 | 1.3243 | −1.3976 |
| J | 38 | −0.9075 | 1.3331 | −1.3976 |
| J | 39 | −0.9239 | 1.3417 | −1.3976 |
| J | 40 | −0.9404 | 1.3500 | −1.3976 |
| J | 41 | −0.9571 | 1.3581 | −1.3976 |
| J | 42 | −0.9739 | 1.3659 | −1.3976 |
| J | 43 | −0.9908 | 1.3733 | −1.3976 |
| J | 44 | −1.0080 | 1.3803 | −1.3976 |
| J | 45 | −1.0253 | 1.3868 | −1.3976 |
| J | 46 | −1.0429 | 1.3927 | −1.3976 |
| J | 47 | −1.0606 | 1.3981 | −1.3976 |
| J | 48 | −1.0785 | 1.4028 | −1.3976 |
| J | 49 | −1.0966 | 1.4067 | −1.3976 |
| J | 50 | −1.1149 | 1.4099 | −1.3976 |
| K | 1 | −0.4201 | 0.9045 | −1.5357 |
| K | 2 | −0.4204 | 0.9222 | −1.5357 |
| K | 3 | −0.4220 | 0.9397 | −1.5357 |
| K | 4 | −0.4250 | 0.9571 | −1.5357 |
| K | 5 | −0.4291 | 0.9743 | −1.5357 |
| K | 6 | −0.4344 | 0.9911 | −1.5357 |
| K | 7 | −0.4409 | 1.0075 | −1.5357 |
| K | 8 | −0.4486 | 1.0234 | −1.5357 |
| K | 9 | −0.4573 | 1.0387 | −1.5357 |
| K | 10 | −0.4670 | 1.0534 | −1.5357 |

TABLE II-continued

Suction Side Fillet Profile

| Ref. Plane | Point No. | X | Y | Z |
|---|---|---|---|---|
| K | 11 | −0.4774 | 1.0676 | −1.5357 |
| K | 12 | −0.4886 | 1.0813 | −1.5357 |
| K | 13 | −0.5004 | 1.0944 | −1.5357 |
| K | 14 | −0.5128 | 1.1070 | −1.5357 |
| K | 15 | −0.5255 | 1.1192 | −1.5357 |
| K | 16 | −0.5386 | 1.1310 | −1.5357 |
| K | 17 | −0.5520 | 1.1425 | −1.5357 |
| K | 18 | −0.5655 | 1.1538 | −1.5357 |
| K | 19 | −0.5793 | 1.1648 | −1.5357 |
| K | 20 | −0.5932 | 1.1757 | −1.5357 |
| K | 21 | −0.6072 | 1.1865 | −1.5357 |
| K | 22 | −0.6213 | 1.1971 | −1.5357 |
| K | 23 | −0.6355 | 1.2075 | −1.5357 |
| K | 24 | −0.6498 | 1.2178 | −1.5357 |
| K | 25 | −0.6642 | 1.2280 | −1.5357 |
| K | 26 | −0.6788 | 1.2380 | −1.5357 |
| K | 27 | −0.6934 | 1.2478 | −1.5357 |
| K | 28 | −0.7081 | 1.2576 | −1.5357 |
| K | 29 | −0.7229 | 1.2672 | −1.5357 |
| K | 30 | −0.7378 | 1.2767 | −1.5357 |
| K | 31 | −0.7527 | 1.2861 | −1.5357 |
| K | 32 | −0.7677 | 1.2954 | −1.5357 |
| K | 33 | −0.7827 | 1.3046 | −1.5357 |
| K | 34 | −0.7978 | 1.3136 | −1.5357 |
| K | 35 | −0.8130 | 1.3226 | −1.5357 |
| K | 36 | −0.8283 | 1.3315 | −1.5357 |
| K | 37 | −0.8436 | 1.3403 | −1.5357 |
| K | 38 | −0.8589 | 1.3489 | −1.5357 |
| K | 39 | −0.8744 | 1.3574 | −1.5357 |
| K | 40 | −0.8899 | 1.3658 | −1.5357 |
| K | 41 | −0.9056 | 1.3739 | −1.5357 |
| K | 42 | −0.9214 | 1.3817 | −1.5357 |
| K | 43 | −0.9374 | 1.3892 | −1.5357 |
| K | 44 | −0.9535 | 1.3963 | −1.5357 |
| K | 45 | −0.9699 | 1.4029 | −1.5357 |
| K | 46 | −0.9865 | 1.4089 | −1.5357 |
| K | 47 | −1.0033 | 1.4144 | −1.5357 |
| K | 48 | −1.0203 | 1.4191 | −1.5357 |
| K | 49 | −1.0374 | 1.4230 | −1.5357 |
| K | 50 | −1.0548 | 1.4262 | −1.5357 |
| L | 1 | −0.4025 | 0.9374 | −1.6737 |
| L | 2 | −0.4028 | 0.9539 | −1.6737 |
| L | 3 | −0.4042 | 0.9704 | −1.6737 |
| L | 4 | −0.4068 | 0.9867 | −1.6737 |
| L | 5 | −0.4104 | 1.0029 | −1.6737 |
| L | 6 | −0.4151 | 1.0187 | −1.6737 |
| L | 7 | −0.4209 | 1.0342 | −1.6737 |
| L | 8 | −0.4276 | 1.0494 | −1.6737 |
| L | 9 | −0.4352 | 1.0640 | −1.6737 |
| L | 10 | −0.4436 | 1.0782 | −1.6737 |
| L | 11 | −0.4529 | 1.0919 | −1.6737 |
| L | 12 | −0.4629 | 1.1051 | −1.6737 |
| L | 13 | −0.4735 | 1.1178 | −1.6737 |
| L | 14 | −0.4847 | 1.1300 | −1.6737 |
| L | 15 | −0.4963 | 1.1418 | −1.6737 |
| L | 16 | −0.5082 | 1.1533 | −1.6737 |
| L | 17 | −0.5203 | 1.1645 | −1.6737 |
| L | 18 | −0.5327 | 1.1755 | −1.6737 |
| L | 19 | −0.5452 | 1.1864 | −1.6737 |
| L | 20 | −0.5577 | 1.1971 | −1.6737 |
| L | 21 | −0.5704 | 1.2077 | −1.6737 |
| L | 22 | −0.5832 | 1.2182 | −1.6737 |
| L | 23 | −0.5961 | 1.2285 | −1.6737 |
| L | 24 | −0.6092 | 1.2387 | −1.6737 |
| L | 25 | −0.6224 | 1.2487 | −1.6737 |
| L | 26 | −0.6357 | 1.2584 | −1.6737 |
| L | 27 | −0.6492 | 1.2680 | −1.6737 |
| L | 28 | −0.6629 | 1.2774 | −1.6737 |
| L | 29 | −0.6766 | 1.2865 | −1.6737 |
| L | 30 | −0.6905 | 1.2955 | −1.6737 |
| L | 31 | −0.7045 | 1.3044 | −1.6737 |
| L | 32 | −0.7185 | 1.3131 | −1.6737 |
| L | 33 | −0.7326 | 1.3218 | −1.6737 |
| L | 34 | −0.7467 | 1.3304 | −1.6737 |
| L | 35 | −0.7609 | 1.3390 | −1.6737 |
| L | 36 | −0.7750 | 1.3475 | −1.6737 |
| L | 37 | −0.7892 | 1.3560 | −1.6737 |
| L | 38 | −0.8034 | 1.3645 | −1.6737 |
| L | 39 | −0.8176 | 1.3729 | −1.6737 |
| L | 40 | −0.8320 | 1.3812 | −1.6737 |
| L | 41 | −0.8464 | 1.3893 | −1.6737 |
| L | 42 | −0.8610 | 1.3970 | −1.6737 |
| L | 43 | −0.8758 | 1.4045 | −1.6737 |
| L | 44 | −0.8908 | 1.4115 | −1.6737 |
| L | 45 | −0.9060 | 1.4180 | −1.6737 |
| L | 46 | −0.9214 | 1.4239 | −1.6737 |
| L | 47 | −0.9371 | 1.4292 | −1.6737 |
| L | 48 | −0.9530 | 1.4337 | −1.6737 |
| L | 49 | −0.9691 | 1.4376 | −1.6737 |
| L | 50 | −0.9853 | 1.4405 | −1.6737 |
| M | 1 | −0.3825 | 0.9685 | −1.8118 |
| M | 2 | −0.3827 | 0.9839 | −1.8118 |
| M | 3 | −0.3839 | 0.9993 | −1.8118 |
| M | 4 | −0.3862 | 1.0146 | −1.8118 |
| M | 5 | −0.3895 | 1.0297 | −1.8118 |
| M | 6 | −0.3936 | 1.0446 | −1.8118 |
| M | 7 | −0.3986 | 1.0592 | −1.8118 |
| M | 8 | −0.4044 | 1.0735 | −1.8118 |
| M | 9 | −0.4110 | 1.0875 | −1.8118 |
| M | 10 | −0.4182 | 1.1011 | −1.8118 |
| M | 11 | −0.4261 | 1.1144 | −1.8118 |
| M | 12 | −0.4346 | 1.1273 | −1.8118 |
| M | 13 | −0.4436 | 1.1398 | −1.8118 |
| M | 14 | −0.4530 | 1.1520 | −1.8118 |
| M | 15 | −0.4629 | 1.1639 | −1.8118 |
| M | 16 | −0.4731 | 1.1755 | −1.8118 |
| M | 17 | −0.4836 | 1.1868 | −1.8118 |
| M | 18 | −0.4943 | 1.1979 | −1.8118 |
| M | 19 | −0.5052 | 1.2088 | −1.8118 |
| M | 20 | −0.5164 | 1.2196 | −1.8118 |
| M | 21 | −0.5276 | 1.2301 | −1.8118 |
| M | 22 | −0.5391 | 1.2405 | −1.8118 |
| M | 23 | −0.5507 | 1.2507 | −1.8118 |
| M | 24 | −0.5625 | 1.2606 | −1.8118 |
| M | 25 | −0.5745 | 1.2703 | −1.8118 |
| M | 26 | −0.5867 | 1.2798 | −1.8118 |
| M | 27 | −0.5990 | 1.2891 | −1.8118 |
| M | 28 | −0.6116 | 1.2981 | −1.8118 |
| M | 29 | −0.6243 | 1.3068 | −1.8118 |
| M | 30 | −0.6372 | 1.3153 | −1.8118 |
| M | 31 | −0.6502 | 1.3236 | −1.8118 |
| M | 32 | −0.6633 | 1.3318 | −1.8118 |
| M | 33 | −0.6765 | 1.3398 | −1.8118 |
| M | 34 | −0.6897 | 1.3478 | −1.8118 |
| M | 35 | −0.7030 | 1.3557 | −1.8118 |
| M | 36 | −0.7163 | 1.3636 | −1.8118 |
| M | 37 | −0.7296 | 1.3714 | −1.8118 |
| M | 38 | −0.7428 | 1.3794 | −1.8118 |
| M | 39 | −0.7561 | 1.3873 | −1.8118 |
| M | 40 | −0.7694 | 1.3952 | −1.8118 |
| M | 41 | −0.7827 | 1.4029 | −1.8118 |
| M | 42 | −0.7961 | 1.4105 | −1.8118 |
| M | 43 | −0.8097 | 1.4179 | −1.8118 |
| M | 44 | −0.8235 | 1.4248 | −1.8118 |
| M | 45 | −0.8375 | 1.4313 | −1.8118 |
| M | 46 | −0.8518 | 1.4373 | −1.8118 |
| M | 47 | −0.8663 | 1.4426 | −1.8118 |
| M | 48 | −0.8810 | 1.4472 | −1.8118 |
| M | 49 | −0.8960 | 1.4509 | −1.8118 |
| M | 50 | −0.9111 | 1.4538 | −1.8118 |
| N | 1 | −0.3606 | 0.9979 | −1.9498 |
| N | 2 | −0.3606 | 1.0123 | −1.9498 |
| N | 3 | −0.3617 | 1.0267 | −1.9498 |
| N | 4 | −0.3635 | 1.0409 | −1.9498 |
| N | 5 | −0.3662 | 1.0550 | −1.9498 |
| N | 6 | −0.3697 | 1.0690 | −1.9498 |
| N | 7 | −0.3739 | 1.0828 | −1.9498 |
| N | 8 | −0.3787 | 1.0963 | −1.9498 |
| N | 9 | −0.3842 | 1.1096 | −1.9498 |
| N | 10 | −0.3902 | 1.1227 | −1.9498 |

TABLE II-continued

Suction Side Fillet Profile

| Ref. Plane | Point No. | X | Y | Z |
|---|---|---|---|---|
| N | 11 | −0.3967 | 1.1355 | −1.9498 |
| N | 12 | −0.4037 | 1.1481 | −1.9498 |
| N | 13 | −0.4111 | 1.1604 | −1.9498 |
| N | 14 | −0.4189 | 1.1725 | −1.9498 |
| N | 15 | −0.4271 | 1.1843 | −1.9498 |
| N | 16 | −0.4357 | 1.1959 | −1.9498 |
| N | 17 | −0.4445 | 1.2072 | −1.9498 |
| N | 18 | −0.4537 | 1.2182 | −1.9498 |
| N | 19 | −0.4632 | 1.2291 | −1.9498 |
| N | 20 | −0.4729 | 1.2397 | −1.9498 |
| N | 21 | −0.4828 | 1.2501 | −1.9498 |
| N | 22 | −0.4930 | 1.2603 | −1.9498 |
| N | 23 | −0.5034 | 1.2702 | −1.9498 |
| N | 24 | −0.5140 | 1.2799 | −1.9498 |
| N | 25 | −0.5248 | 1.2894 | −1.9498 |
| N | 26 | −0.5358 | 1.2987 | −1.9498 |
| N | 27 | −0.5470 | 1.3077 | −1.9498 |
| N | 28 | −0.5584 | 1.3165 | −1.9498 |
| N | 29 | −0.5700 | 1.3250 | −1.9498 |
| N | 30 | −0.5818 | 1.3332 | −1.9498 |
| N | 31 | −0.5937 | 1.3413 | −1.9498 |
| N | 32 | −0.6057 | 1.3491 | −1.9498 |
| N | 33 | −0.6179 | 1.3568 | −1.9498 |
| N | 34 | −0.6301 | 1.3644 | −1.9498 |
| N | 35 | −0.6424 | 1.3718 | −1.9498 |
| N | 36 | −0.6548 | 1.3792 | −1.9498 |
| N | 37 | −0.6672 | 1.3865 | −1.9498 |
| N | 38 | −0.6795 | 1.3939 | −1.9498 |
| N | 39 | −0.6918 | 1.4013 | −1.9498 |
| N | 40 | −0.7042 | 1.4087 | −1.9498 |
| N | 41 | −0.7165 | 1.4162 | −1.9498 |
| N | 42 | −0.7288 | 1.4235 | −1.9498 |
| N | 43 | −0.7413 | 1.4307 | −1.9498 |
| N | 44 | −0.7539 | 1.4376 | −1.9498 |
| N | 45 | −0.7668 | 1.4441 | −1.9498 |
| N | 46 | −0.7799 | 1.4500 | −1.9498 |
| N | 47 | −0.7932 | 1.4553 | −1.9498 |
| N | 48 | −0.8069 | 1.4598 | −1.9498 |
| N | 49 | −0.8208 | 1.4635 | −1.9498 |
| N | 50 | −0.8349 | 1.4663 | −1.9498 |
| O | 1 | −0.3371 | 1.0270 | −2.0879 |
| O | 2 | −0.3370 | 1.0404 | −2.0879 |
| O | 3 | −0.3378 | 1.0537 | −2.0879 |
| O | 4 | −0.3392 | 1.0670 | −2.0879 |
| O | 5 | −0.3412 | 1.0803 | −2.0879 |
| O | 6 | −0.3439 | 1.0934 | −2.0879 |
| O | 7 | −0.3472 | 1.1064 | −2.0879 |
| O | 8 | −0.3510 | 1.1192 | −2.0879 |
| O | 9 | −0.3553 | 1.1318 | −2.0879 |
| O | 10 | −0.3602 | 1.1443 | −2.0879 |
| O | 11 | −0.3655 | 1.1566 | −2.0879 |
| O | 12 | −0.3713 | 1.1687 | −2.0879 |
| O | 13 | −0.3775 | 1.1805 | −2.0879 |
| O | 14 | −0.3841 | 1.1921 | −2.0879 |
| O | 15 | −0.3911 | 1.2035 | −2.0879 |
| O | 16 | −0.3985 | 1.2147 | −2.0879 |
| O | 17 | −0.4062 | 1.2257 | −2.0879 |
| O | 18 | −0.4141 | 1.2364 | −2.0879 |
| O | 19 | −0.4224 | 1.2470 | −2.0879 |
| O | 20 | −0.4309 | 1.2573 | −2.0879 |
| O | 21 | −0.4396 | 1.2674 | −2.0879 |
| O | 22 | −0.4486 | 1.2774 | −2.0879 |
| O | 23 | −0.4577 | 1.2872 | −2.0879 |
| O | 24 | −0.4671 | 1.2967 | −2.0879 |
| O | 25 | −0.4766 | 1.3061 | −2.0879 |
| O | 26 | −0.4864 | 1.3152 | −2.0879 |
| O | 27 | −0.4964 | 1.3241 | −2.0879 |
| O | 28 | −0.5065 | 1.3328 | −2.0879 |
| O | 29 | −0.5169 | 1.3413 | −2.0879 |
| O | 30 | −0.5275 | 1.3495 | −2.0879 |
| O | 31 | −0.5382 | 1.3575 | −2.0879 |
| O | 32 | −0.5491 | 1.3653 | −2.0879 |
| O | 33 | −0.5601 | 1.3729 | −2.0879 |
| O | 34 | −0.5712 | 1.3804 | −2.0879 |
| O | 35 | −0.5824 | 1.3877 | −2.0879 |
| O | 36 | −0.5937 | 1.3949 | −2.0879 |
| O | 37 | −0.6051 | 1.4019 | −2.0879 |
| O | 38 | −0.6165 | 1.4089 | −2.0879 |
| O | 39 | −0.6279 | 1.4159 | −2.0879 |
| O | 40 | −0.6393 | 1.4229 | −2.0879 |
| O | 41 | −0.6507 | 1.4299 | −2.0879 |
| O | 42 | −0.6621 | 1.4369 | −2.0879 |
| O | 43 | −0.6736 | 1.4437 | −2.0879 |
| O | 44 | −0.6852 | 1.4504 | −2.0879 |
| O | 45 | −0.6970 | 1.4567 | −2.0879 |
| O | 46 | −0.7091 | 1.4626 | −2.0879 |
| O | 47 | −0.7214 | 1.4678 | −2.0879 |
| O | 48 | −0.7340 | 1.4723 | −2.0879 |
| O | 49 | −0.7468 | 1.4760 | −2.0879 |
| O | 50 | −0.7600 | 1.4786 | −2.0879 |
| P | 1 | −0.3126 | 1.0541 | −2.2259 |
| P | 2 | −0.3124 | 1.0666 | −2.2259 |
| P | 3 | −0.3128 | 1.0791 | −2.2259 |
| P | 4 | −0.3137 | 1.0916 | −2.2259 |
| P | 5 | −0.3151 | 1.1040 | −2.2259 |
| P | 6 | −0.3170 | 1.1164 | −2.2259 |
| P | 7 | −0.3193 | 1.1287 | −2.2259 |
| P | 8 | −0.3222 | 1.1409 | −2.2259 |
| P | 9 | −0.3255 | 1.1529 | −2.2259 |
| P | 10 | −0.3294 | 1.1648 | −2.2259 |
| P | 11 | −0.3337 | 1.1766 | −2.2259 |
| P | 12 | −0.3385 | 1.1881 | −2.2259 |
| P | 13 | −0.3438 | 1.1994 | −2.2259 |
| P | 14 | −0.3496 | 1.2106 | −2.2259 |
| P | 15 | −0.3557 | 1.2215 | −2.2259 |
| P | 16 | −0.3622 | 1.2322 | −2.2259 |
| P | 17 | −0.3690 | 1.2427 | −2.2259 |
| P | 18 | −0.3760 | 1.2530 | −2.2259 |
| P | 19 | −0.3833 | 1.2632 | −2.2259 |
| P | 20 | −0.3907 | 1.2733 | −2.2259 |
| P | 21 | −0.3983 | 1.2832 | −2.2259 |
| P | 22 | −0.4061 | 1.2931 | −2.2259 |
| P | 23 | −0.4140 | 1.3028 | −2.2259 |
| P | 24 | −0.4220 | 1.3124 | −2.2259 |
| P | 25 | −0.4303 | 1.3218 | −2.2259 |
| P | 26 | −0.4387 | 1.3310 | −2.2259 |
| P | 27 | −0.4473 | 1.3401 | −2.2259 |
| P | 28 | −0.4562 | 1.3489 | −2.2259 |
| P | 29 | −0.4653 | 1.3575 | −2.2259 |
| P | 30 | −0.4746 | 1.3658 | −2.2259 |
| P | 31 | −0.4842 | 1.3739 | −2.2259 |
| P | 32 | −0.4940 | 1.3817 | −2.2259 |
| P | 33 | −0.5040 | 1.3892 | −2.2259 |
| P | 34 | −0.5142 | 1.3965 | −2.2259 |
| P | 35 | −0.5245 | 1.4036 | −2.2259 |
| P | 36 | −0.5349 | 1.4105 | −2.2259 |
| P | 37 | −0.5454 | 1.4173 | −2.2259 |
| P | 38 | −0.5560 | 1.4240 | −2.2259 |
| P | 39 | −0.5666 | 1.4306 | −2.2259 |
| P | 40 | −0.5773 | 1.4371 | −2.2259 |
| P | 41 | −0.5880 | 1.4436 | −2.2259 |
| P | 42 | −0.5987 | 1.4501 | −2.2259 |
| P | 43 | −0.6094 | 1.4566 | −2.2259 |
| P | 44 | −0.6201 | 1.4631 | −2.2259 |
| P | 45 | −0.6310 | 1.4693 | −2.2259 |
| P | 46 | −0.6420 | 1.4751 | −2.2259 |
| P | 47 | −0.6534 | 1.4804 | −2.2259 |
| P | 48 | −0.6650 | 1.4850 | −2.2259 |
| P | 49 | −0.6770 | 1.4886 | −2.2259 |
| P | 50 | −0.6892 | 1.4912 | −2.2259 |
| Q | 1 | −0.2872 | 1.0810 | −2.3640 |
| Q | 2 | −0.2870 | 1.0928 | −2.3640 |
| Q | 3 | −0.2872 | 1.1045 | −2.3640 |
| Q | 4 | −0.2879 | 1.1163 | −2.3640 |
| Q | 5 | −0.2889 | 1.1280 | −2.3640 |
| Q | 6 | −0.2904 | 1.1396 | −2.3640 |
| Q | 7 | −0.2923 | 1.1512 | −2.3640 |
| Q | 8 | −0.2946 | 1.1627 | −2.3640 |
| Q | 9 | −0.2973 | 1.1742 | −2.3640 |
| Q | 10 | −0.3004 | 1.1855 | −2.3640 |

TABLE II-continued

Suction Side Fillet Profile

| Ref. Plane | Point No. | X | Y | Z |
|---|---|---|---|---|
| Q | 11 | −0.3040 | 1.1967 | −2.3640 |
| Q | 12 | −0.3080 | 1.2077 | −2.3640 |
| Q | 13 | −0.3123 | 1.2186 | −2.3640 |
| Q | 14 | −0.3171 | 1.2294 | −2.3640 |
| Q | 15 | −0.3223 | 1.2399 | −2.3640 |
| Q | 16 | −0.3277 | 1.2503 | −2.3640 |
| Q | 17 | −0.3335 | 1.2606 | −2.3640 |
| Q | 18 | −0.3395 | 1.2706 | −2.3640 |
| Q | 19 | −0.3458 | 1.2806 | −2.3640 |
| Q | 20 | −0.3522 | 1.2904 | −2.3640 |
| Q | 21 | −0.3589 | 1.3001 | −2.3640 |
| Q | 22 | −0.3656 | 1.3097 | −2.3640 |
| Q | 23 | −0.3725 | 1.3192 | −2.3640 |
| Q | 24 | −0.3795 | 1.3287 | −2.3640 |
| Q | 25 | −0.3867 | 1.3380 | −2.3640 |
| Q | 26 | −0.3940 | 1.3471 | −2.3640 |
| Q | 27 | −0.4016 | 1.3561 | −2.3640 |
| Q | 28 | −0.4093 | 1.3650 | −2.3640 |
| Q | 29 | −0.4173 | 1.3736 | −2.3640 |
| Q | 30 | −0.4256 | 1.3819 | −2.3640 |
| Q | 31 | −0.4342 | 1.3899 | −2.3640 |
| Q | 32 | −0.4430 | 1.3977 | −2.3640 |
| Q | 33 | −0.4522 | 1.4050 | −2.3640 |
| Q | 34 | −0.4615 | 1.4121 | −2.3640 |
| Q | 35 | −0.4711 | 1.4190 | −2.3640 |
| Q | 36 | −0.4807 | 1.4257 | −2.3640 |
| Q | 37 | −0.4905 | 1.4322 | −2.3640 |
| Q | 38 | −0.5003 | 1.4387 | −2.3640 |
| Q | 39 | −0.5100 | 1.4453 | −2.3640 |
| Q | 40 | −0.5198 | 1.4519 | −2.3640 |
| Q | 41 | −0.5295 | 1.4584 | −2.3640 |
| Q | 42 | −0.5392 | 1.4650 | −2.3640 |
| Q | 43 | −0.5491 | 1.4714 | −2.3640 |
| Q | 44 | −0.5590 | 1.4777 | −2.3640 |
| Q | 45 | −0.5691 | 1.4837 | −2.3640 |
| Q | 46 | −0.5795 | 1.4892 | −2.3640 |
| Q | 47 | −0.5901 | 1.4942 | −2.3640 |
| Q | 48 | −0.6011 | 1.4984 | −2.3640 |
| Q | 49 | −0.6123 | 1.5018 | −2.3640 |
| Q | 50 | −0.6238 | 1.5043 | −2.3640 |
| R | 1 | −0.2611 | 1.1064 | −2.5020 |
| R | 2 | −0.2609 | 1.1175 | −2.5020 |
| R | 3 | −0.2611 | 1.1285 | −2.5020 |
| R | 4 | −0.2616 | 1.1396 | −2.5020 |
| R | 5 | −0.2625 | 1.1506 | −2.5020 |
| R | 6 | −0.2638 | 1.1616 | −2.5020 |
| R | 7 | −0.2654 | 1.1725 | −2.5020 |
| R | 8 | −0.2673 | 1.1834 | −2.5020 |
| R | 9 | −0.2696 | 1.1942 | −2.5020 |
| R | 10 | −0.2722 | 1.2050 | −2.5020 |
| R | 11 | −0.2751 | 1.2156 | −2.5020 |
| R | 12 | −0.2784 | 1.2262 | −2.5020 |
| R | 13 | −0.2820 | 1.2367 | −2.5020 |
| R | 14 | −0.2859 | 1.2470 | −2.5020 |
| R | 15 | −0.2901 | 1.2572 | −2.5020 |
| R | 16 | −0.2947 | 1.2673 | −2.5020 |
| R | 17 | −0.2995 | 1.2772 | −2.5020 |
| R | 18 | −0.3046 | 1.2871 | −2.5020 |
| R | 19 | −0.3100 | 1.2967 | −2.5020 |
| R | 20 | −0.3156 | 1.3063 | −2.5020 |
| R | 21 | −0.3213 | 1.3157 | −2.5020 |
| R | 22 | −0.3273 | 1.3250 | −2.5020 |
| R | 23 | −0.3334 | 1.3342 | −2.5020 |
| R | 24 | −0.3396 | 1.3434 | −2.5020 |
| R | 25 | −0.3459 | 1.3525 | −2.5020 |
| R | 26 | −0.3523 | 1.3615 | −2.5020 |
| R | 27 | −0.3589 | 1.3704 | −2.5020 |
| R | 28 | −0.3656 | 1.3791 | −2.5020 |
| R | 29 | −0.3726 | 1.3877 | −2.5020 |
| R | 30 | −0.3798 | 1.3961 | −2.5020 |
| R | 31 | −0.3873 | 1.4043 | −2.5020 |
| R | 32 | −0.3950 | 1.4121 | −2.5020 |
| R | 33 | −0.4031 | 1.4197 | −2.5020 |
| R | 34 | −0.4115 | 1.4269 | −2.5020 |
| R | 35 | −0.4201 | 1.4338 | −2.5020 |
| R | 36 | −0.4289 | 1.4406 | −2.5020 |
| R | 37 | −0.4377 | 1.4472 | −2.5020 |
| R | 38 | −0.4466 | 1.4537 | −2.5020 |
| R | 39 | −0.4555 | 1.4603 | −2.5020 |
| R | 40 | −0.4644 | 1.4669 | −2.5020 |
| R | 41 | −0.4733 | 1.4735 | −2.5020 |
| R | 42 | −0.4822 | 1.4800 | −2.5020 |
| R | 43 | −0.4912 | 1.4864 | −2.5020 |
| R | 44 | −0.5005 | 1.4925 | −2.5020 |
| R | 45 | −0.5099 | 1.4982 | −2.5020 |
| R | 46 | −0.5197 | 1.5035 | −2.5020 |
| R | 47 | −0.5297 | 1.5081 | −2.5020 |
| R | 48 | −0.5400 | 1.5121 | −2.5020 |
| R | 49 | −0.5506 | 1.5152 | −2.5020 |
| R | 50 | −0.5614 | 1.5175 | −2.5020 |
| S | 1 | −0.2346 | 1.1300 | −2.6401 |
| S | 2 | −0.2344 | 1.1404 | −2.6401 |
| S | 3 | −0.2345 | 1.1509 | −2.6401 |
| S | 4 | −0.2350 | 1.1613 | −2.6401 |
| S | 5 | −0.2357 | 1.1717 | −2.6401 |
| S | 6 | −0.2367 | 1.1821 | −2.6401 |
| S | 7 | −0.2380 | 1.1925 | −2.6401 |
| S | 8 | −0.2396 | 1.2028 | −2.6401 |
| S | 9 | −0.2416 | 1.2131 | −2.6401 |
| S | 10 | −0.2438 | 1.2233 | −2.6401 |
| S | 11 | −0.2462 | 1.2334 | −2.6401 |
| S | 12 | −0.2490 | 1.2435 | −2.6401 |
| S | 13 | −0.2520 | 1.2535 | −2.6401 |
| S | 14 | −0.2553 | 1.2634 | −2.6401 |
| S | 15 | −0.2589 | 1.2732 | −2.6401 |
| S | 16 | −0.2627 | 1.2829 | −2.6401 |
| S | 17 | −0.2668 | 1.2925 | −2.6401 |
| S | 18 | −0.2711 | 1.3020 | −2.6401 |
| S | 19 | −0.2757 | 1.3114 | −2.6401 |
| S | 20 | −0.2805 | 1.3207 | −2.6401 |
| S | 21 | −0.2854 | 1.3299 | −2.6401 |
| S | 22 | −0.2905 | 1.3390 | −2.6401 |
| S | 23 | −0.2957 | 1.3481 | −2.6401 |
| S | 24 | −0.3011 | 1.3570 | −2.6401 |
| S | 25 | −0.3065 | 1.3660 | −2.6401 |
| S | 26 | −0.3121 | 1.3748 | −2.6401 |
| S | 27 | −0.3177 | 1.3836 | −2.6401 |
| S | 28 | −0.3235 | 1.3923 | −2.6401 |
| S | 29 | −0.3295 | 1.4008 | −2.6401 |
| S | 30 | −0.3357 | 1.4093 | −2.6401 |
| S | 31 | −0.3421 | 1.4175 | −2.6401 |
| S | 32 | −0.3488 | 1.4255 | −2.6401 |
| S | 33 | −0.3558 | 1.4332 | −2.6401 |
| S | 34 | −0.3631 | 1.4408 | −2.6401 |
| S | 35 | −0.3705 | 1.4480 | −2.6401 |
| S | 36 | −0.3782 | 1.4551 | −2.6401 |
| S | 37 | −0.3861 | 1.4620 | −2.6401 |
| S | 38 | −0.3941 | 1.4687 | −2.6401 |
| S | 39 | −0.4022 | 1.4753 | −2.6401 |
| S | 40 | −0.4104 | 1.4818 | −2.6401 |
| S | 41 | −0.4186 | 1.4882 | −2.6401 |
| S | 42 | −0.4269 | 1.4945 | −2.6401 |
| S | 43 | −0.4354 | 1.5007 | −2.6401 |
| S | 44 | −0.4440 | 1.5066 | −2.6401 |
| S | 45 | −0.4529 | 1.5121 | −2.6401 |
| S | 46 | −0.4620 | 1.5171 | −2.6401 |
| S | 47 | −0.4714 | 1.5217 | −2.6401 |
| S | 48 | −0.4811 | 1.5255 | −2.6401 |
| S | 49 | −0.4911 | 1.5286 | −2.6401 |
| S | 50 | −0.5013 | 1.5308 | −2.6401 |
| T | 1 | −0.2079 | 1.1538 | −2.7781 |
| T | 2 | −0.2077 | 1.1637 | −2.7781 |
| T | 3 | −0.2078 | 1.1735 | −2.7781 |
| T | 4 | −0.2082 | 1.1834 | −2.7781 |
| T | 5 | −0.2088 | 1.1933 | −2.7781 |
| T | 6 | −0.2097 | 1.2032 | −2.7781 |
| T | 7 | −0.2108 | 1.2130 | −2.7781 |
| T | 8 | −0.2122 | 1.2228 | −2.7781 |
| T | 9 | −0.2139 | 1.2325 | −2.7781 |
| T | 10 | −0.2157 | 1.2423 | −2.7781 |

TABLE II-continued

Suction Side Fillet Profile

| Ref. Plane | Point No. | X | Y | Z |
|---|---|---|---|---|
| T | 11 | −0.2179 | 1.2519 | −2.7781 |
| T | 12 | −0.2202 | 1.2615 | −2.7781 |
| T | 13 | −0.2228 | 1.2711 | −2.7781 |
| T | 14 | −0.2256 | 1.2806 | −2.7781 |
| T | 15 | −0.2286 | 1.2900 | −2.7781 |
| T | 16 | −0.2318 | 1.2994 | −2.7781 |
| T | 17 | −0.2351 | 1.3087 | −2.7781 |
| T | 18 | −0.2387 | 1.3179 | −2.7781 |
| T | 19 | −0.2425 | 1.3270 | −2.7781 |
| T | 20 | −0.2464 | 1.3361 | −2.7781 |
| T | 21 | −0.2504 | 1.3452 | −2.7781 |
| T | 22 | −0.2545 | 1.3541 | −2.7781 |
| T | 23 | −0.2588 | 1.3631 | −2.7781 |
| T | 24 | −0.2632 | 1.3719 | −2.7781 |
| T | 25 | −0.2678 | 1.3807 | −2.7781 |
| T | 26 | −0.2724 | 1.3895 | −2.7781 |
| T | 27 | −0.2772 | 1.3981 | −2.7781 |
| T | 28 | −0.2822 | 1.4066 | −2.7781 |
| T | 29 | −0.2874 | 1.4150 | −2.7781 |
| T | 30 | −0.2929 | 1.4233 | −2.7781 |
| T | 31 | −0.2985 | 1.4314 | −2.7781 |
| T | 32 | −0.3044 | 1.4393 | −2.7781 |
| T | 33 | −0.3106 | 1.4471 | −2.7781 |
| T | 34 | −0.3170 | 1.4546 | −2.7781 |
| T | 35 | −0.3236 | 1.4620 | −2.7781 |
| T | 36 | −0.3303 | 1.4693 | −2.7781 |
| T | 37 | −0.3372 | 1.4764 | −2.7781 |
| T | 38 | −0.3442 | 1.4834 | −2.7781 |
| T | 39 | −0.3514 | 1.4902 | −2.7781 |
| T | 40 | −0.3586 | 1.4969 | −2.7781 |
| T | 41 | −0.3661 | 1.5034 | −2.7781 |
| T | 42 | −0.3737 | 1.5098 | −2.7781 |
| T | 43 | −0.3815 | 1.5158 | −2.7781 |
| T | 44 | −0.3896 | 1.5215 | −2.7781 |
| T | 45 | −0.3980 | 1.5267 | −2.7781 |
| T | 46 | −0.4067 | 1.5315 | −2.7781 |
| T | 47 | −0.4156 | 1.5357 | −2.7781 |
| T | 48 | −0.4249 | 1.5392 | −2.7781 |
| T | 49 | −0.4343 | 1.5421 | −2.7781 |
| T | 50 | −0.4440 | 1.5442 | −2.7781 |
| U | 1 | −0.1813 | 1.1751 | −2.9162 |
| U | 2 | −0.1811 | 1.1845 | −2.9162 |
| U | 3 | −0.1810 | 1.1939 | −2.9162 |
| U | 4 | −0.1813 | 1.2034 | −2.9162 |
| U | 5 | −0.1818 | 1.2128 | −2.9162 |
| U | 6 | −0.1825 | 1.2221 | −2.9162 |
| U | 7 | −0.1834 | 1.2315 | −2.9162 |
| U | 8 | −0.1845 | 1.2409 | −2.9162 |
| U | 9 | −0.1858 | 1.2502 | −2.9162 |
| U | 10 | −0.1873 | 1.2595 | −2.9162 |
| U | 11 | −0.1890 | 1.2687 | −2.9162 |
| U | 12 | −0.1909 | 1.2779 | −2.9162 |
| U | 13 | −0.1930 | 1.2871 | −2.9162 |
| U | 14 | −0.1952 | 1.2962 | −2.9162 |
| U | 15 | −0.1976 | 1.3053 | −2.9162 |
| U | 16 | −0.2002 | 1.3144 | −2.9162 |
| U | 17 | −0.2030 | 1.3234 | −2.9162 |
| U | 18 | −0.2060 | 1.3323 | −2.9162 |
| U | 19 | −0.2090 | 1.3412 | −2.9162 |
| U | 20 | −0.2123 | 1.3500 | −2.9162 |
| U | 21 | −0.2157 | 1.3588 | −2.9162 |
| U | 22 | −0.2192 | 1.3675 | −2.9162 |
| U | 23 | −0.2228 | 1.3762 | −2.9162 |
| U | 24 | −0.2265 | 1.3849 | −2.9162 |
| U | 25 | −0.2304 | 1.3935 | −2.9162 |
| U | 26 | −0.2343 | 1.4020 | −2.9162 |
| U | 27 | −0.2384 | 1.4105 | −2.9162 |
| U | 28 | −0.2426 | 1.4189 | −2.9162 |
| U | 29 | −0.2470 | 1.4272 | −2.9162 |
| U | 30 | −0.2515 | 1.4355 | −2.9162 |
| U | 31 | −0.2562 | 1.4436 | −2.9162 |
| U | 32 | −0.2611 | 1.4517 | −2.9162 |
| U | 33 | −0.2661 | 1.4596 | −2.9162 |
| U | 34 | −0.2714 | 1.4674 | −2.9162 |
| U | 35 | −0.2768 | 1.4751 | −2.9162 |
| U | 36 | −0.2825 | 1.4826 | −2.9162 |
| U | 37 | −0.2883 | 1.4900 | −2.9162 |
| U | 38 | −0.2944 | 1.4972 | −2.9162 |
| U | 39 | −0.3006 | 1.5042 | −2.9162 |
| U | 40 | −0.3071 | 1.5110 | −2.9162 |
| U | 41 | −0.3139 | 1.5176 | −2.9162 |
| U | 42 | −0.3208 | 1.5239 | −2.9162 |
| U | 43 | −0.3281 | 1.5299 | −2.9162 |
| U | 44 | −0.3357 | 1.5354 | −2.9162 |
| U | 45 | −0.3436 | 1.5405 | −2.9162 |
| U | 46 | −0.3518 | 1.5451 | −2.9162 |
| U | 47 | −0.3603 | 1.5492 | −2.9162 |
| U | 48 | −0.3691 | 1.5525 | −2.9162 |
| U | 49 | −0.3781 | 1.5553 | −2.9162 |
| U | 50 | −0.3873 | 1.5573 | −2.9162 |
| V | 1 | −0.1550 | 1.1962 | −3.0542 |
| V | 2 | −0.1547 | 1.2052 | −3.0542 |
| V | 3 | −0.1546 | 1.2142 | −3.0542 |
| V | 4 | −0.1548 | 1.2232 | −3.0542 |
| V | 5 | −0.1551 | 1.2321 | −3.0542 |
| V | 6 | −0.1555 | 1.2411 | −3.0542 |
| V | 7 | −0.1561 | 1.2501 | −3.0542 |
| V | 8 | −0.1569 | 1.2590 | −3.0542 |
| V | 9 | −0.1579 | 1.2680 | −3.0542 |
| V | 10 | −0.1590 | 1.2769 | −3.0542 |
| V | 11 | −0.1602 | 1.2858 | −3.0542 |
| V | 12 | −0.1616 | 1.2946 | −3.0542 |
| V | 13 | −0.1631 | 1.3034 | −3.0542 |
| V | 14 | −0.1648 | 1.3122 | −3.0542 |
| V | 15 | −0.1666 | 1.3209 | −3.0542 |
| V | 16 | −0.1685 | 1.3296 | −3.0542 |
| V | 17 | −0.1705 | 1.3383 | −3.0542 |
| V | 18 | −0.1727 | 1.3469 | −3.0542 |
| V | 19 | −0.1750 | 1.3555 | −3.0542 |
| V | 20 | −0.1775 | 1.3640 | −3.0542 |
| V | 21 | −0.1801 | 1.3725 | −3.0542 |
| V | 22 | −0.1828 | 1.3810 | −3.0542 |
| V | 23 | −0.1857 | 1.3894 | −3.0542 |
| V | 24 | −0.1887 | 1.3978 | −3.0542 |
| V | 25 | −0.1918 | 1.4061 | −3.0542 |
| V | 26 | −0.1951 | 1.4144 | −3.0542 |
| V | 27 | −0.1986 | 1.4226 | −3.0542 |
| V | 28 | −0.2021 | 1.4308 | −3.0542 |
| V | 29 | −0.2059 | 1.4390 | −3.0542 |
| V | 30 | −0.2097 | 1.4471 | −3.0542 |
| V | 31 | −0.2138 | 1.4552 | −3.0542 |
| V | 32 | −0.2179 | 1.4631 | −3.0542 |
| V | 33 | −0.2222 | 1.4710 | −3.0542 |
| V | 34 | −0.2267 | 1.4788 | −3.0542 |
| V | 35 | −0.2313 | 1.4864 | −3.0542 |
| V | 36 | −0.2362 | 1.4939 | −3.0542 |
| V | 37 | −0.2412 | 1.5013 | −3.0542 |
| V | 38 | −0.2465 | 1.5086 | −3.0542 |
| V | 39 | −0.2520 | 1.5157 | −3.0542 |
| V | 40 | −0.2577 | 1.5226 | −3.0542 |
| V | 41 | −0.2637 | 1.5294 | −3.0542 |
| V | 42 | −0.2700 | 1.5358 | −3.0542 |
| V | 43 | −0.2766 | 1.5419 | −3.0542 |
| V | 44 | −0.2835 | 1.5477 | −3.0542 |
| V | 45 | −0.2908 | 1.5530 | −3.0542 |
| V | 46 | −0.2984 | 1.5578 | −3.0542 |
| V | 47 | −0.3065 | 1.5620 | −3.0542 |
| V | 48 | −0.3147 | 1.5655 | −3.0542 |
| V | 49 | −0.3233 | 1.5683 | −3.0542 |
| V | 50 | −0.3321 | 1.5703 | −3.0542 |
| W | 1 | −0.1290 | 1.2164 | −3.1923 |
| W | 2 | −0.1287 | 1.2250 | −3.1923 |
| W | 3 | −0.1286 | 1.2336 | −3.1923 |
| W | 4 | −0.1286 | 1.2421 | −3.1923 |
| W | 5 | −0.1287 | 1.2507 | −3.1923 |
| W | 6 | −0.1289 | 1.2593 | −3.1923 |
| W | 7 | −0.1292 | 1.2679 | −3.1923 |
| W | 8 | −0.1296 | 1.2765 | −3.1923 |
| W | 9 | −0.1301 | 1.2850 | −3.1923 |
| W | 10 | −0.1307 | 1.2936 | −3.1923 |

TABLE II-continued

Suction Side Fillet Profile

| Ref. Plane | Point No. | X | Y | Z |
|---|---|---|---|---|
| W | 11 | −0.1314 | 1.3022 | −3.1923 |
| W | 12 | −0.1323 | 1.3107 | −3.1923 |
| W | 13 | −0.1332 | 1.3193 | −3.1923 |
| W | 14 | −0.1342 | 1.3278 | −3.1923 |
| W | 15 | −0.1354 | 1.3363 | −3.1923 |
| W | 16 | −0.1366 | 1.3448 | −3.1923 |
| W | 17 | −0.1379 | 1.3533 | −3.1923 |
| W | 18 | −0.1394 | 1.3617 | −3.1923 |
| W | 19 | −0.1410 | 1.3702 | −3.1923 |
| W | 20 | −0.1426 | 1.3786 | −3.1923 |
| W | 21 | −0.1445 | 1.3870 | −3.1923 |
| W | 22 | −0.1464 | 1.3954 | −3.1923 |
| W | 23 | −0.1486 | 1.4037 | −3.1923 |
| W | 24 | −0.1509 | 1.4120 | −3.1923 |
| W | 25 | −0.1534 | 1.4202 | −3.1923 |
| W | 26 | −0.1561 | 1.4283 | −3.1923 |
| W | 27 | −0.1589 | 1.4364 | −3.1923 |
| W | 28 | −0.1619 | 1.4445 | −3.1923 |
| W | 29 | −0.1651 | 1.4524 | −3.1923 |
| W | 30 | −0.1685 | 1.4604 | −3.1923 |
| W | 31 | −0.1720 | 1.4682 | −3.1923 |
| W | 32 | −0.1757 | 1.4760 | −3.1923 |
| W | 33 | −0.1795 | 1.4836 | −3.1923 |
| W | 34 | −0.1835 | 1.4912 | −3.1923 |
| W | 35 | −0.1877 | 1.4987 | −3.1923 |
| W | 36 | −0.1920 | 1.5061 | −3.1923 |
| W | 37 | −0.1966 | 1.5134 | −3.1923 |
| W | 38 | −0.2013 | 1.5206 | −3.1923 |
| W | 39 | −0.2062 | 1.5277 | −3.1923 |
| W | 40 | −0.2112 | 1.5346 | −3.1923 |
| W | 41 | −0.2165 | 1.5414 | −3.1923 |
| W | 42 | −0.2221 | 1.5479 | −3.1923 |
| W | 43 | −0.2279 | 1.5542 | −3.1923 |
| W | 44 | −0.2342 | 1.5601 | −3.1923 |
| W | 45 | −0.2408 | 1.5656 | −3.1923 |
| W | 46 | −0.2478 | 1.5706 | −3.1923 |
| W | 47 | −0.2552 | 1.5749 | −3.1923 |
| W | 48 | −0.2630 | 1.5785 | −3.1923 |
| W | 49 | −0.2711 | 1.5814 | −3.1923 |
| W | 50 | −0.2794 | 1.5833 | −3.1923 |
| X | 1 | −0.1035 | 1.2338 | −3.3304 |
| X | 2 | −0.1032 | 1.2420 | −3.3304 |
| X | 3 | −0.1030 | 1.2503 | −3.3304 |
| X | 4 | −0.1028 | 1.2586 | −3.3304 |
| X | 5 | −0.1027 | 1.2669 | −3.3304 |
| X | 6 | −0.1026 | 1.2752 | −3.3304 |
| X | 7 | −0.1025 | 1.2834 | −3.3304 |
| X | 8 | −0.1026 | 1.2917 | −3.3304 |
| X | 9 | −0.1026 | 1.3000 | −3.3304 |
| X | 10 | −0.1028 | 1.3083 | −3.3304 |
| X | 11 | −0.1030 | 1.3166 | −3.3304 |
| X | 12 | −0.1034 | 1.3248 | −3.3304 |
| X | 13 | −0.1038 | 1.3331 | −3.3304 |
| X | 14 | −0.1042 | 1.3414 | −3.3304 |
| X | 15 | −0.1048 | 1.3496 | −3.3304 |
| X | 16 | −0.1055 | 1.3579 | −3.3304 |
| X | 17 | −0.1063 | 1.3661 | −3.3304 |
| X | 18 | −0.1072 | 1.3744 | −3.3304 |
| X | 19 | −0.1083 | 1.3826 | −3.3304 |
| X | 20 | −0.1094 | 1.3908 | −3.3304 |
| X | 21 | −0.1107 | 1.3990 | −3.3304 |
| X | 22 | −0.1121 | 1.4071 | −3.3304 |
| X | 23 | −0.1137 | 1.4153 | −3.3304 |
| X | 24 | −0.1154 | 1.4234 | −3.3304 |
| X | 25 | −0.1172 | 1.4314 | −3.3304 |
| X | 26 | −0.1192 | 1.4395 | −3.3304 |
| X | 27 | −0.1214 | 1.4475 | −3.3304 |
| X | 28 | −0.1237 | 1.4554 | −3.3304 |
| X | 29 | −0.1261 | 1.4633 | −3.3304 |
| X | 30 | −0.1287 | 1.4712 | −3.3304 |
| X | 31 | −0.1315 | 1.4790 | −3.3304 |
| X | 32 | −0.1345 | 1.4867 | −3.3304 |
| X | 33 | −0.1376 | 1.4944 | −3.3304 |
| X | 34 | −0.1410 | 1.5020 | −3.3304 |
| X | 35 | −0.1445 | 1.5095 | −3.3304 |
| X | 36 | −0.1482 | 1.5169 | −3.3304 |
| X | 37 | −0.1520 | 1.5242 | −3.3304 |
| X | 38 | −0.1561 | 1.5314 | −3.3304 |
| X | 39 | −0.1603 | 1.5385 | −3.3304 |
| X | 40 | −0.1648 | 1.5455 | −3.3304 |
| X | 41 | −0.1694 | 1.5524 | −3.3304 |
| X | 42 | −0.1743 | 1.5591 | −3.3304 |
| X | 43 | −0.1794 | 1.5656 | −3.3304 |
| X | 44 | −0.1850 | 1.5718 | −3.3304 |
| X | 45 | −0.1909 | 1.5775 | −3.3304 |
| X | 46 | −0.1973 | 1.5828 | −3.3304 |
| X | 47 | −0.2042 | 1.5874 | −3.3304 |
| X | 48 | −0.2115 | 1.5912 | −3.3304 |
| X | 49 | −0.2193 | 1.5941 | −3.3304 |
| X | 50 | −0.2273 | 1.5961 | −3.3304 |
| Y | 1 | −0.0781 | 1.2511 | −3.4684 |
| Y | 2 | −0.0779 | 1.2590 | −3.4684 |
| Y | 3 | −0.0776 | 1.2670 | −3.4684 |
| Y | 4 | −0.0774 | 1.2749 | −3.4684 |
| Y | 5 | −0.0773 | 1.2828 | −3.4684 |
| Y | 6 | −0.0771 | 1.2908 | −3.4684 |
| Y | 7 | −0.0770 | 1.2987 | −3.4684 |
| Y | 8 | −0.0770 | 1.3066 | −3.4684 |
| Y | 9 | −0.0770 | 1.3146 | −3.4684 |
| Y | 10 | −0.0770 | 1.3225 | −3.4684 |
| Y | 11 | −0.0771 | 1.3305 | −3.4684 |
| Y | 12 | −0.0773 | 1.3384 | −3.4684 |
| Y | 13 | −0.0775 | 1.3463 | −3.4684 |
| Y | 14 | −0.0778 | 1.3543 | −3.4684 |
| Y | 15 | −0.0781 | 1.3622 | −3.4684 |
| Y | 16 | −0.0785 | 1.3701 | −3.4684 |
| Y | 17 | −0.0790 | 1.3781 | −3.4684 |
| Y | 18 | −0.0795 | 1.3860 | −3.4684 |
| Y | 19 | −0.0801 | 1.3939 | −3.4684 |
| Y | 20 | −0.0808 | 1.4018 | −3.4684 |
| Y | 21 | −0.0815 | 1.4097 | −3.4684 |
| Y | 22 | −0.0824 | 1.4176 | −3.4684 |
| Y | 23 | −0.0833 | 1.4255 | −3.4684 |
| Y | 24 | −0.0844 | 1.4334 | −3.4684 |
| Y | 25 | −0.0855 | 1.4412 | −3.4684 |
| Y | 26 | −0.0868 | 1.4490 | −3.4684 |
| Y | 27 | −0.0883 | 1.4569 | −3.4684 |
| Y | 28 | −0.0899 | 1.4646 | −3.4684 |
| Y | 29 | −0.0916 | 1.4724 | −3.4684 |
| Y | 30 | −0.0935 | 1.4801 | −3.4684 |
| Y | 31 | −0.0956 | 1.4877 | −3.4684 |
| Y | 32 | −0.0978 | 1.4954 | −3.4684 |
| Y | 33 | −0.1002 | 1.5029 | −3.4684 |
| Y | 34 | −0.1028 | 1.5104 | −3.4684 |
| Y | 35 | −0.1055 | 1.5179 | −3.4684 |
| Y | 36 | −0.1083 | 1.5253 | −3.4684 |
| Y | 37 | −0.1114 | 1.5327 | −3.4684 |
| Y | 38 | −0.1145 | 1.5399 | −3.4684 |
| Y | 39 | −0.1178 | 1.5472 | −3.4684 |
| Y | 40 | −0.1213 | 1.5543 | −3.4684 |
| Y | 41 | −0.1250 | 1.5613 | −3.4684 |
| Y | 42 | −0.1288 | 1.5683 | −3.4684 |
| Y | 43 | −0.1330 | 1.5751 | −3.4684 |
| Y | 44 | −0.1374 | 1.5817 | −3.4684 |
| Y | 45 | −0.1423 | 1.5880 | −3.4684 |
| Y | 46 | −0.1477 | 1.5938 | −3.4684 |
| Y | 47 | −0.1537 | 1.5989 | −3.4684 |
| Y | 48 | −0.1604 | 1.6032 | −3.4684 |
| Y | 49 | −0.1676 | 1.6065 | −3.4684 |
| Y | 50 | −0.1752 | 1.6085 | −3.4684 |
| Z | 1 | −0.0526 | 1.2670 | −3.6065 |
| Z | 2 | −0.0523 | 1.2747 | −3.6065 |
| Z | 3 | −0.0521 | 1.2824 | −3.6065 |
| Z | 4 | −0.0520 | 1.2900 | −3.6065 |
| Z | 5 | −0.0518 | 1.2977 | −3.6065 |
| Z | 6 | −0.0518 | 1.3053 | −3.6065 |
| Z | 7 | −0.0517 | 1.3130 | −3.6065 |
| Z | 8 | −0.0517 | 1.3207 | −3.6065 |
| Z | 9 | −0.0517 | 1.3283 | −3.6065 |
| Z | 10 | −0.0518 | 1.3360 | −3.6065 |

TABLE II-continued

Suction Side Fillet Profile

| Ref. Plane | Point No. | X | Y | Z |
|---|---|---|---|---|
| Z | 11 | −0.0519 | 1.3437 | −3.6065 |
| Z | 12 | −0.0520 | 1.3513 | −3.6065 |
| Z | 13 | −0.0522 | 1.3590 | −3.6065 |
| Z | 14 | −0.0524 | 1.3667 | −3.6065 |
| Z | 15 | −0.0526 | 1.3743 | −3.6065 |
| Z | 16 | −0.0528 | 1.3820 | −3.6065 |
| Z | 17 | −0.0530 | 1.3896 | −3.6065 |
| Z | 18 | −0.0533 | 1.3973 | −3.6065 |
| Z | 19 | −0.0536 | 1.4050 | −3.6065 |
| Z | 20 | −0.0539 | 1.4126 | −3.6065 |
| Z | 21 | −0.0543 | 1.4203 | −3.6065 |
| Z | 22 | −0.0546 | 1.4279 | −3.6065 |
| Z | 23 | −0.0551 | 1.4356 | −3.6065 |
| Z | 24 | −0.0556 | 1.4432 | −3.6065 |
| Z | 25 | −0.0562 | 1.4509 | −3.6065 |
| Z | 26 | −0.0570 | 1.4585 | −3.6065 |
| Z | 27 | −0.0578 | 1.4661 | −3.6065 |
| Z | 28 | −0.0588 | 1.4737 | −3.6065 |
| Z | 29 | −0.0598 | 1.4813 | −3.6065 |
| Z | 30 | −0.0611 | 1.4889 | −3.6065 |
| Z | 31 | −0.0624 | 1.4964 | −3.6065 |
| Z | 32 | −0.0639 | 1.5039 | −3.6065 |
| Z | 33 | −0.0655 | 1.5114 | −3.6065 |
| Z | 34 | −0.0672 | 1.5189 | −3.6065 |
| Z | 35 | −0.0690 | 1.5264 | −3.6065 |
| Z | 36 | −0.0709 | 1.5338 | −3.6065 |
| Z | 37 | −0.0729 | 1.5412 | −3.6065 |
| Z | 38 | −0.0751 | 1.5485 | −3.6065 |
| Z | 39 | −0.0774 | 1.5558 | −3.6065 |
| Z | 40 | −0.0798 | 1.5631 | −3.6065 |
| Z | 41 | −0.0824 | 1.5703 | −3.6065 |
| Z | 42 | −0.0853 | 1.5775 | −3.6065 |
| Z | 43 | −0.0883 | 1.5845 | −3.6065 |
| Z | 44 | −0.0917 | 1.5914 | −3.6065 |
| Z | 45 | −0.0955 | 1.5981 | −3.6065 |
| Z | 46 | −0.0998 | 1.6044 | −3.6065 |
| Z | 47 | −0.1049 | 1.6101 | −3.6065 |
| Z | 48 | −0.1109 | 1.6150 | −3.6065 |
| Z | 49 | −0.1175 | 1.6186 | −3.6065 |
| Z | 50 | −0.1248 | 1.6209 | −3.6065 |

In addition, the present invention includes alternative embodiments of fillet 50 that are defined in a different manner, i.e., in a way other than using the points of Tables I and II. For example, present fillet 50 may be described in accordance with the path or shape of intersection line 58 as it extends between leading edge 52 and trailing edge 54. As will be seen, the shape of this path can be described with reference to a characteristic that will be referred to herein as "fillet height". As used herein, fillet height is the distance that fillet 50 extends from the outer radial tip of airfoil 46 toward platform 40. More particularly, fillet height is the distance occurring between intersection line 58 and the outer radial tip of airfoil 46.

For example, on pressure side 53 of airfoil 46, with specific reference again to FIG. 4, it will be appreciated that the height of fillet 50 varies considerably between leading edge 52 and trailing edge 54. According to exemplary embodiments, the particular manner in which the height of fillet 50 is varied across width 62 of airfoil 46 may be described with reference to particular height characteristics occurring within five reference sections or ranges that are defined widthwise across airfoil 46 for this purpose. (As introduced above, the width 62 of the airfoil 46 is the distance across a chord of the airfoil 46 or, put another way, the distance between leading and trailing edges 52,54 of airfoil 46.) As should be appreciated, these reference ranges are defined in FIG. 4 via reference dashed lines, boundary planes, or "boundaries 80". Specifically, the five reference ranges divide width 62 of airfoil 46 into adjacent, non-overlapping parallel sections, which, for the purposes of description, will be referred to herein as: a leading range 81; a leading transition range 82; a middle range 83; a trailing transition range 84; and a trailing range 85. As shown in FIG. 4, leading range 81 is the reference section defined adjacent to leading edge 52 of airfoil 46. Middle range 83 is the reference section occurring in the approximate central portion of airfoil 46. Leading transition range 82 is the reference section that is positioned between leading range 81 and middle range 83. In the case of trailing range 85, it is the reference section defined adjacent to trailing edge 54 of airfoil 46, while trailing transition range 84 is the reference section that is positioned between middle range 83 and trailing range 85.

The above-referenced reference ranges 81,82,83,84,85 may be particularly located on airfoil 46 by defining the locations of boundaries 80, while the location of boundaries 80 can be defined in relation to the Z-axis. Specifically, boundaries 80 will be defined in relation to the position on the Z-axis where a plane normal to the Z-axis would intersects airfoil 46 at the location of the boundary 80. For purposes herein, these locations on the Z-axis will be expressed relative to overall cord length (i.e., the length of the Z-axis between leading edge 52 and trailing edge 54), and, thus, given in terms of a percentage of cord length. Specifically, a position at leading edge 52 is given a value of 0% of chord length, while a position at the trailing edge 54 is given a value of 100% of cord length. With this in mind, according to preferred embodiments, the boundary 80 that divides leading range 81 and leading transition range 82 is disposed between 13% and 23% of cord length. The boundary 80 that divides leading transition range 82 and middle range 83 is disposed between 27% and 37% of cord length. The boundary 80 that divides middle range 83 and trailing transition range 84 is disposed between 67% and 77% of cord length. And, finally, the boundary 80 that divides trailing transition range 84 and trailing range 85 is disposed between 87% and 97% of cord length.

In accordance with preferred embodiments of the present invention, fillet height will now be provided for pressure side fillet 63 within the reference ranges 81, 82, 83, 84, 85, as those reference ranges are defined above. Further, as stated, fillet height will be expressed in relation to the overall size of the airfoil, for example, in relation to height 61 of airfoil 46. (As already stated, height 61 of airfoil 46 is the distance between inner surface 60 of tip shroud 48 and surface of platform 40, which, because of the slant of the tip shroud, may be different on each side of airfoil 46.) More particularly, fillet height will be expressed in terms of a percentage of airfoil height 61, where a position at the level of inner surface 60 of tip shroud 48 is deemed to have a height of 0% of airfoil height 61, while a position at the level of platform 40 is deemed to have a height of 100% of airfoil height 61. According to exemplary embodiments of the present invention, the fillet height within leading range 81 is maintained between 3% and 13% of airfoil height 61. The fillet height within middle range 83 is maintained within 17% and 27% of airfoil height 61. The fillet height within trailing range is maintained within 3% and 13% of airfoil height 61. In regard to transitional ranges 82,84, leading transition ranges 82 has a fillet height that smoothly transitions between the fillet height of leading range 81 and that of middle range 83, while trailing transition ranges 84 has a fillet height that smoothly transitions between the fillet height of middle range 83 and that of trailing range 85.

A tip shroud fillet in accordance with any of the embodiments described herein provides improved support to the tip shroud, thereby extending component life, while also facilitating aerodynamic flow of hot combustion gases through the turbine. As described above, in terms of engine performance, it is desirable to have relatively large tip shrouds that extend over substantially the entire radial outer end of the airfoil. However, it is also desirable that the fillet remain small and streamlined for the sake of aerodynamic efficiency. The fillet according to the present disclosure effectively balances these and other competing objectives such that one or more important performance objectives are improved or optimized. That is, the fillet shape of the present disclosure provides a profile that effectively guides hot gas flow through the turbine while supporting a tip shroud that is large enough to adequately prevent leakage. In addition, when compared to conventional fillets shapes supporting a similarly sized tip shroud, the fillet of the present invention reduces mechanical stresses and evenly spreads load between pressure and suction sides, thereby significantly extending the useful life of the part. The effectiveness of the present fillet shape has been verified by computational fluid dynamics analysis, traditional fluid dynamics analysis, Euler and Navier-Stokes equations, flow testing, other conventional tests, and/or combinations thereof.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for a turbine of a gas turbine, the rotor blade comprising:
   an airfoil defined between a concave pressure side and a laterally opposed convex suction side, wherein the pressure side and the suction side extend between opposite leading and trailing edges and between an outer tip and an inboard end;
   a tip shroud attached to the outer tip of the airfoil, the tip shroud comprising a planar component in which an inner surface opposes an outer surface;
   a fillet formed about an intersection of the outer tip and the tip shroud, the fillet defining a fillet profile variable about the intersection for structurally connecting the tip shroud and the airfoil and facilitating aerodynamic airflow about the intersection, wherein the fillet comprises:
   a pressure side fillet formed between the pressure side of the airfoil and the inner surface of the tip shroud; and
   a suction side fillet formed between the suction side of the airfoil and the inner surface of the tip shroud;
   wherein the pressure side fillet comprises a pressure side fillet profile substantially in accordance with points within a first set of points of X, Y and Z coordinate values in a Cartesian coordinate system, as set forth in Table I, where X, Y and Z are distances in inches from an origin and, when the points within the first set of points are connected by smooth, continuing arcs, the points within the first set of points define the pressure side fillet profile of the pressure side fillet; and
   wherein the first set of points comprises each of the points between and including point 1 and point 50 of each reference plane between and including a reference plane H and a reference plane W, as set forth in Table I.

2. The rotor blade according to claim 1, wherein the pressure side fillet profile lies within a pressure side fillet profile envelope, wherein the pressure side fillet profile envelope lies a distance of +/−0.05 inches in a direction normal to the pressure side fillet profile.

3. The turbine rotor blade according to claim 1, wherein the X, Y and Z coordinate values set forth in Table I are scalable as a function of a same number to provide a scaled-up or scaled-down pressure side fillet profile, wherein the same number comprises one of a fraction, decimal fraction, integer, and mixed number.

4. The turbine rotor blade according to claim 1, wherein the tip shroud further comprises circumferentially extending first and second seal rails; and
   wherein the inboard end of the airfoil is defined by a platform that attaches to a root configured to couple the rotor blade to a rotor disc.

5. The rotor blade according to claim 1, wherein a Z-axis of the Cartesian coordinate system is oriented along a chord of the airfoil of the rotor blade.

6. The rotor blade according to claim 1, wherein the first set of points comprises each of the points between and including point 1 and point 50 of each of the reference planes between and including a reference plane E and a reference plane Y, as set forth in Table I.

7. The rotor blade according to claim 1, wherein the first set of points comprises each of the points between and including point 1 and point 50 of each of the reference planes between and including a reference plane A and a reference plane Z, as set forth in Table I.

8. A rotor blade for a turbine of a gas turbine, the rotor blade comprising:
   an airfoil defined between a concave pressure side and a laterally opposed convex suction side, wherein the pressure side and the suction side extend between opposite leading and trailing edges and between an outer tip and an inboard end;
   a tip shroud attached to the outer tip of the airfoil, the tip shroud comprising a planar component in which an inner surface opposes an outer surface;
   a fillet formed about an intersection of the outer tip and the tip shroud, the fillet defining a fillet profile variable about the intersection for structurally connecting the tip shroud and the airfoil and facilitating aerodynamic airflow about the intersection, wherein the fillet comprises:
   a pressure side fillet formed between the pressure side of the airfoil and the inner surface of the tip shroud; and
   a suction side fillet formed between the suction side of the airfoil and the inner surface of the tip shroud;
   wherein the suction side fillet comprises a suction side fillet profile substantially in accordance with points within a first set of points of X, Y and Z coordinate values in a Cartesian coordinate system, as set forth in Table II, where X, Y and Z are distances in inches from an origin and, when the points within the first set of points are connected by smooth, continuing arcs, the points within the first set of points define the suction side fillet profile of the suction side fillet; and wherein the first set of points comprises each of the points between and including point 1 and point 50 of each reference plane between and including a reference plane H and a reference plane W, as set forth in Table II.

9. The rotor blade according to claim 8, wherein the suction side fillet profile lies within a suction side fillet profile envelope, wherein the suction side fillet profile envelope lies a distance of +/−0.05 inches in a direction normal to the suction side fillet profile.

10. The turbine rotor blade according to claim 8, wherein the X, Y and Z coordinate values set forth in Table I are scalable as a function of a same number to provide a scaled-up or scaled-down suction side fillet profile, wherein the same number comprises one of a fraction, decimal fraction, integer, and mixed number.

11. The turbine rotor blade according to claim 8, wherein the tip shroud further comprises circumferentially extending first and second seal rails; and wherein the inboard end of the airfoil is defined by a platform that attaches to a root configured to couple the rotor blade to a rotor disc.

12. The rotor blade according to claim 8, wherein a Z-axis of the Cartesian coordinate system is oriented along a chord of the airfoil of the rotor blade.

13. The rotor blade according to claim 8, wherein the first set of points comprises each of the points between and including point 1 and point 50 of each of the reference planes between and including a reference plane E and a reference plane Y, as set forth in Table II.

14. The rotor blade according to claim 8, wherein the first set of points comprises each of the points between and including point 1 and point 50 of each of the reference planes between and including a reference plane A and a reference plane Z, as set forth in Table II.

15. A rotor blade for a turbine of a gas turbine, the rotor blade comprising:
- an airfoil defined between a concave pressure side and a laterally opposed convex suction side, wherein the pressure side and the suction side extend between opposite leading and trailing edges and between an outer tip and an inboard end;
- a tip shroud attached to the outer tip of the airfoil, the tip shroud comprising a planar component in which an inner surface opposes an outer surface;
- a fillet formed about an intersection of the outer tip and the tip shroud, the fillet defining a fillet profile variable about the intersection for structurally connecting the tip shroud and the airfoil and facilitating aerodynamic airflow about the intersection, wherein the fillet comprises:
- a pressure side fillet formed between the pressure side of the airfoil and the inner surface of the tip shroud; and
- a suction side fillet formed between the suction side of the airfoil and the inner surface of the tip shroud;

wherein:
the pressure side fillet comprises a pressure side fillet profile substantially in accordance with points within a first set of points of X, Y and Z coordinate values in a Cartesian coordinate system, as set forth in Table I, where X, Y and Z are distances in inches from an origin and, when the points within the first set of points are connected by smooth, continuing arcs, the points within the first set of points define the pressure side fillet profile of the pressure side fillet; and the suction side fillet comprises a suction side fillet profile substantially in accordance with points within a second set of points of X, Y and Z coordinate values in a Cartesian coordinate system, as set forth in Table II, where X, Y and Z are distances in inches from an origin and, when the points within the second set of points are connected by smooth, continuing arcs, the points within the second set of points define the suction side fillet profile of the suction side fillet;

wherein:
the first set of points comprises each of the points between and including point 1 and point 50 of each reference plane between and including a reference plane H and a reference plane W, as set forth in Table I; and the second set of points comprises each of the points between and including point 1 and point 50 of each reference plane between and including a reference plane H and a reference plane W, as set forth in Table II.

16. The rotor blade according to claim 15, wherein:
the pressure side fillet profile lies within a pressure side fillet profile envelope, wherein the pressure side fillet profile envelope lies a distance of +/−0.05 inches in a direction normal to the pressure side fillet profile; and the suction side fillet profile lies within a suction side fillet profile envelope, wherein the suction side fillet profile envelope lies a distance of +/−0.05 inches in a direction normal to the suction side fillet profile.

17. The turbine rotor blade according to claim 15, wherein the X, Y and Z coordinate values set forth in Tables I and II are scalable as a function of a same number to provide a scaled-up or scaled-down pressure side fillet profile and suction side fillet profile, respectively, wherein the same number comprises one of a fraction, decimal fraction, integer, and mixed number.

18. The turbine rotor blade according to claim 15, wherein the tip shroud further comprises circumferentially extending first and second seal rails;

wherein the inboard end of the airfoil is defined by a platform that attaches to a root configured to couple the rotor blade to a rotor disc; and wherein a Z-axis of the Cartesian coordinate system is oriented along a chord of the airfoil of the rotor blade.

19. The rotor blade according to claim 15, wherein:
the first set of points comprises each of the points between and including point 1 and point 50 of each of the reference planes between and including a reference plane E and a reference plane Y, as set forth in Table I; and the second set of points comprises each of the points between and including point 1 and point 50 of each of the reference planes between and including a reference plane E and a reference plane Y, as set forth in Table II.

20. The rotor blade according to claim 15, wherein:
the first set of points comprises each of the points between and including point 1 and point 50 of each of the reference planes between and including a reference plane A and a reference plane Z, as set forth in Table I; and the second set of points comprises each of the points between and including point 1 and point 50 of each of the reference planes between and including a reference plane A and a reference plane Z, as set forth in Table II.

21. A rotor blade for a turbine of a gas turbine, the rotor blade comprising:
- an airfoil defined between a concave pressure side and a laterally opposed convex suction side, wherein the pressure side and the suction side extend between opposite leading and trailing edges and between an outer tip and an inboard end;
- a tip shroud attached to the outer tip of the airfoil, the tip shroud comprising a planar component in which an inner surface opposes an outer surface; and
- a fillet formed about an intersection of the outer tip and the tip shroud, the fillet defining a fillet profile variable about the intersection for structurally connecting the tip shroud and the airfoil and facilitating aerodynamic airflow about the intersection, wherein the fillet comprises a pressure side fillet formed between the pressure side of the airfoil and the inner surface of the tip shroud;
- wherein reference boundary planes formed normal to a chord of the airfoil divide the airfoil into adjacent, non-overlapping and substantially parallel reference ranges, which, in order, from the leading edge to the trailing edge of the airfoil, include: a leading range, a leading transitionrange, a middle range, a trailing transition range, and a trailing range;
- wherein:
- the reference boundary plane dividing the leading range and the leading transition range is disposed between 13% and 23% of the chord length;
- the reference boundary plane that divides the leading transition range and the middle range is disposed between 27% and 37% of the chord length;
- the reference boundary plane that divides the middle range and the trailing transition range is disposed between 67% and 77% of the chord length; and
- the reference boundary plane that divides the trailing transition range and the trailing range is disposed between 87% and 97% of the chord length;
- wherein a fillet height comprises a height of the pressure side fillet as a percentage of an overall height of the airfoil;
- wherein the pressure side fillet comprises:
- a fillet height within the leading range comprising between 3% and 13% of the overall height of the airfoil;
- a fillet height within the middle range comprising between 17% and 27% of the overall height of the airfoil;
- a fillet height within the trailing range comprising between 3% and 13% of the overall height of the airfoil;
- a fillet height within the leading transition range smoothly transitions between the fillet height of the leading range and the fillet height of the middle range; and
- a fillet height within the trailing transition range smoothly transitions between the fillet height of the middle range and the fillet height of the trailing range.

* * * * *